Feb. 6, 1951   J. T. DAVIDSON ET AL   2,540,189
ACCOUNTING MACHINE

Original Filed March 3, 1944   20 Sheets-Sheet 1

JOHN T. DAVIDSON
PAUL H. WILLIAMS &
LAURENCE N. LEHMAN
*INVENTORS*

BY Carl Benst

THEIR ATTORNEY

FIG. 3

JOHN T. DAVIDSON
PAUL H. WILLIAMS &
LAURENCE N. LEHMAN
INVENTORS

BY *Earl Benst*

THEIR ATTORNEY

Feb. 6, 1951 J. T. DAVIDSON ET AL 2,540,189
ACCOUNTING MACHINE
Original Filed March 3, 1944 20 Sheets-Sheet 3
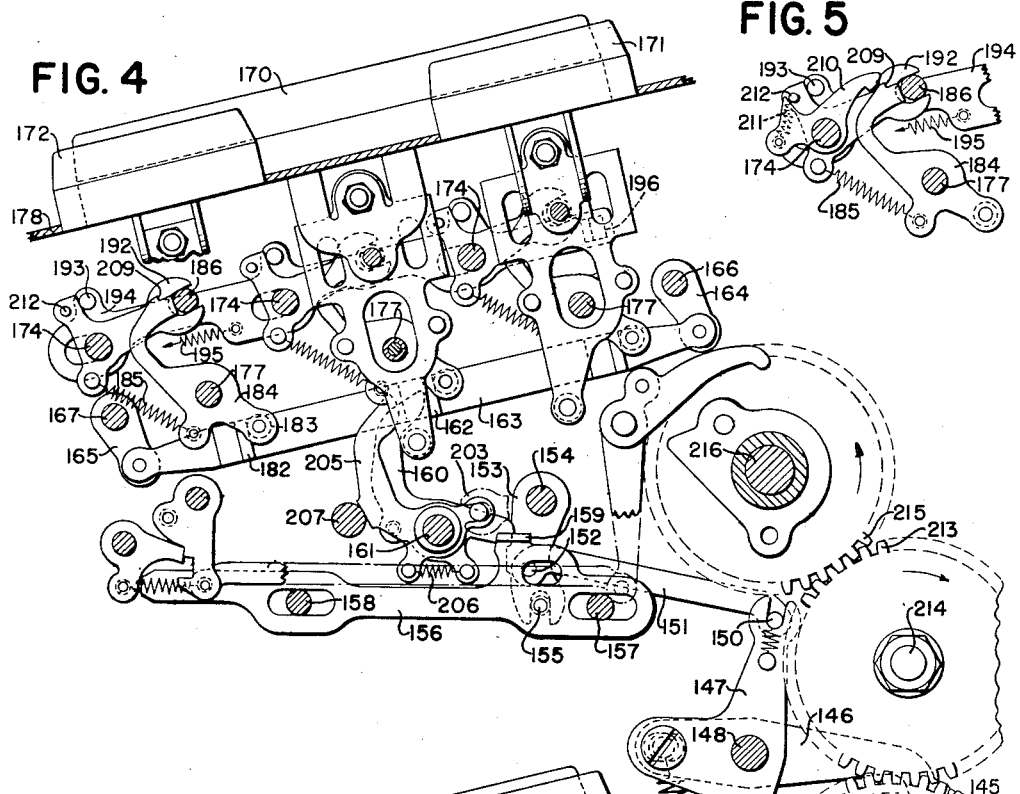
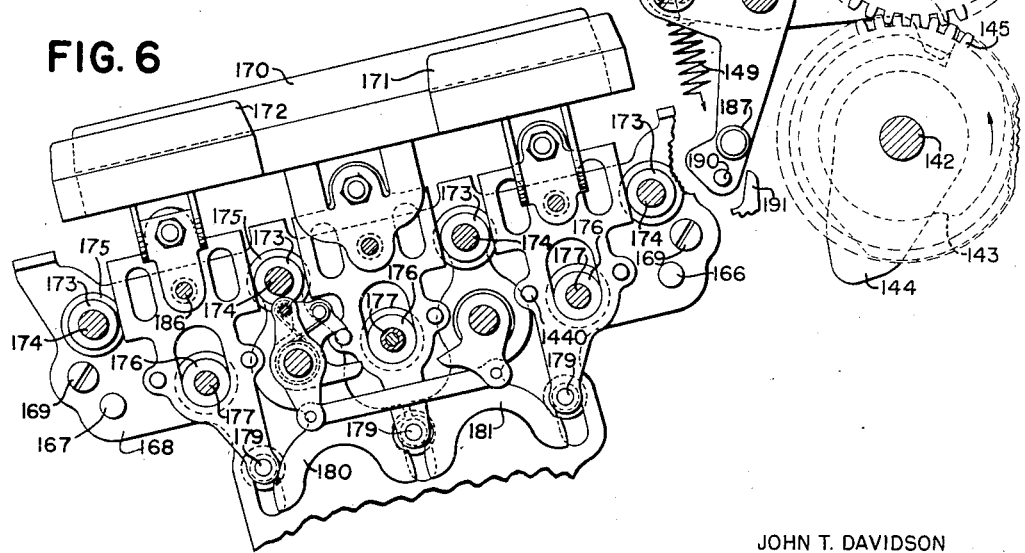
JOHN T. DAVIDSON
PAUL H. WILLIAMS &
LAURENCE N. LEHMAN
*INVENTORS*
BY *Carl Beust*
THEIR ATTORNEY

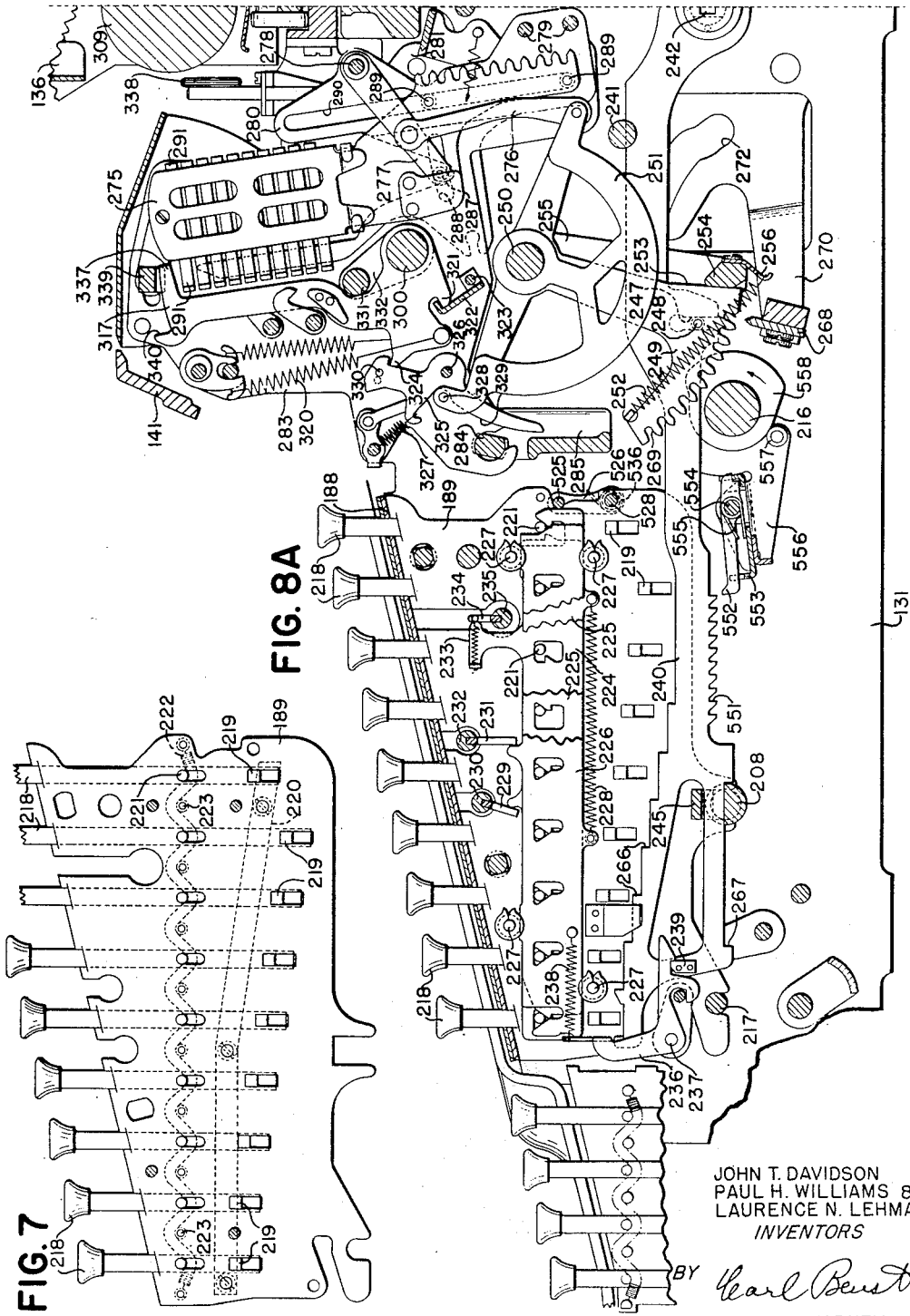

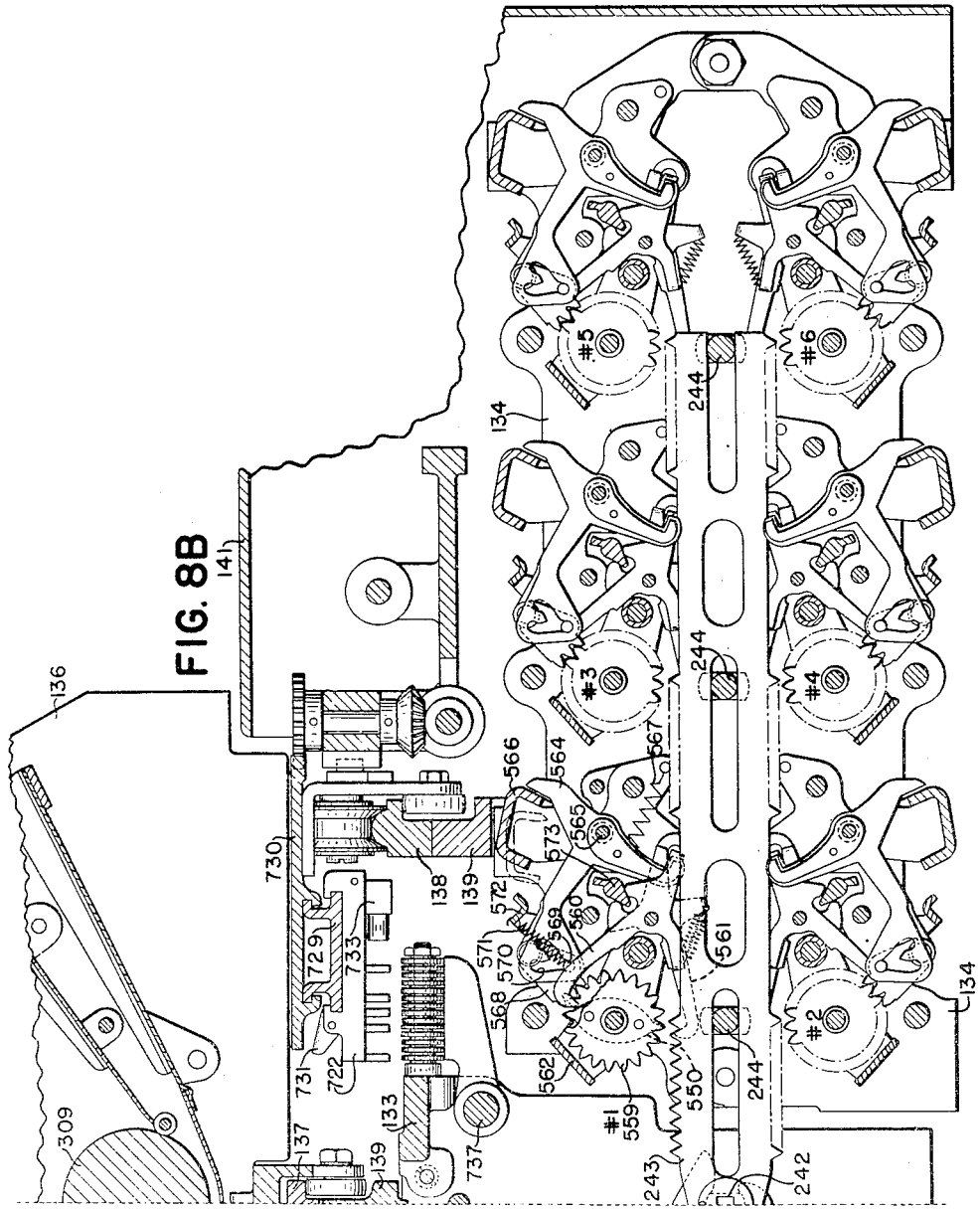

Feb. 6, 1951   J. T. DAVIDSON ET AL   2,540,189
ACCOUNTING MACHINE
Original Filed March 3, 1944   20 Sheets-Sheet 6
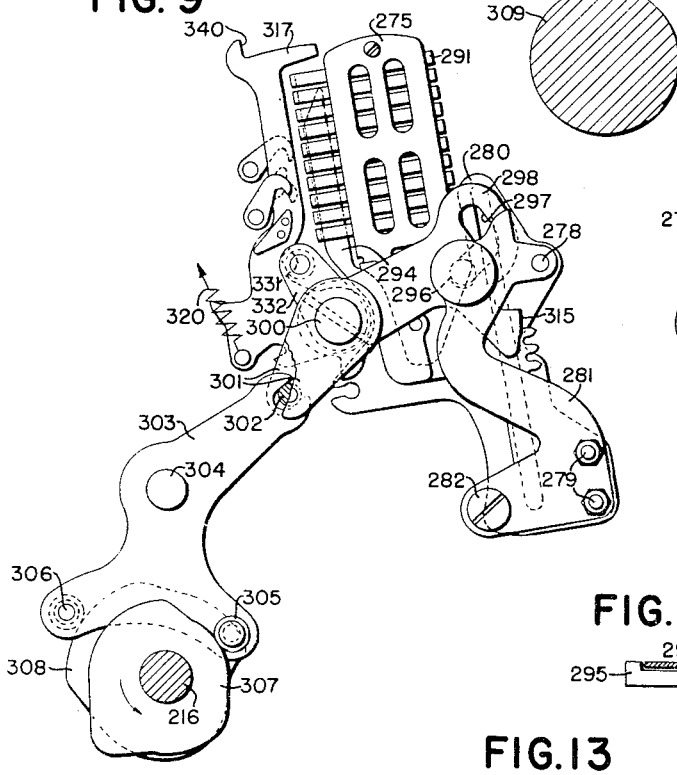
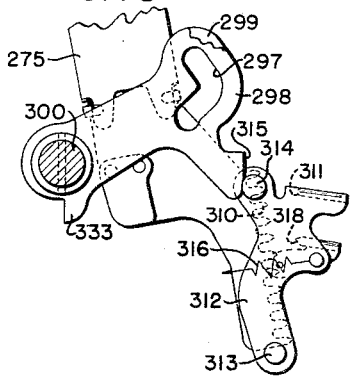
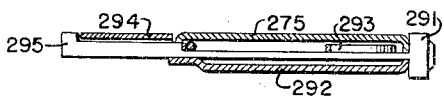
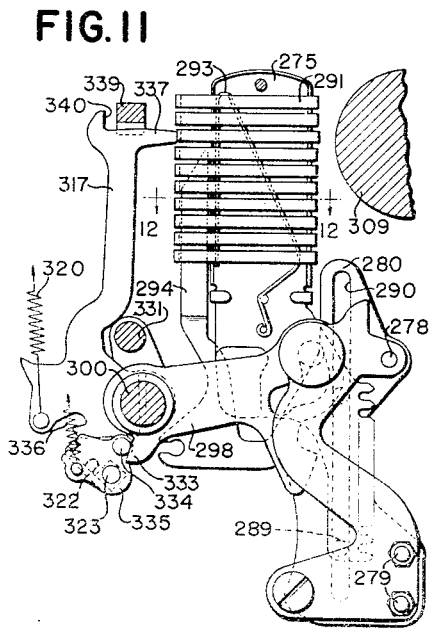
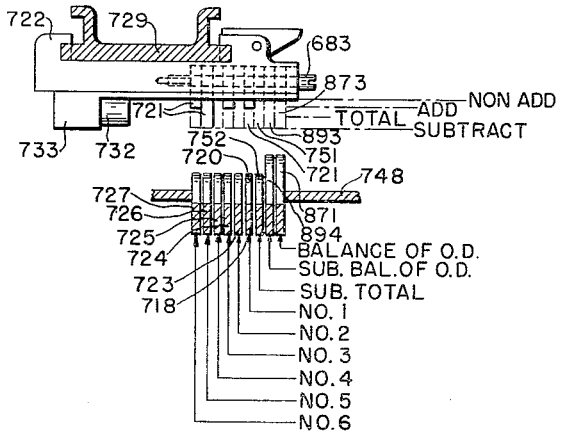
JOHN T. DAVIDSON
PAUL H. WILLIAMS &
LAURENCE N. LEHMAN
INVENTORS
BY Carl Benst
THEIR ATTORNEY Feb. 6, 1951    J. T. DAVIDSON ET AL    2,540,189
ACCOUNTING MACHINE
Original Filed March 3, 1944    20 Sheets-Sheet 7
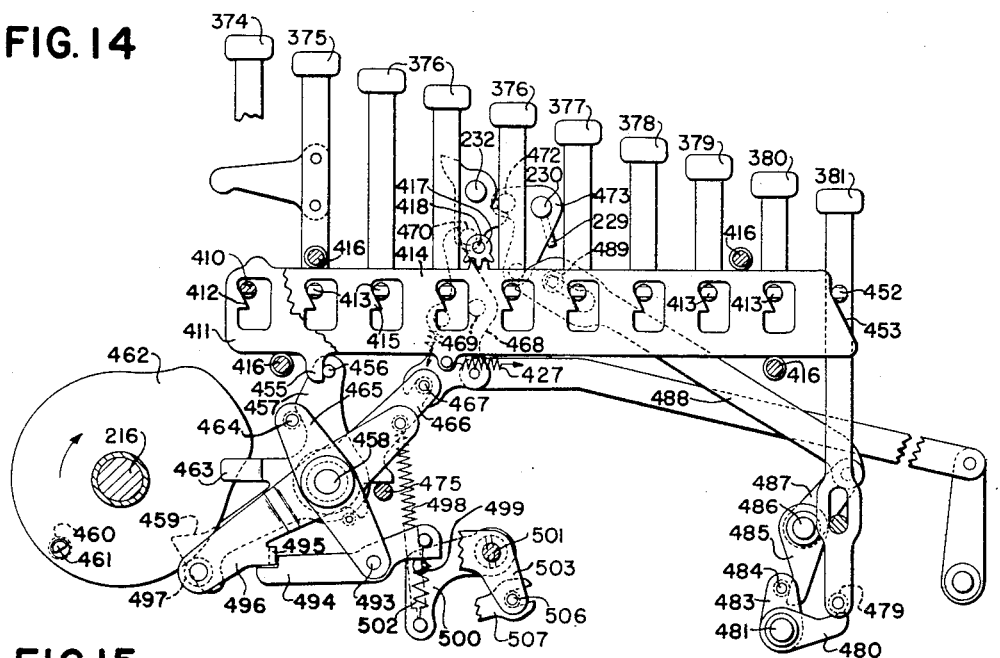
JOHN T. DAVIDSON
PAUL H. WILLIAMS &
LAURENCE N. LEHMAN
INVENTORS
BY Earl Beust
THEIR ATTORNEY

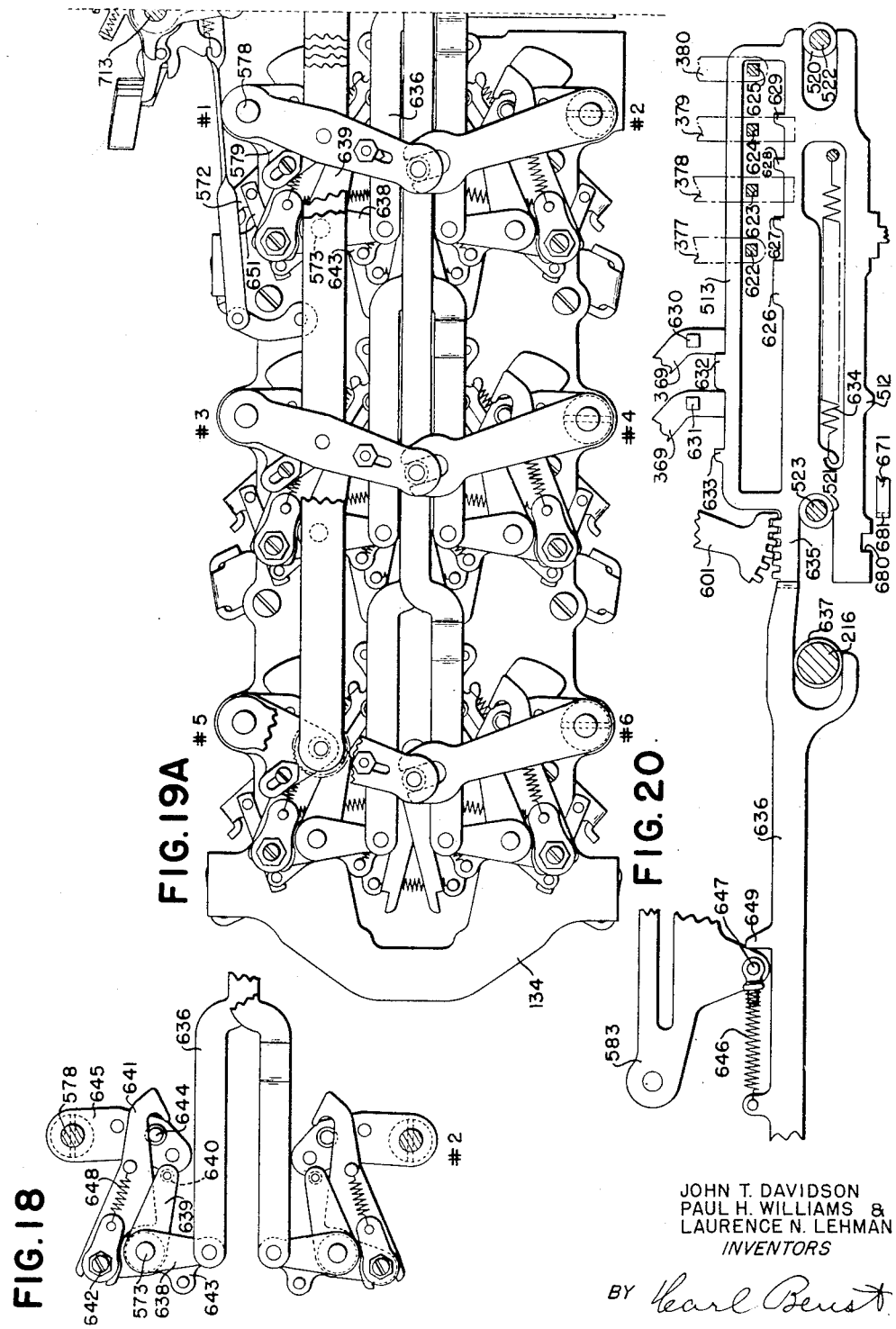

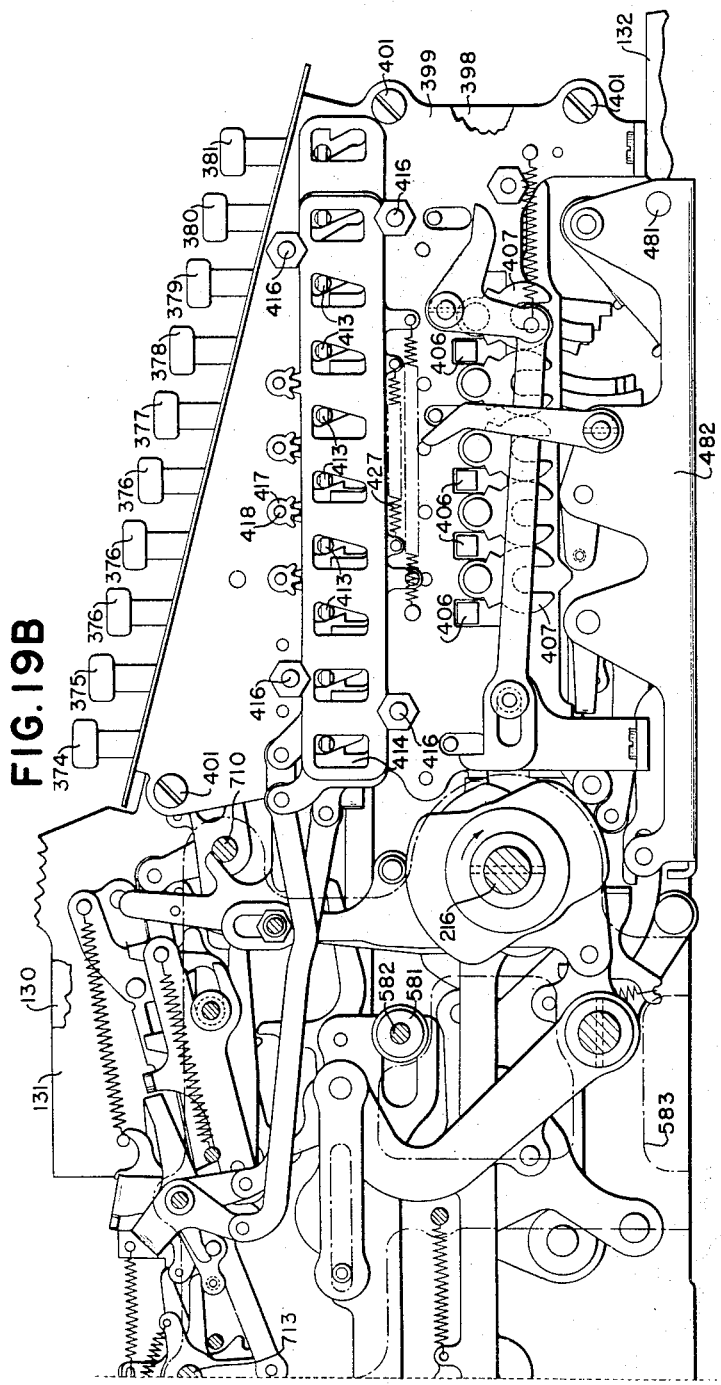

Feb. 6, 1951    J. T. DAVIDSON ET AL    2,540,189
ACCOUNTING MACHINE
Original Filed March 3, 1944    20 Sheets—Sheet 10
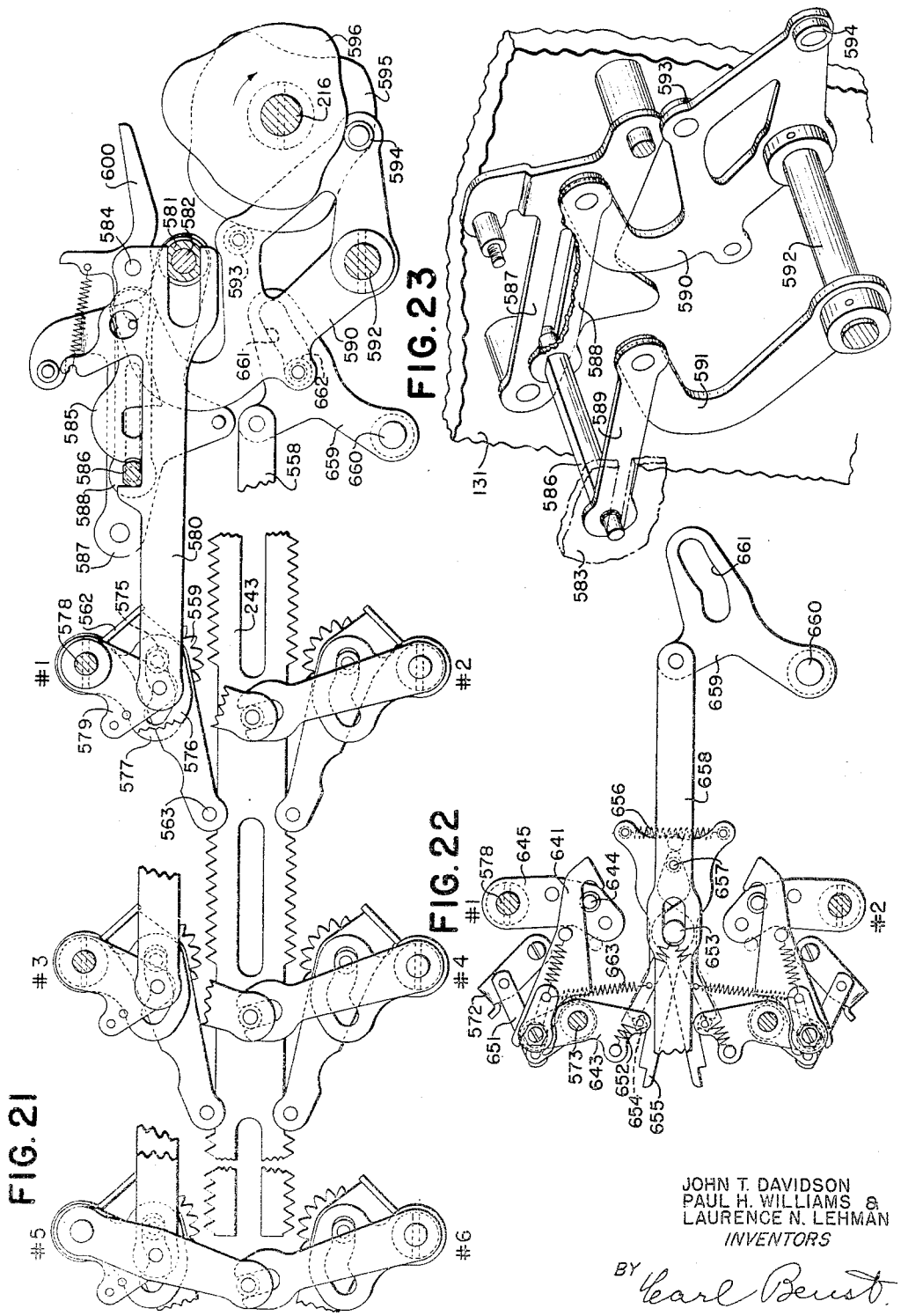
JOHN T. DAVIDSON
PAUL H. WILLIAMS &
LAURENCE N. LEHMAN
INVENTORS
BY Earl Beust
THEIR ATTORNEY

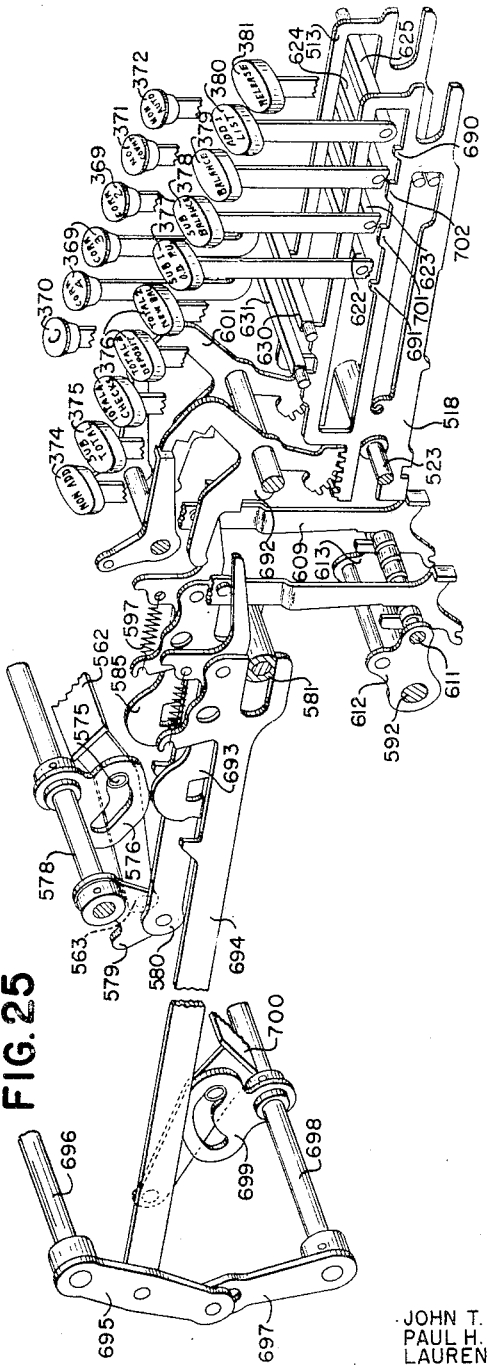

Feb. 6, 1951   J. T. DAVIDSON ET AL   2,540,189
ACCOUNTING MACHINE

Original Filed March 3, 1944   20 Sheets-Sheet 12

JOHN T. DAVIDSON
PAUL H. WILLIAMS &
LAURENCE N. LEHMAN
INVENTORS

BY Carl Benst
THEIR ATTORNEY

Feb. 6, 1951 J. T. DAVIDSON ET AL 2,540,189
ACCOUNTING MACHINE
Original Filed March 3, 1944 20 Sheets-Sheet 13

JOHN T. DAVIDSON
PAUL H. WILLIAMS &
LAURENCE N. LEHMAN
*INVENTORS*

BY *Carl Beust*

THEIR ATTORNEY

Feb. 6, 1951     J. T. DAVIDSON ET AL     2,540,189
ACCOUNTING MACHINE
Original Filed March 3, 1944     20 Sheets-Sheet 14
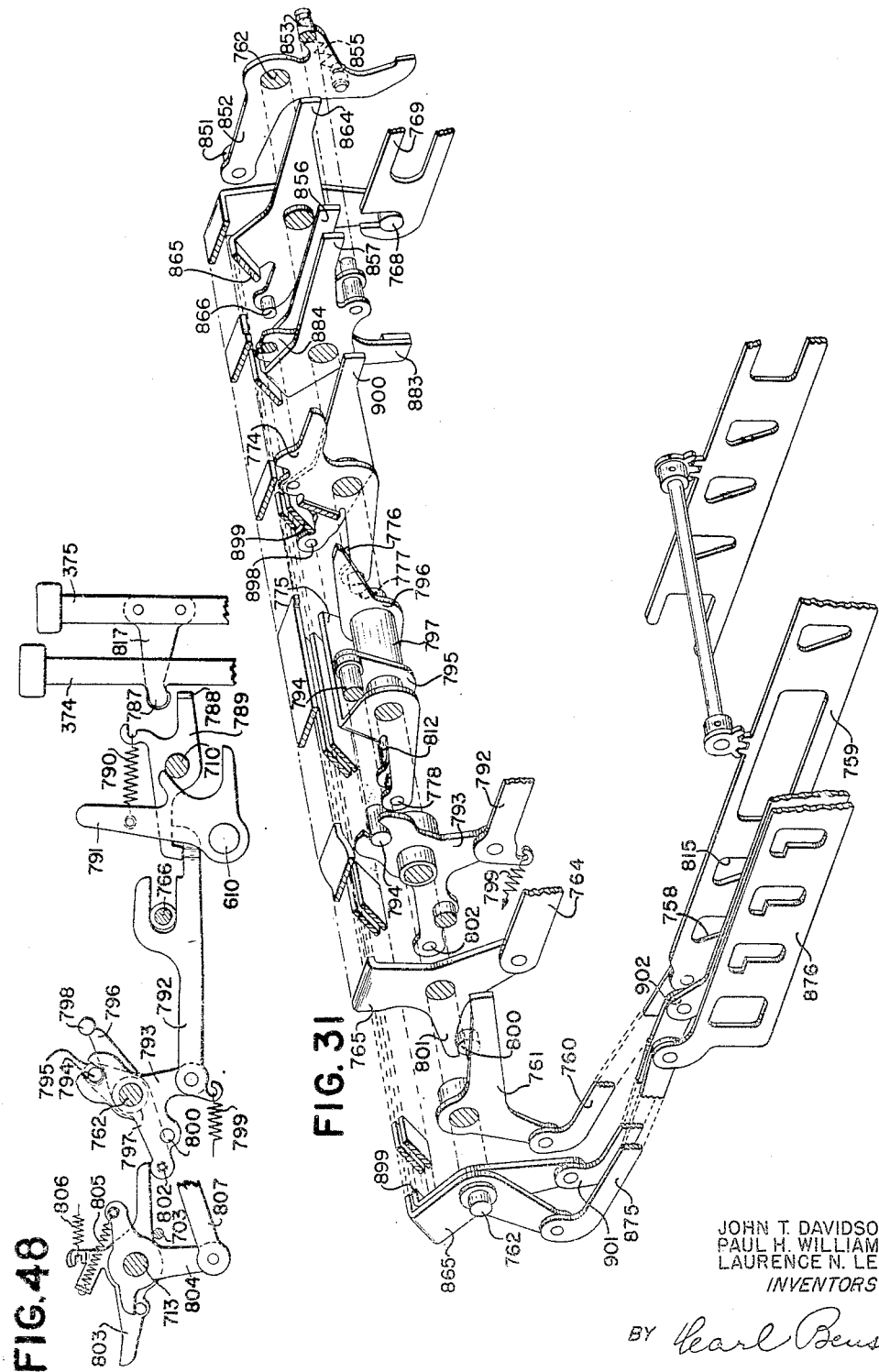
JOHN T. DAVIDSON
PAUL H. WILLIAMS &
LAURENCE N. LEHMAN
INVENTORS
BY Earl Beust
THEIR ATTORNEY

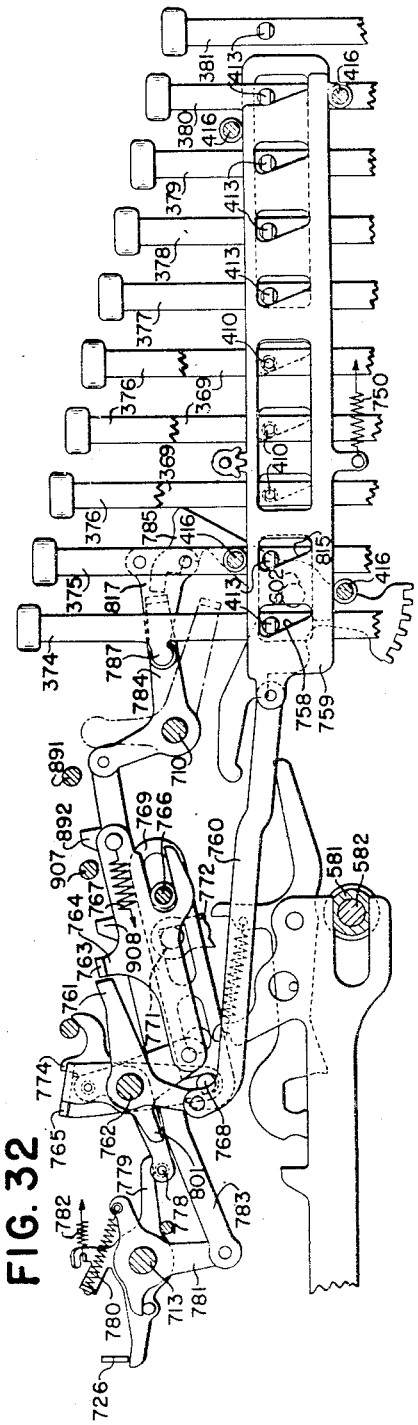
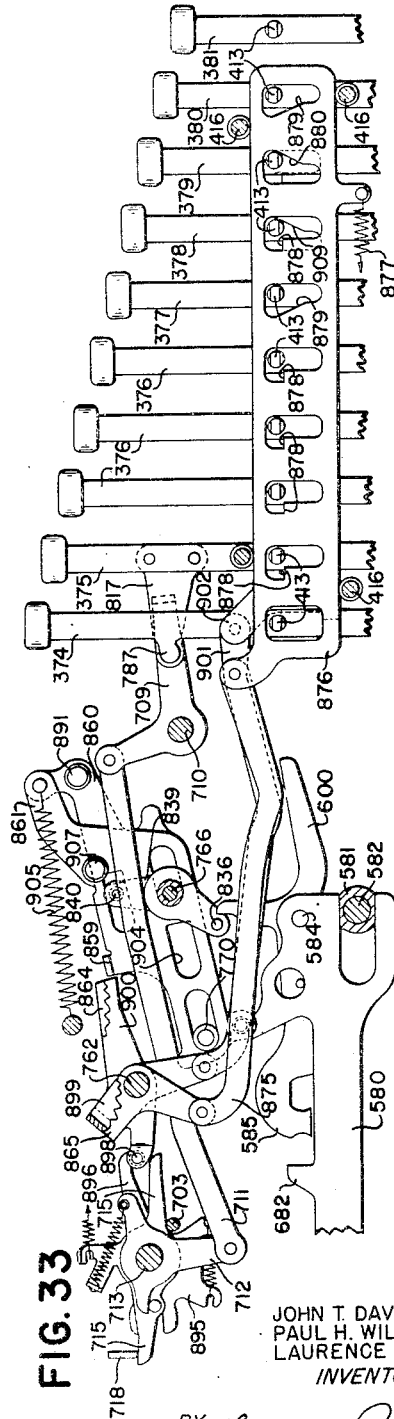

Feb. 6, 1951     J. T. DAVIDSON ET AL     2,540,189
ACCOUNTING MACHINE

Original Filed March 3, 1944     20 Sheets-Sheet 16

JOHN T. DAVIDSON
PAUL H. WILLIAMS &
LAURENCE N. LEHMAN
*INVENTORS*

BY *Pearl Beust*

THEIR ATTORNEY

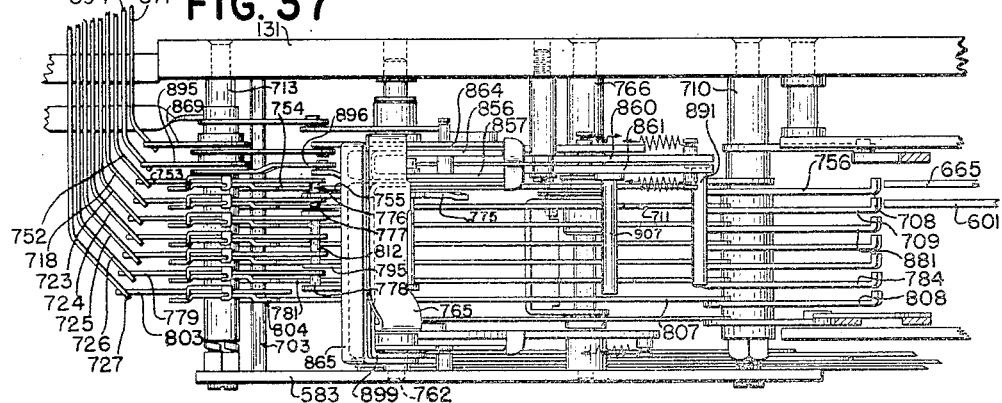
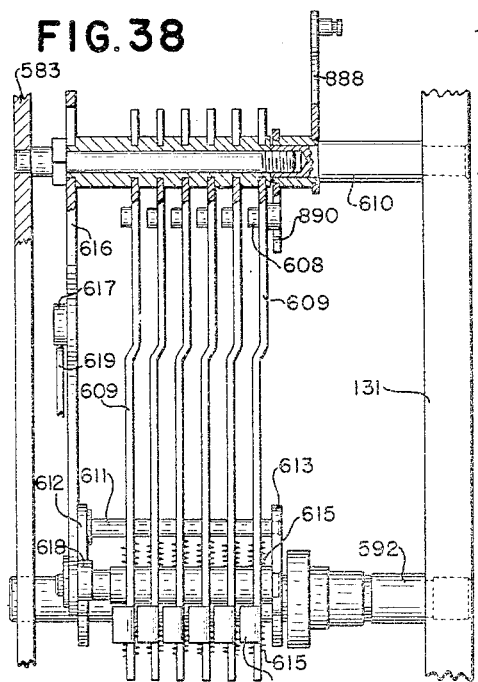
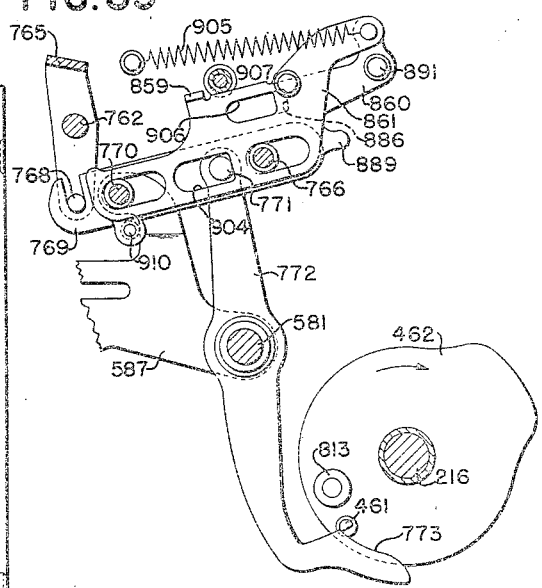
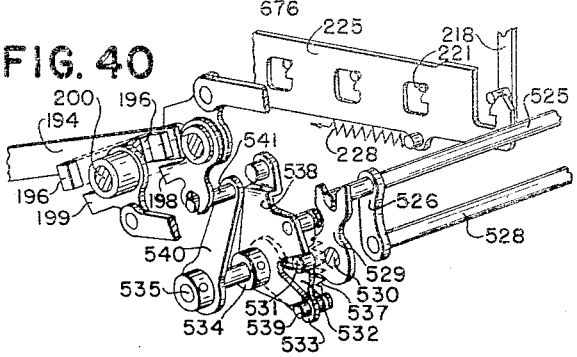

Feb. 6, 1951   J. T. DAVIDSON ET AL   2,540,189
ACCOUNTING MACHINE
Original Filed March 3, 1944   20 Sheets-Sheet 18
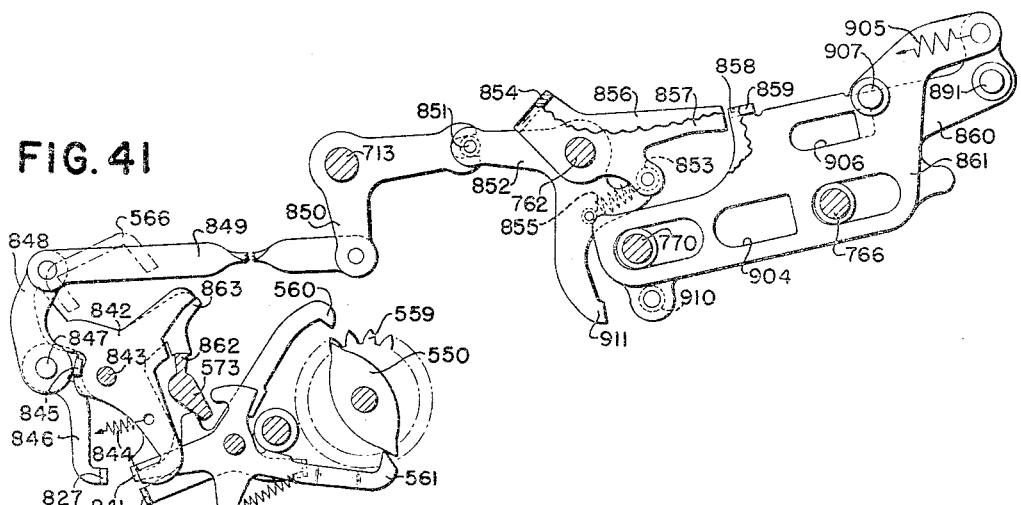
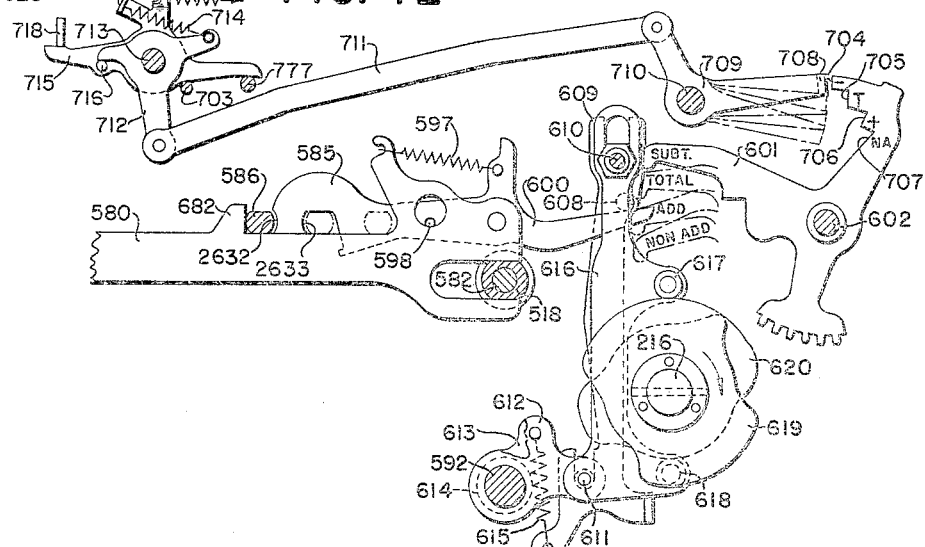
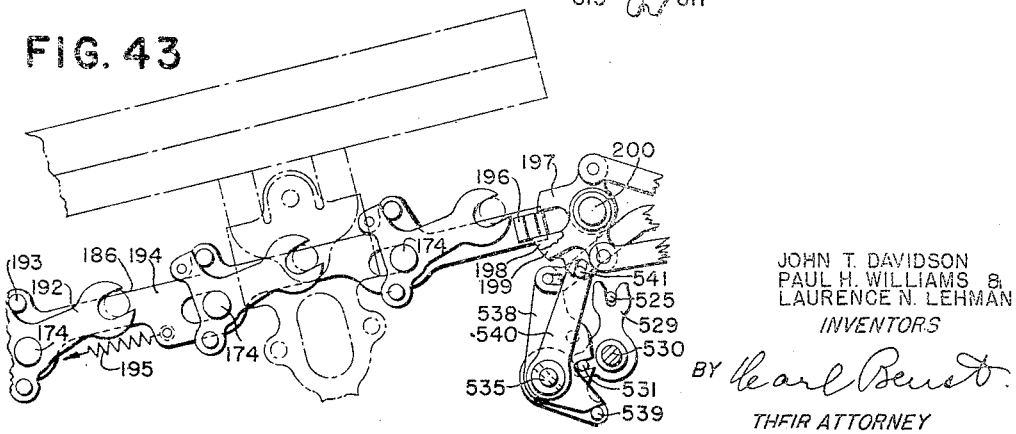
JOHN T. DAVIDSON
PAUL H. WILLIAMS &
LAURENCE N. LEHMAN
INVENTORS
BY Earl Bent
THEIR ATTORNEY

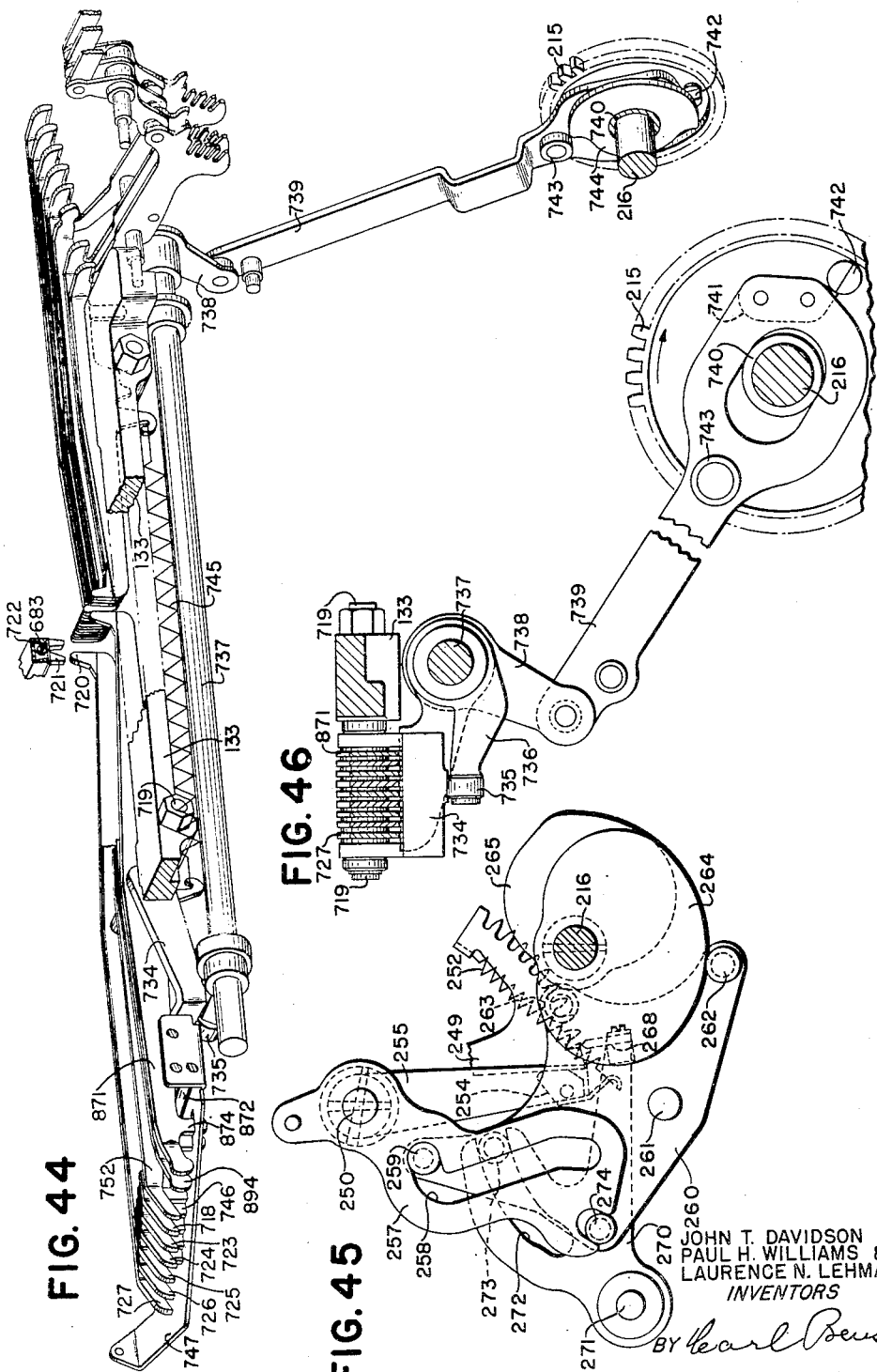

Patented Feb. 6, 1951

2,540,189

UNITED STATES PATENT OFFICE 2,540,189

ACCOUNTING MACHINE

John T. Davidson, Paul H. Williams, and Laurence N. Lehman, Dayton, Ohio, assignors to The National Cash Register Company, Dayton, Ohio, a corporation of Maryland Original application March 3, 1944, Serial No. 524,846, now Patent No. 2,442,402, dated June 1, 1948. Divided and this application December 21, 1945, Serial No. 636,355

23 Claims. (Cl. 235—60.48)

This application is a division of the application of John T. Davidson et al., Serial No. 524,846, filed March 3, 1944. The application has matured into Patent No. 2,442,402 dated June 1, 1948.

The present invention is directed to improvements in accounting or bookkeeping machines and the like and is particularly directed to improvements in the totalizer selecting and controlling mechanisms of such machines.

Speaking more specifically, the present invention is directed to an improved type of accounting or bookkeeping machine for use in connection with the many complex business systems employed by modern business establishments in the keeping of accurate and permanent records of all the transactions in which they participate.

The particular machine chosen to illustrate the present invention is arranged for use by banking establishments in connection with the accounting or bookkeeping problems involved in the balancing of individual checking accounts. However, it is not the desire to limit the features of this invention to any particular machine or to any particular business system, as the versatility and the flexibility of such a machine admirably adapt it for use in the solution of practically all accounting problems encountered in connection with complex present-day business systems.

Some of the basic principles of the machine embodying this invention are disclosed in the following United States patents: Letters Patent of the United States No. 1,197,278 and 1,203,863, issued, respectively, September 5, 1916, and November 7, 1916, to Halcolm Ellis; Patent No. 1,819,034, issued August 18, 1918, to Emil John Ens; Patent No. 2,038,717, issued April 28, 1936, to Raymond A. Christian; Patent No. 2,079,355, issued May 4, 1937, to Charles L. Lee; Patent No. 2,181,975, issued December 5, 1939, to Charles L. Lee; Patent No. 2,189,851, issued February 13, 1940, to Paul H. Williams et al.; and Patent No. 2,217,221, issued October 8, 1940, to Jesse R. Ganger. Reference may be had to the above patents for the details of construction of the basic portions of the machine which are described herein only in a general way.

Broadly, it is an object of this invention to provide an accounting machine for use in connection with the complex business systems of present-day business establishments.

Another object is to provide novel means under the control of the traveling carriage in predetermined columnar positions, or under control of certain control elements, to engage and disengage the totalizers and the actuators in proper timing to effect the type of operation desired.

Another object of this invention is the provision of novel means for controlling the recording of the positive amount of an overdraft in the balance totalizer, said means comprising an overdraft totalizer, which is always in complementary relationship with the balance totalizer, and further comprising means to control the balance and overdraft totalizers in overdraft operations so that the overdraft totalizer will be read or reset to obtain a positive recording of the overdraft.

Another object is to provide means controlled either by certain control elements or by the traveling carriage in predetermined columnar positions thereof for selecting and conditioning the various totalizers for their various functions.

Another object is to supply means controlled either by the traveling carriage in certain columnar positions thereof or by certain control elements for causing the proper functioning of the balance totalizer and the overdraft totalizer in overdraft operations.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In the drawings:

Fig. 3 is a diagrammatic plan view of the keyboard of the machine of this invention.

Fig. 4 is a right side elevation of the machine releasing mechanism.

Fig. 5 is a detail view of the non-repeat mechanism for one of the machine release bars.

Fig. 6 is a right side elevation showing part of the machine releasing mechanism in detail.

Fig. 7 is a detail view showing the manner in which the amount keys are mounted in the keyboard framework.

Figs. 8-A and 8-B together constitute a longitudinal cross-sectional view of the entire machine taken just to the right of one of the amount banks, showing the actuator mechanism, the printing mechanism, and the corresponding wheels of the six totalizers associated with said amount banks.

Fig. 9 is a right side elevation of a portion of the printing mechanism, showing the type carriers in normal or home position.

Fig. 10 is a detail view of the aliner mechanism for the type carriers.

Fig. 11 is a right side elevation showing one of the type carriers in printing position and the corresponding impression hammer mechanism in released position.

Fig. 12 is an enlarged sectional view taken along line 12—12 (Fig. 11), looking in the direction indicated by the arrows and showing the construction of the type carriers.

Fig. 13 is a cross-sectional view of a portion of the sensing mechanism for controlling the selection of the various totalizers by means of the traveling carriage in selected columnar positions thereof.

Fig. 14 is a left side elevation showing in particular the key releasing mechanism.

Fig. 15 is a top plan view of a portion of the mechanism shown in Fig. 14.

Fig. 16 is a detail view of a portion of the mechanism for locking the machine against operation while an amount key is partially depressed.

Fig. 17 is a detail view of a part of the key releasing mechanism.

Fig. 18 is a detail view of a part of the subtract mechanism for two of the totalizers.

Figs. 19-A and 19-B together constitute a side elevation of the machine, as observed from the left, showing in particular the mechanism for controlling the functions of the various totalizers.

Fig. 20 is a continuation of Fig. 18 and shows additional mechanism for controlling the subtract function in one of the totalizers.

Fig. 21 is a left side elevation showing the totalizer engaging mechanism.

Fig. 22 is a left side elevation showing a part of the subtract control mechanism for the No. 1 and the No. 2 totalizers.

Fig. 23 is a detail perspective view showing the totalizer engaging bar and the cam levers which operate said bar.

Fig. 24 is a facsimile of a fragmentary portion of a statement slip illustrating one use of the machine of this invention.

Fig. 25 is a perspective view of a portion of the totalizer engaging mechanism.

Figure 26:
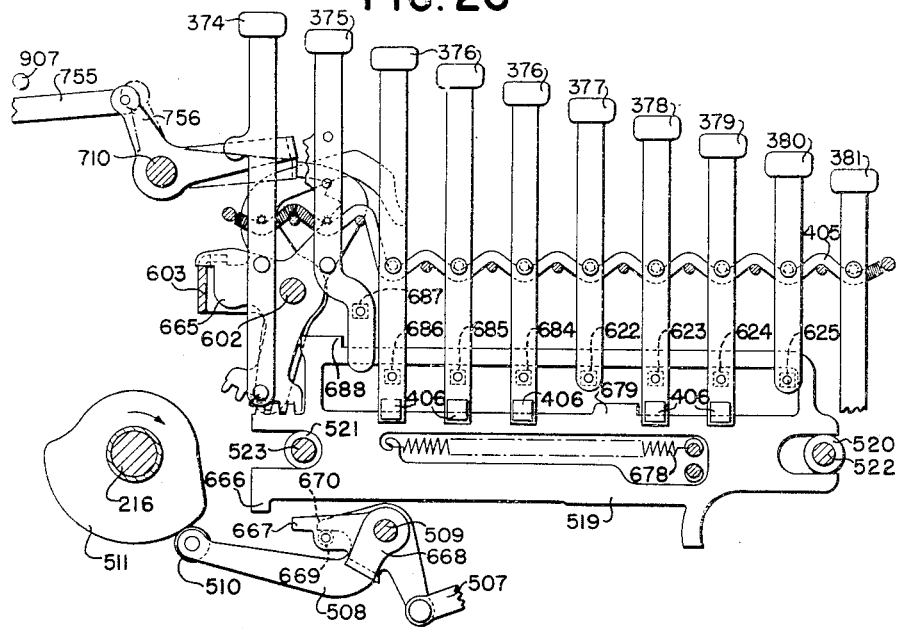

Fig. 26 is a left side elevation showing the row of control keys, the sub-total control slide, and part of the mechanism associated therewith.

Figure 27:
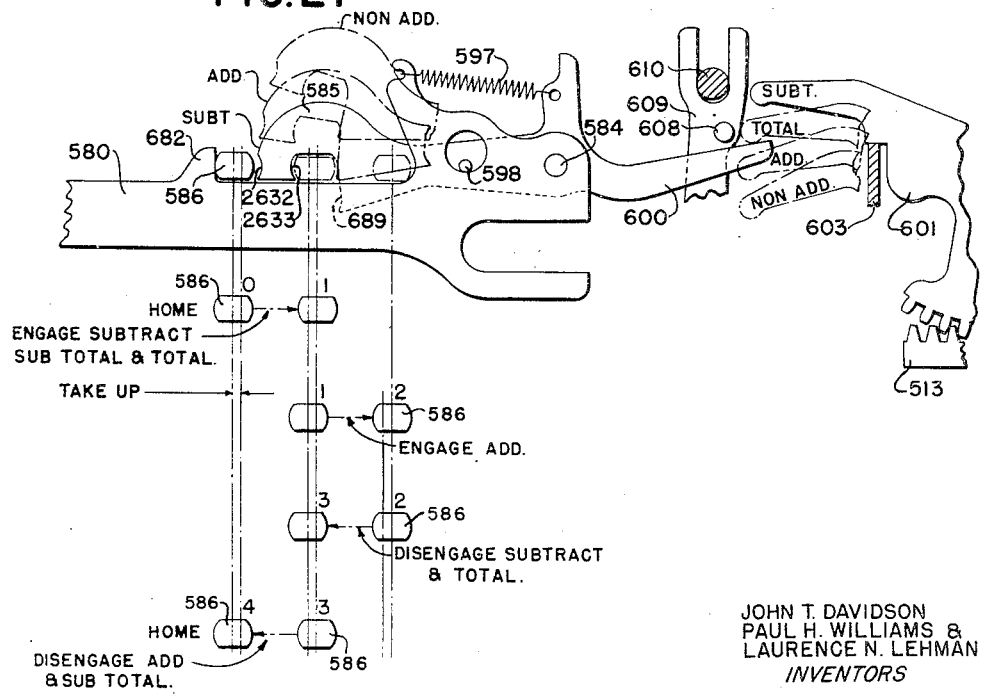

Fig. 27 is a diagrammatic view showing the movement of the totalizer engaging bar for engaging and disengaging the selected totalizer or totalizers with and from the actuators in all types of operations.

Figure 28:
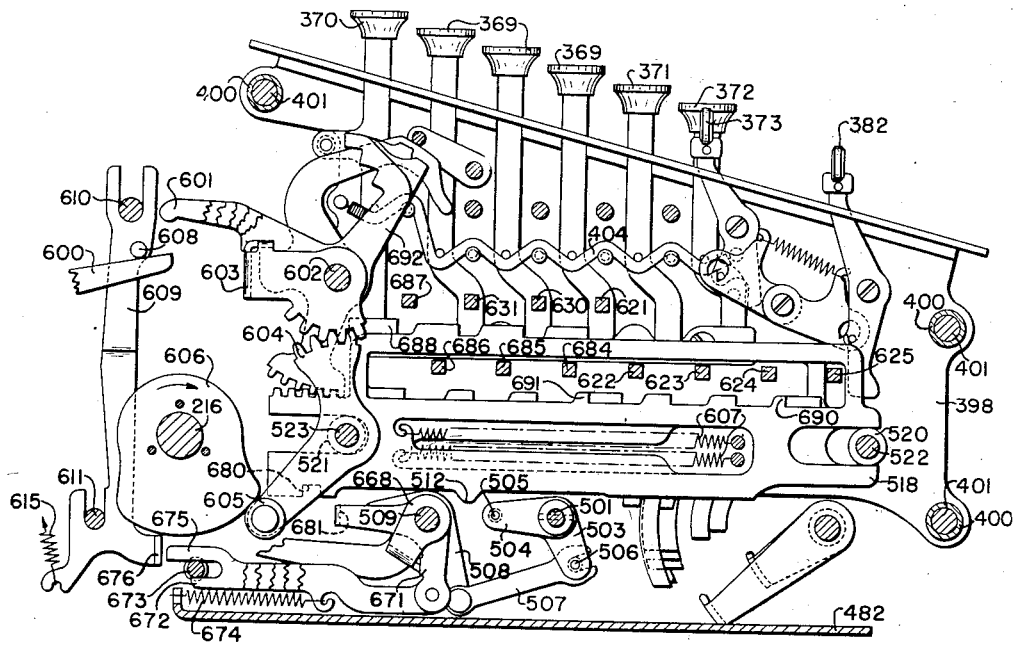

Fig. 28 is a detail view including in particular the sub-total control mechanism.

Figure 29:
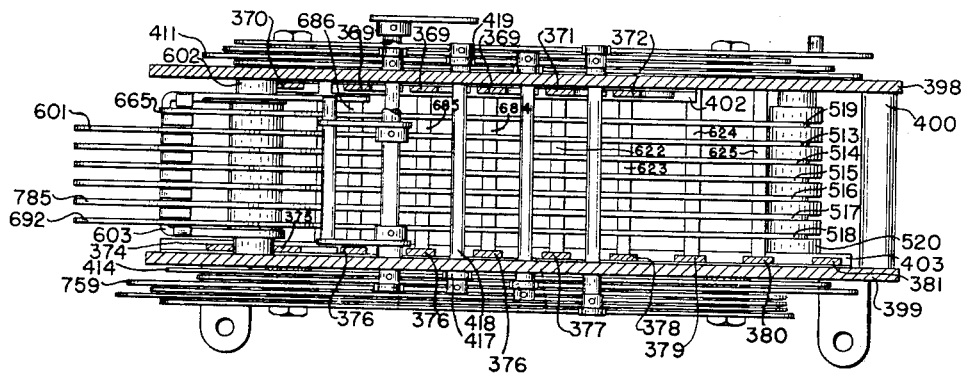

Fig. 29 is a top plan view of the totalizer control slides for controlling the functions of the various totalizers.

Figure 30:
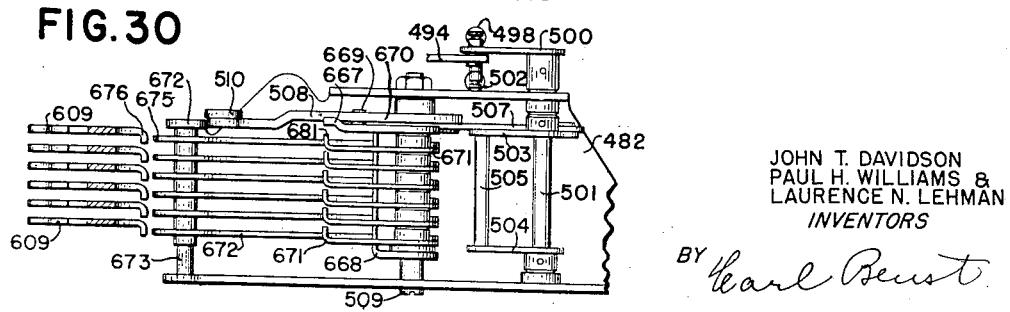

Fig. 30 is a top plan view of part of the mechanism shown in Fig. 28 for controlling the various totalizers in sub-total operations.

Fig. 31 is an expanded perspective view showing in particular the overdraft control yokes and certain mechanisms associated therewith.

Fig. 32 is a left side elevation of a portion of the mechanism for controlling the overdraft totalizer.

Fig. 33 is a left side elevation showing in particular part of the overdraft control mechanism.

Figure 34:
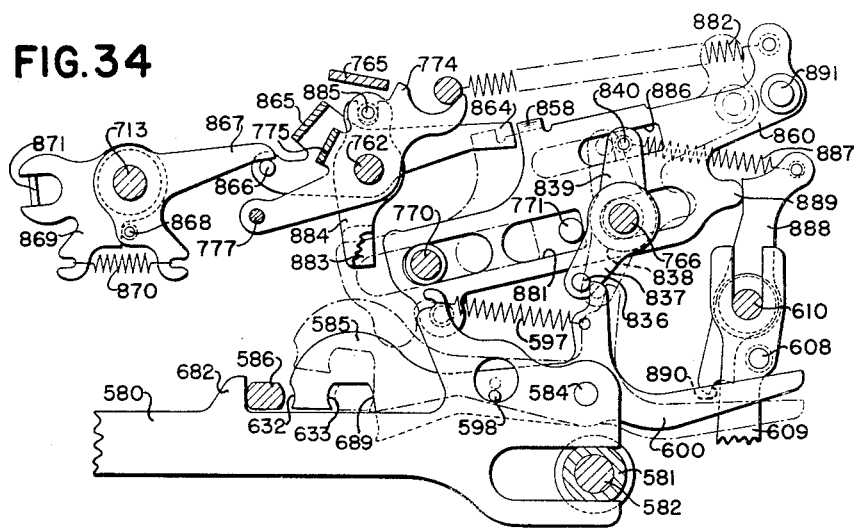

Fig. 34 is a detail view of a part of the mechanism for controlling the engaging and disengaging of the balance totalizer in balance of overdraft operations.

Figure 35:
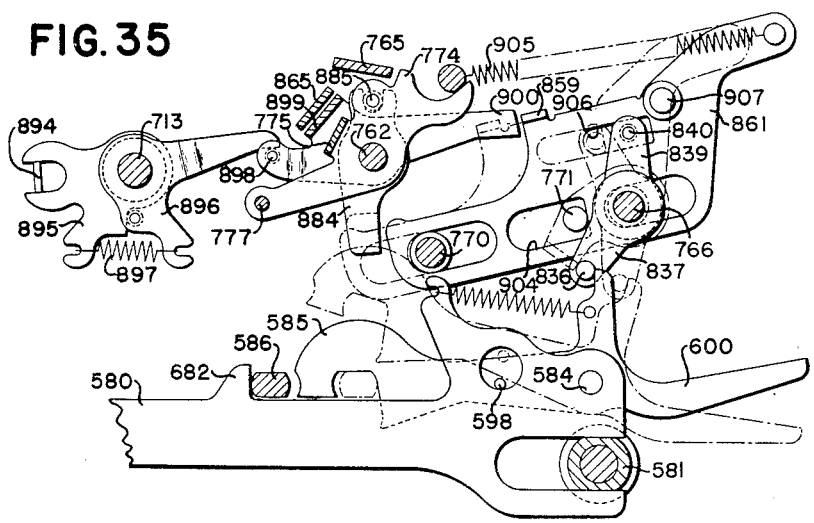

Fig. 35 is a detail view of a portion of the mechanism for controlling the engaging and disengaging of the balance totalizer in sub-balance of overdraft operations.

Figure 36:
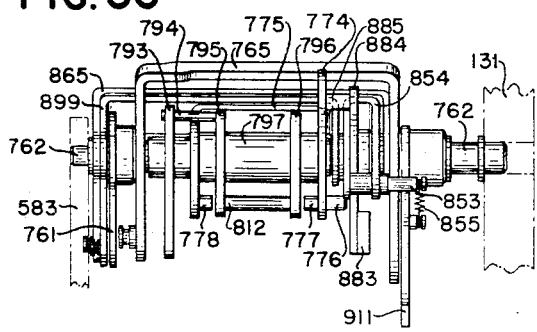

Fig. 36 is a side spacing view of the overdraft control yokes.

Fig. 37 is a top plan view of a portion of the totalizer control mechanism.

Fig. 38 is a front elevation of a part of the mechanism shown in Fig. 30, illustrating in particular the vertical bars for controlling the engaging and disengaging of the totalizers in subtract, total, and sub-total operations.

Fig. 39 is a detail view of the cam lever and slides controlled thereby for actuating the overdraft control yokes.

Fig. 40 is a perspective view showing in detail the mechanism for locking the machine against operation when an amount key is partially depressed.

Fig. 41 is a left side elevation of the mechanism for unlocking the automatic overdraft control mechanism when the balance totalizer is overdrawn.

Fig. 42 is a left side elevation of a portion of the totalizer selecting and engaging mechanism.

Fig. 43 is a right side elevation showing in particular the mechanism for locking the machine releasing mechanism against operation.

Fig. 44 is a perspective view of the sensing means controlled by the traveling carriage and the cam which operates said sensing means.

Fig. 45 is a detail view of the cams and associated mechanism for operating the leading frame and aliner mechanism for controlling the positioning of the actuators.

Fig. 46 is a detail view of the cam for operating the sensing means shown in Fig. 44.

Figure 47:
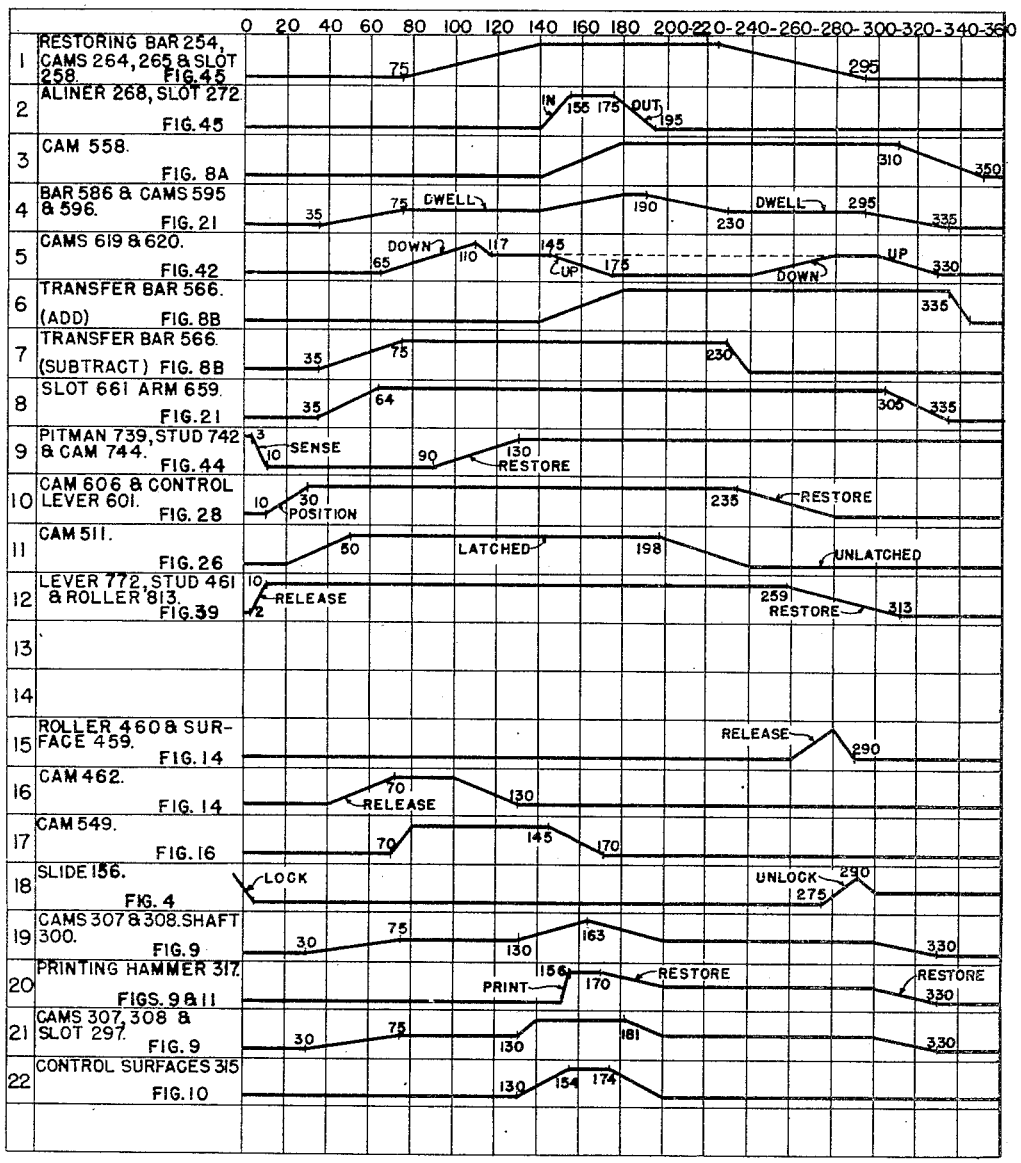

Fig. 47 is a time chart giving in graphic form the various movements of the important mechanism embodied in the machine of this invention.

Fig. 48 is a detail view showing the mechanism controlled by the Non-add and Sub-total keys for causing the Nos. 2, 3, 4 and 6 totalizers to non-add.

GENERAL DESCRIPTION

The mechanism of the machine chosen to illustrate the present invention is driven by a conventional type of electric motor which may be released for operation either by any one of three release bars, including a main release bar and two auxiliary release bars, or by any one of a plurality of so-called motorized control keys, or automatically by means of the traveling carriage in predetermined or selected columnar positions thereof. The main operating motor is of the semi-continuously running type, there being an automatic shut-off device provided for breaking the electrical current to the motor in case said motor is not switched off; that is, in case the motor is left running and the machine is not operated over a certain period of time. Releasing the machine for operation restores this automatic shut-off mechanism to initial position.

Instead of the conventional type of oscillating cam shaft usually found in machines of this type, the present machine is provided with a rotary cam shaft which makes one revolution each machine operation to drive the different mechanisms of the machine. Depression of any one of the three motor or release bars, or any of the various motorized control keys, causes the main cam shaft to be clutched to the operating motor, which in turn drives said cam shaft through one revolution of movement, after which said cam shaft is automatically declutched from said motor mechanism.

After the automatic shut-off mechanism has functioned to stop operation of the motor, depression of any one of the starting bars or any one of the motorized control keys, in addition to engaging the clutch mechanism, as explained above, simultaneously operates the switch to energize the machine operating motor.

The machine of the present invention is equipped with a laterally shiftable traveling carriage, which is driven in both tabulating and return directions by a non-positive hydraulic drive mechanism similar in many respects to that disclosed in the Ganger Patent No. 2,217,221. The hydraulic mechanism for the traveling carriage is driven by an independent motor, which is actuated by the same switch mechanism which controls the main motor for driving the machine proper. The independent motor for the traveling carriage likewise drives, through a positive connection, an auxiliary cam shaft for controlling all the functions of the traveling carriage with the exception of its tabulating and return movements.

The machine embodying the present invention in its present form is provided with six adding and subtracting totalizers mounted in vertical pairs at the rear of the machine, as is the usual practice with machines of this type. It is not the desire to limit this machine to any particular number of totalizers, as this is a matter of choice, and the number of totalizers may be increased or decreased at will, to meet the requirements of the business system to which the machine is being applied.

In the present adaptation, one of the add-subtract totalizers is used as a crossfooter or balance totalizer, and another totalizer is used in conjunction with said balance totalizer and is maintained constantly in complementary agreement therewith, so that a positive recording (true negative balance) of an overdraft may be obtained at any time by simply reading or resetting this complementary totalizer, which will be referred to hereinafter as the overdraft totalizer. This arrangement of the balance totalizer and the overdraft totalizer permits all operations, including overdraft operations, to be performed in one cycle of operation of the machine mechanism—a decided advantage, as, in former machines, it was necessary to utilize at least three cycles of operation of the machine mechanism in overdraft operations in order to transpose the negative amount of the overdraft to a positive amount, and record this positive amount.

Another one of the totalizers is used as an item counter and may be used in conjunction with the balance totalizer or any of the other totalizers for counting any particular item. The other three totalizers of the machine may be used in any manner desired, depending upon the particular business system to which the machine is applied.

The wheels of the six totalizers are adapted to be engaged with corresponding actuator racks, there being one such rack for each denominational order of the machine, said racks being controlled in subtracting and adding operations by means of corresponding denominational rows of amount keys mounted in the main keyboard of the machine.

In adding and subtracting operations, depressed amount keys cause the corresponding actuator racks to be positioned in agreement therewith and transmit this positioning to the wheels of the selected totalizer or totalizers, as the case may be, to enter therein the amount set up on the keyboard. One of the advantages of the use of the type of actuators employed in this machine is that any or all of the totalizers may be simultaneously engaged with the actuators in adding and subtracting operations, so that the amount set up on the keyboard may be entered in any desired number of the totalizers.

In this machine, as in all other machines having a single set of actuators, it is possible to perform a total or sub-total recording operation in only one totalizer at a time. However, such total or sub-total may be simultaneously added to or subtracted from any number of the other five totalizers.

One of the unique features of the present machine is that any totalizer may be selected and conditioned for any type of operation, including non-adding, adding, subtracting, total recording, and sub-total recording, either by means of the traveling carriage in predetermined columnar positions thereof, or by a row of control keys located on the left-hand side of the main keyboard. With this type of mechanism, it is possible to arrange the control mechanism on the traveling carriage so that a complete series of operations involving any number of the totalizers may be performed without the operator's having to bother with the selection of a single totalizer, which makes for speed and efficiency in handling the accounting problems in connection with complex business systems.

As previously explained, there is an overdraft totalizer, which always functions in combination with the balance totalizer, and consequently these two totalizers are always in complementary agreement with each other. As long as the balance totalizer is in a positive condition, said totalizer will be selected in sub-balance and balance operations for recording the sub-total or the total. However, when the balance totalizer becomes overdrawn, mechanism which functions automatically causes the overdraft totalizer to be selected for sub-total or total recording operations in order to record a positive amount or true negative total of the overdraft without any further computations involving multiple cycles of the machine operating mechanism.

In balance of overdraft operations, the amount of the overdraft cleared from the overdraft totalizer is simultaneously added into the balance totalizer to zeroize it. In normal balance operations, when the balance totalizer is in a positive condition, the amount cleared from said balance totalizer is simultaneously added into the overdraft totalizer to zeroize it.

In balance and sub-balance operations, the wheels of the selected totalizer are engaged with the actuators prior to their initial movement and are turned in a subtractive or reverse direction by said actuators to zero position, to position said actuators commensurate with the value of the amount standing on said selected totalizer wheels. In balance operations, the wheels of the selected totalizer are disengaged from the actuators prior to their forward return movement and, as a result, remain zeroized, while in sub-balance operations said wheels remain in engagement with said actuators during their return forward movement and are consequently restored to their original positions.

The amount actuators are connected to corresponding type carriers and position said type carriers in relation to the position of said actuators, either under the control of the amount keys in adding and subtracting operations or under control of the totalizer wheels in sub-total and total recording operations, whereupon functioning of the impression mechanism causes the amount to be recorded upon the record material supported by the platen roll of the traveling carriage. Likewise, the selecting and conditioning mechanism for the totalizers controls the positioning of corresponding symbol type carriers to cause a character symbolic of the type of operation being performed to be printed adjacent the amount on the record material.

The mechanism outlined in general above, which is pertinent to the present invention, will be described in detail in the ensuing pages.

DETAILED DESCRIPTION

Framework

The main framework of the machine embodying this invention comprises a right frame 130 (Fig. 19B) and a left frame 131 (Figs. 8A and 37) secured to a machine base 132 (Fig. 1), said right and left frames being secured in fixed relationship to each other by a cross frame 133 (Figs. 8B and 44) and various other cross frames, rods, and shafts. The totalizers of the machine are mounted in a framework 134 (Fig. 8B) comprising right and left frames and various cross frames, rods, and shafts, said framework 134 being secured to the machine base 132.

The present machine is provided with a laterally shiftable traveling carriage 136 (Figs. 1, 8A, and 8B), which is supported for shifting movement on rails 137 and 138, in turn secured to carriage support frames 139 and 140 secured to the machine base 132. The rail 137 is also secured to the right and left frames and aids in supporting said frames in proper relationship to each other.

The mechanism of the machine is enclosed in a suitable cabinet or case 141 (Fig. 1), which is in turn secured to the machine base 132.

Operating mechanism

The main mechanism of the machine is driven by a conventional type of electric motor, not shown, but disclosed in one or more of the patents referred to at the beginning of this specification, said motor being secured to the lower surface of the machine base. The electric motor is geared to and drives a clutch driving member (not shown) rotatably supported on a shaft 142 (Fig. 4) journaled in the motor framework. Also rotatably mounted on the shaft 142 is a clutch driven member 143 having integral therewith a cam 144 and a gear 145. The clutch driven member 143 has thereon an abrupt shoulder, which is normally engaged by the nose of a clutch control lever 146 secured to a companion lever 147, both of said levers being free on a stud 148 secured in the motor framework. A relatively strong spring 149 is tensioned to urge the levers 146 and 147 in a counter-clockwise or disengaging direction.

Figure 2:
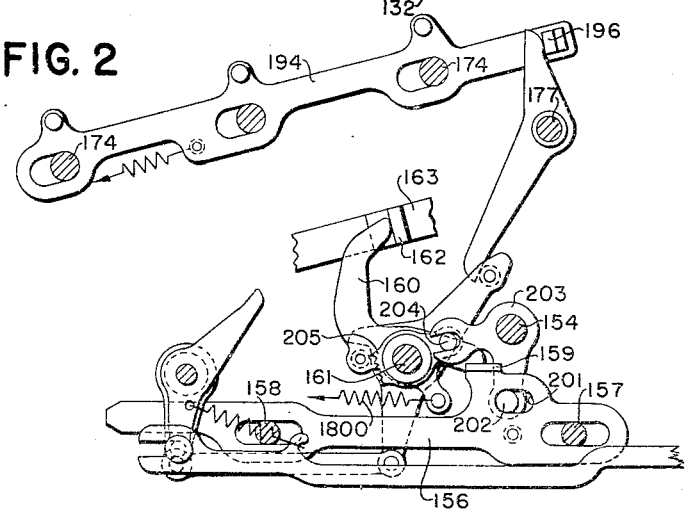
Fig. 2 is a detail view of a portion of the machine releasing mechanism.

An upward extension of the lever 147 has therein a slot which embraces a stud 150 in one end of a link 151, the other end of which is pivoted at 152 to an arm 153 free on a stud 154 secured in the right frame 130. The lower end of the arm 153 is bifurcated to straddle a stud 155 in a release slide 156 shiftably mounted by means of parallel slots therein in cooperation with studs 157 and 158 secured in the right frame 130. The slide 156 (Figs. 2 and 4) has a bent-over ear 159 engaged by a shoulder on a release latch 160 free on a stud 161 secured in the right frame 130. A finger-like upward extension of the latch 160 cooperates with one surface of an extension of a block 162 secured to a release link 163, opposite ends of which are pivoted, respectively, to similar arms 164 and 165 free on studs 166 and 167 secured in a plate 168 (Fig. 6) in turn secured to the main frame by screws 169.

The release link 163 (Figs. 4 and 6) is common to and cooperates with the three starting bars with which the machine is equipped, including a main starting or Release bar 170, a Vertical feed release bar 171, and a Skip tabulating release bar 172. The three release bars are depressibly mounted on the plate 168 (Fig. 6) by means of parallel side edges on the release bars in cooperation with four shoulder bushings 173 mounted on four similar studs 174 secured in said plate 168. The starting bars are retained against lateral displacement by means of washers 175 free on the studs 174 and secured against lateral displacement on said studs by means of spring retaining clips which engage annular grooves in the ends of said studs. The release bars 170, 171, and 172 are slotted to embrace the reduced portions of shoulder bushings 176 free on studs 177 secured in the plate 168, said release bars being retained on the shoulder bushings 176 by washers and retaining clips similar to those used on the studs 174.

Figure 1:
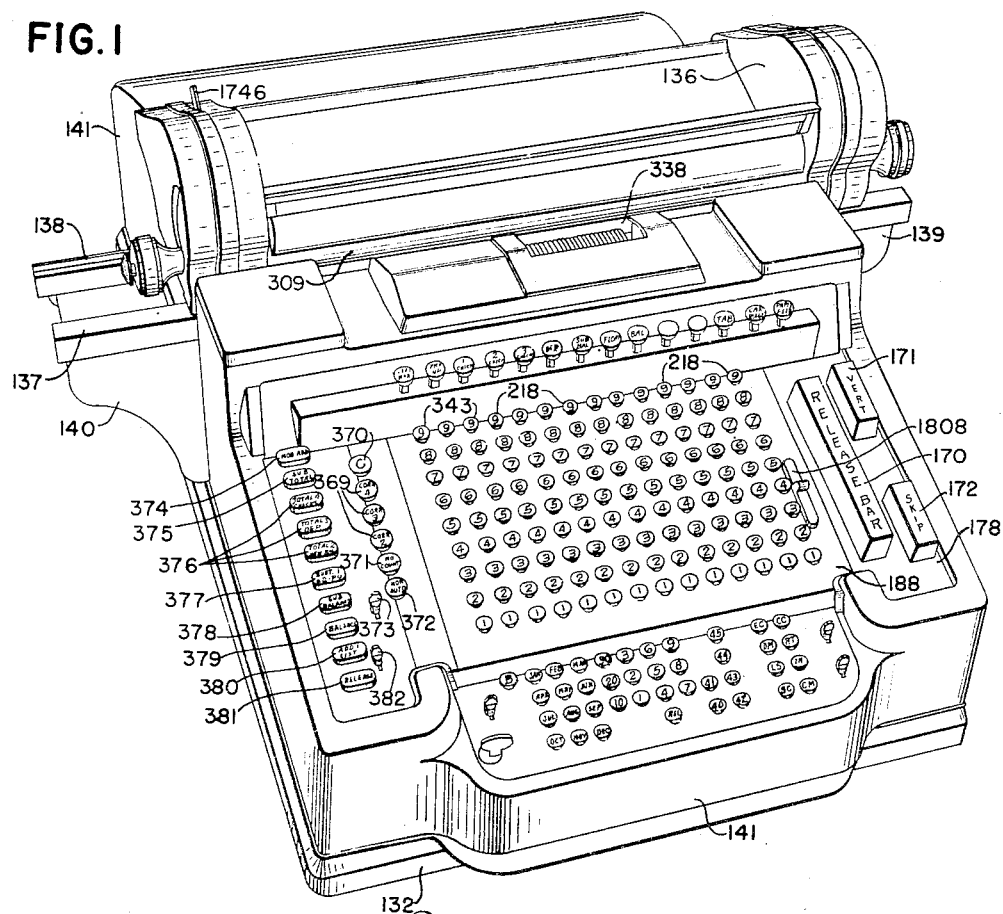
Fig. 1 is a perspective view of the complete machine.

The upper portions of the release bars 170, 171, and 172 are removably connected to the lower parts of said release bars, said upper parts including touch blocks which extend through corresponding openings in a release bar cover plate 178 (Figs. 4 and 6) secured to bent-over ears of the plate 168. The top surface of the cover plate 178 is flush with and forms an extension of the top surface of the amount keyboard top plate, as shown in Fig. 1. The extreme lower ends of the release bars 170, 171, and 172 (Fig. 6) have therein studs 179, which support rollers which in turn engage corresponding slots in the plate 168 to further assist in mounting the release bars for shifting movement on said plate 168. The studs 179 cooperate with fingers on locking plates 180 and 181, the upper ends of which plates are pivoted on two of the studs 174, said locking plates serving to lock any two of the release bars against depression when the other release bar is depressed, in the well-known manner.

Each of the release bars 170, 171, and 172 cooperates with the release link 163 (Fig. 4) in exactly the same manner; therefore it is believed that the description of the manner in which one of these bars—for example, the Skip release bar 172—cooperates with said link will be sufficient.

The release link 163 has secured thereto a block 182 similar to the block 162 having a right-angled extension which cooperates with a stud 183 in a lever 184 pivoted on the left-hand one of the studs 177. A spring 185 urges the lever 184 clockwise to normally maintain a hook-shaped extension on its upper end in contact with a stud 186 in the Skip release bar 172.

Depression of the release bar 172 moves the stud 186 beneath the hook-shaped extension of the lever 184 to release said lever to the action of the spring 185, which immediately urges said lever clockwise, which, through the stud 183 and the block 182, carries the link 163 forwardly or toward the left, as viewed in Fig. 4, in unison therewith. Forward movement of the link 163, by means of the right-angled extension of the block 162, carries the release latch 160 (Figs. 2 and 4) counter-clockwise in unison therewith to disengage the shoulder on said lever from the ear 159 of the slide 156 to release said slide and connected parts to the action of the spring 149. The spring 149, through the levers 146 and 147, the link 151, and the arm 153, immediately shifts the slide 156 forwardly as said levers 146 and 147 move counter-clockwise. Counter-clockwise movement of the lever 146 disengages the rearward end of said lever from the stop shoulder on the clutch driven member 143 to cause said driven member to be engaged with the clutch driving member, in the usual manner. Counter-clockwise releasing movement of the lever 147 causes a stud 190 (Fig. 4) in its lower end to engage a finger of a switch lever 191 to close the motor switch at the same time the clutch driven member 143 is released to cause the main operating motor to drive the machine. The switch mechanism connected to the lever 191 (Fig. 4) is not shown here, but any suitable type of switch mechanism may be used.

As the clutch driven member nears one revolution of movement in a counter-clockwise direction, the cam 144 engages a roller 187 on a downward extension of the lever 147, which, it will be remembered, is fixed to the lever 146, to rock the rearward end of said lever into the path of the shoulder on the clutch driven member 143 to terminate the movement of said driven member and to simultaneously disengage the clutch mechanism. The shape of the cam 144 is such that this clockwise restoring movement of the lever 147, through the link 151 and the arm 153, shifts the slide 156 rearwardly to move the ear 159 beyond the shoulder of the release latch 160 to permit said shoulder to drop behind said ear, and then, when the cam 144 passes out of contact with the roller 186, the spring 149 returns the slide to its normal position, wherein the ear 159 engages the latch 160 to retain said slide and the levers 146 and 147 in disengaged positions, as shown here.

Once the motor switch mechanism, comprising the lever 191, is rendered operative, as explained above, it remains effective and causes the main operating motor, as well as the auxiliary motor for driving the traveling carriage mechanism, to operate continuously until a delayed-action mechanism (not shown), which is operated through a train of gearing connected to the main operating motor, shuts off or restores said switch mechanism, after said motor has run a certain interval of time without the machine's having been operated by release of the clutch mechanism, as explained above. Each time the clutch driven member 143 makes a revolution, the cam 144, in cooperation with mechanism not shown, restores the delayed-action mechanism to initial position.

Mechanism similar to that described above for the release bar 172 (Fig. 4) is provided for the release bars 170 and 171, for initiating operation of the machine.

Mechanism shown in Figs. 4, 5, and 43 is provided for locking the release bar 172 against depression unless certain conditions have been fulfilled.

This mechanism includes an arm 192 free on the left-hand stud 174, said arm being bifurcated to embrace the stud 186, which, it will be recalled, is in the stem of the release bar 172. The arm 192 has an upward extension which cooperates with a stud 193 in a locking bar 194 slidably mounted by means of three similar slots therein in cooperation with three of the studs 174, as shown here. The spring 185 (Figs. 4 and 5), which is tensioned between the arm 192 and the lever 184, urges said arm 192 counter-clockwise, causing said arm, in cooperation with the stud 186, to urge the release bar 172 upwardly to undepressed position, as shown here. A spring 195 is tensioned to urge the bar 194 forwardly to normally maintain the stud 193 in engagement with the upward extension of said arm 192.

The bar 194 (Fig. 43) carries a block 196 on its rearward end, having a stop shoulder which cooperates with three stop pawls 197, 198, and 199, pivoted on a stud 200 in the plate 168. The pawl 197 is controlled by the journal sheet feeler mechanism, and, when a journal sheet is not properly inserted around the platen roll, this pawl is brought into the path of the stop shoulder on the block 196 to obstruct rearward movement of the bar 194 to prevent clockwise movement of the arm 192, which in turn prevents depression of the release bar 172. The stop pawl 198 is controlled by the amount and item counting keys, and, when any one of these keys is partially depressed, the pawl 198 is brought into the path of the shoulder on the stop block 196 to obstruct rearward movement of the bar 194, thereby preventing depression of the release bar 172 and thus preventing operation of the machine when an amount key is in a partially depressed position. The stop pawl 199 is controlled by the traveling carriage, and, unless said carriage is in a columnar position, this pawl remains in the path of the shoulder on the block 196 to obstruct releasing rearward movement of the bar 194 to prevent operation of the machine when the traveling carriage is not properly located in a columnar position.

When the release bar 172 (Figs. 4 and 5) is depressed, the hook-shaped upper end of the lever 184 latches over the stud 186 to retain said bar in depressed position. The restoration of the lever 184, under influence of the release link 163, as will be explained presently, moves the hook-shaped upper end of said lever out of the path of the stud 186 to permit the spring 185 to restore the motor bar 172 upwardly to undepressed position. Mechanism similar to that described above is provided for locking the release bars 170 and 171 against depression when any one of the pawls 197, 198, or 199 is effective.

Mechanism operated by the slide 156 (Figs. 2 and 4) is provided for restoring the link 163 rearwardly to normal position, to release the depressed release bar 172.

The slide 156 has therein a slot 201, through which extends a stud 202 in one arm of a bell crank 203 free on the stud 154. The bell crank 203 is bifurcated to embrace a stud 204 in a link-restoring arm 205 free on the stud 161.

Forward movement of the slide 156, as explained above, when the machine is released for operation, has no effect upon the arm 205, due to the clearance in the slot 201. However, return movement of said slide, beyond the normal position under action of cam 144, causes said slot 201, in cooperation with the stud 202, to rock the bell crank 203 counter-clockwise to in turn rock the restoring arm 205 clockwise, causing the finger-shaped upper end of said arm 205, in cooperation with the extension of the block 162, to shift the link 163 rearwardly or toward the right, as viewed in Fig. 4. Rearward restoring movement of the link 163 causes said link to rock the hook-shaped lever 184 counter-clockwise to move the upper end of said lever out of the path of the stud 186 to permit the release bar 172 to be spring-returned upwardly to undepressed position, in the manner explained earlier herein. Restoring movement of the release bar 172 (Fig. 4) and the arm 192 permits the spring 195 to restore the locking bar 194 forwardly to normal position, as shown here.

A spring 206 (Fig. 4), tensioned between the arm 205 and the latch 160, urges said parts counter-clockwise and clockwise, respectively, to normally maintain an enlarged portion of said arm 205 in contact with a stop stud 207 in the plate 168 and to cause the shoulder on the latch 160 to engage the ear 159 when the slide 156 is returned rearwardly near the end of machine operation, as explained earlier herein, to normally hold said slide in untripped position, as shown here.

Mechanism is provided for preventing repeat operations of the machine in case the starting bar 172 is inadvertently retained depressed at the end of machine operation. This mechanism is shown best in Figs. 4 and 5 and comprises a shoulder 209 on the lever 184, which shoulder cooperates with a tooth on a latch 210 free on the stud 174 and urged clockwise by a spring 211 tensioned between said latch 210 and a stud 212 in the arm 192, to normally maintain an extension of said latch in contact with said stud 212.

When the bar 194 is in its forward or normal position, as shown here, the stud 212, in cooperation with the upward extension of the latch 210, maintains the tooth of said latch out of engagement with the upper end of the lever 184. Downward movement of the stud 186 (Figs. 4 and 5), when the release bar 172 is depressed, rocks the arm 192 clockwise, as explained before, to withdraw the stud 212 from the latch 210 to free said latch for clockwise movement under influence of the spring 211. If the release bar 172 is retained depressed at the end of machine operation, return counter-clockwise movement of the lever 184 under influence of the link 163, as explained above, permits the tooth of the latch 210 to engage the shoulder 209 to secure said lever in its restored position, thereby preventing said lever from again shifting the release link 163 forwardly to initiate operation of the machine, in the manner described earlier herein. Withdrawal of the pressure from the release bar 172 permits the spring 195 to restore said bar 172 and the arm 192 upwardly to move the stud 186 into the path of the hook-shaped end of the lever 184, and to cause the stud 212 to engage the shoulder of the latch 210 to rock said latch out of engagement with the shoulder 209 on said lever 184.

The release bars 170 and 171 (Fig. 4) have non-repeat mechanism exactly like that described for the release bar 172, to prevent repeat operations when these bars are inadvertently retained in depressed position at the end of machine operation.

The gear 145 (Fig. 4), which forms a part of the clutch driven member, meshes with an idler gear 213 free on a stud 214 secured in the motor framework, said gear 213 in turn meshing with a cam shaft drive gear 215 secured on a main cam shaft 216 journaled in the main framework of the machine. As explained previously, the clutch driven member, including the gear 145, makes one counter-clockwise revolution each machine operation and, through the idler gear 213, drives the gear 215 and the main cam shaft 216 one revolution counter-clockwise, said main shaft in turn driving the main mechanisms of the machine proper to cause said mechanism to function.

Keyboard in general

By referring to Fig. 3, which is a diagrammatic plan view of the keyboard, it will be seen that, in the present construction, there are eleven rows of amount keys 218 and three rows of item counting keys 343, which are similar in every respect to the amount keys and, together with said amount keys, are mounted in a removable keyboard framework. To the immediate left of the item counting keys 343 is a row of correction keys 369 to 372 inclusive, used in correcting errors in certain of the totalizers and for controlling other functions of the machine. Located to the left of the correction keys is a row of control keys 374 to 381 inclusive for controlling the various functions of the totalizers, said control keys including a Release key for releasing any of the keys of the main keyboard, including the amount, item counting, correction, and control keys.

Located immediately above the amount and item counting keys is a row of carriage control keys for controlling the column selecting feature of said traveling carriage and for controlling the opening and closing of the front-feed throat and the rotation of the platen roll to line-space the record material.

Located beneath the amount keyboard is an auxiliary keyboard including Month keys 383, Tens of Days keys 384, Units of Days keys 385, Year keys 386, Symbol Printing keys 390, a Black key 393 for controlling the printing of the bi-chrome inking ribbon, and a Release key 395 for releasing any of the keys of the auxiliary keyboard. The main and auxiliary keyboards also include various locks for controlling the depression and releasing of certain keys.

The machine releasing bars 170, 171, and 172, which are located on the right of the main keyboard, have associated therewith a selectively controlled mechanism for controlling certain functions of the machine and the traveling carriage, and the operation of this selectively controlled mechanism may be varied by means of a manually positionable control slide 1000, mounted on the main keyboard between the Release bar 170 and the first row of amount keys 218.

Amount keyboard

The structure and the functioning of the amount keyboard of the machine embodying the present invention are similar in every respect to the amount keyboard of the machine disclosed in the United States patent to Paul H. Williams et al., No. 2,189,851, and for that reason will be but briefly described herein.

The amount keyboard comprises a plurality of denominational rows of amount keys 218 and three rows of item keys 343 (Figs. 1 and 3), mounted in a keyboard framework comprising a top plate 188 (Figs. 7 and 8A) and a partition plate 189 for each denominational row, said partition plates being secured to said top plate. Each of the partition plates 189 has therein a slot which engages a bar 245 supported by a rod 208 secured in the main frames 130 and 131, said slots in said partition plates likewise engaging corresponding annular grooves in said rod 208. Each of the partition plates 189 has therein a notch adapted to engage a corresponding annular groove in a front rod 217 supported by the frames 130 and 131. The amount keyboard top plate 188 rests on angular surfaces formed on the main frames 130 and 131 and is secured in position by means of a locking mechanism. Releasing of the locking mechanism permits the amount keyboard to be removed from the machine as a unit, in case it is necessary or desirable.

Each of the partition plates 189 supports one denominational row of the amount keys 218, and, as the mechanism is substantially duplicated in each order, it is believed that a description of the mechanism associated with the denominational order shown in Figs. 7 and 8A will be sufficient.

The upper ends of the stems of the amount keys 218 for the denominational order shown in Figs. 7 and 8A are slidably supported in a slot formed by ears bent out of the upper edge of the partition plate 189, while the lower ends of the stems of said keys are slidably supported by means of square studs 219 secured in said stems and extending through corresponding slots in said partition plate 189. A bar 220, secured to the partition plate 189, extends across the lower ends of the stems of all the amount keys 218 to retain said keys against displacement upon said partition plate 189. Each of the amount keys 218 carries a stud 221, which overlies the coils of a spring 222, which extends the full length of the partition plate 189 and the opposite ends of which are anchored to studs in said plate, said spring 222 in effect being laced around said studs 221 and a plurality of studs 223 secured in said partition plate 189. The spring 222, in cooperation with the studs 221, urges the keys 218 upwardly to undepressed position, as shown here, and immediately restores said keys to upward position when they are released after having been depressed.

The studs 221 in each one of the keys 218 extend through corresponding openings in a locking plate 224 (Fig. 8A), said openings having therein teeth which cooperate with said studs to lock the keys in undepressed position during machine operation. The studs 221 likewise extend through corresponding openings in a detent plate 225, said openings having therein teeth which cooperate with said studs to retain the keys in depressed position. The studs 221 also extend through corresponding openings in a control plate 226, said openings having angular camming surfaces which are acted upon by said studs to shift said control plate forwardly upon depression of an amount key. The plates 224, 225, and 226 are supported for horizontal shifting movement between rollers mounted on four studs 227 secured in the partition plate 189. A spring 228, tensioned between the plates 225 and 226, urges said plates forwardly and rearwardly, respectively, to maintain projecting nibs on the upper edges of said plates in contact, respectively, with a corresponding arm 229, secured in a slotted shaft 230, and a corresponding arm 231 secured in a slotted shaft 232, both of said shafts being rotatably supported in the keyboard framework.

A spring 233 (Fig. 8A) maintains an upward projection of the locking plate 224 in contact with a corresponding arm 234 secured in a slotted shaft 235 inturn journaled in the keyboard framework.

Depression of any one of the amount keys 218 (Fig. 8A) causes the stud 221 to by-pass the tooth in the corresponding opening in the detent 225, whereupon the spring 228 returns said detent forwardly to move said tooth over the stud to retain the key in depressed position against the action of the spring 222 (Fig. 7). Near the end of adding and subtracting operations, the shaft 230 is rocked counter-clockwise, causing the arm 229, in cooperation with the nib on the detent 225, to shift said detent rearwardly against the action of the spring 228 to release the depressed amount key so that it may be returned upwardly by the spring 222 to undepressed position. Near the beginning of machine operation, the shaft 235 is rocked clockwise and, by means of the spring 233, shifts the locking plate 224 rearwardly to move the teeth therein beneath the studs 221 of the undepressed amount keys 218 to lock said keys against depression during machine operation. Near the end of machine operations, the shaft 235 is returned counter-clockwise to move the locking plates 224 to ineffective positions, as shown here.

Depression of any one of the amount keys 218 causes the stud 221 therein, in cooperation with the angular camming surface in the corresponding opening in the control plate 226, to shift said plate forwardly against the action of the spring 228. Forward movement of the control plate 226 causes the forward end thereof, in cooperation with an upward extension of a zero latch 236 free on a stud 237 in the partition plate 189, to rock said latch counter-clockwise. The upward extension of the zero latch is held in contact with the forward end of the control plate means of a spring 238 tensioned between the upward extension of said latch and the control plate 226. Counter-clockwise movement of the zero latch 236 moves a tooth thereon out of engagement with a block 239 secured to an actuator 240 for this denominational row of keys, said actuator being supported for horizontal shifting movement in a corresponding slot in the rod 208, and in a corresponding slot in a rod 241 supported by the main frames 130 and 131. The bar 245, which is secured to the rod 208, overlies a horizontal surface formed by an opening in the forward end of the actuator 240 to retain said actuator in the corresponding slot in said rod 208.

As is well known, the zero latch 236 overcomes the necessity for providing a zero key and, in cooperation with the block 239, holds the actuator 240 in zero position when no amount key 218 is depressed. Obviously, depression of any of the amount keys 218 moves the zero latch 236 to ineffective position to free the actuator 240 for actuating movement back and forth, as will be explained later.

*Amount actuators*

The actuator 240 is connected, by a pivotal and adjustable connection 242 (Figs. 8A and 8B) to a corresponding auxiliary actuator rack 243 mounted for horizontal shifting movement by means of three parallel slots therein, in cooperation with three slotted bars 244 secured in the totalizer framework 134. The rack 243 has three sets of teeth on its top edge and three sets of teeth on its bottom edge, which cooperate, respectively, with the corresponding denominational wheels of the No. 1 to No. 6 totalizers inclusive.

The actuator 240 has therein a vertical slot 247, which engages a stud 248 in a reducer arm 249 free on a shaft 250 journaled in the frames 130 and 131, and said arm 249 is connected by tapered arms to a corresponding segment 251 also free on said shaft 250. A spring 252 normally maintains a surface 253 of the arm 249 in contact with an actuator restoring bar 254 (Figs. 8B and 45) extending between two similar arms 255 secured to the shaft 250. The spring 252 is tensioned between a bent-over ear on the arm 249 and a hook plate 256 secured to the restoring bar 254.

Secured on the left-hand end of the shaft 250 (Fig. 45) is an arm 257 having therein a slot 258, which cooperates with a roller 259 mounted on a cam lever 260 pivoted on a stud 261 in the left frame 131. The lever 260 carries rollers 262 and 263, which cooperate, respectively, with the peripheries of companion plate cams 264 and 265 secured on the main cam shaft 216 and driven thereby one clockwise revolution, as viewed in Fig. 45, or one counterclockwise revolution, as viewed in Fig. 8A. Revolution of the cams 264 and 265 causes the roller 259, in cooperation with the slot 258, to rock the shaft 250 and the restoring bar 254 first counter-clockwise and back to normal position, as viewed in Fig. 8A, according to the time given in space 1 of the time chart, Fig. 47.

Depression of one of the amount keys 218 (Fig. 8A), as explained previously, shifts the control plate 226 forwardly to rock the zero latch 236 out of engagement with the block 239 to free the actuator 240 for rearward movement under influence of the restoring bar 254 and simultaneously moves the square stud 219 in said depressed key into the path of the corresponding one of a series of graduated steps 266 on the top surface of the actuator 240. Initial counter-clockwise movement of the bar 254 (Fig. 8A), by means of the spring 252, carries the arm 249, the actuator 240, and the corresponding rack 243 rearwardly in unison therewith until the step 266 comes into contact with the stud 219 of the depressed key 218 to position said actuator, said arm 249, and said rack 243 commensurate with the value of the depressed key.

By referring to Fig. 8A, it will be noted that there is no corresponding step on the actuator 240 for the stud 219 for the 9 key, depression of which key releases the zero latch and permits the actuator 240 to travel full distance toward the rear until a shoulder 267 engages the rod 208 to position said actuator and the rack 243 in 9 position.

After the actuator 240 has been positioned under influence of the depressed key 218 and after the leading bar 254 has completed its initial movement (Figs. 8A and 45), an alining bar 268 is engaged with the corresponding one of a series of alining notches 269 in the periphery of a segmental portion of the arm 249 to aline said arm, the actuator 240, and the rack 243 in set positions. The alining bar 268 extends between right and left arms 270 (only the left arm being shown here) journaled on diametrically opposed trunnion studs 271 in the frames 130 and 131. The left arm 270 has therein a slot 272, which cooperates with a roller 273 in the lever 260, the movement of which, under influence of the cams 264 and 265, rocks the arms 270 and the alining bar 268 upwardly and back to normal position according to the time given in space 2 of the time chart (Fig. 47).

The movement of the alining bar 268 is timed to engage the tooth space 269, corresponding to the depressed key 218, after the restoring bar 254 has completed its initial movement counter-clockwise. While the alining bar 268 is thus engaged with the tooth space 269, a printer mechanism functions to cause the value of the depressed amount key to be recorded. After the impression, in a manner described hereinafter, has been made and prior to return forward movement of the actuator 240, the alining bar 268 is disengaged from the arm 249 and remains thus disengaged at the end of machine operation.

When the lever 260 (Fig. 45) is in home position, as shown here, a stud 274, carried thereby, engages a notch in the arm 257 to secure said arm, the shaft 250, the restoring bar 254, and the arm 249 (Fig. 8-A) in home position.

*Printing mechanism*

The printing mechanism of the machine embodying the present invention includes a type carrier 275 for each row of amount keys 218 (Figs. 3 and 8-A), a type carrier for each row of item counting keys 343, four date type carriers for the date keys 383 to 386 inclusive, a type carrier for the list keys 390, and two symbol type carriers, which are controlled by the totalizer selecting mechanism for recording symbols indicative of the type of operation being performed.

The type carriers, in addition to being positionable under influence of their corresponding keys and controlling mechanisms, are also mounted in a framework which is rockable from a normal or reading position, in which said type carriers are positioned so as not to obstruct the view of the printing line, to printing position, in which said type carriers are in operating relation with the impression mechanism.

Inasmuch as all of the type carriers are of a similar construction, are positioned under influence of their corresponding keys in a similar manner, and are similarly mounted in the rockable framework, it is believed that a detailed description of the type carrier 275 associated with the amount bank shown in Figs. 8-A and 8-B, and described herein as representative of all the amount banks, will be sufficient to provide a satisfactory disclosure of this mechanism.

Referring now to Figs. 8-A, 9, and 11, a right-hand extension of the segment 251 is connected by a link 276 to an arm 277 free on a tie rod 278, which, together with companion tie rods 279, secures a plurality of guide plates 280, one for each type carrier, and right and left side plates 281 into a rockable framework for supporting all the type carriers. The side plates 281 are rockably connected by screw studs 282 to the right and left main plates of a printer framework 283. The framework 283 is removably mounted in the machine by means of slotted studs 284 in cooperation with locking notches in said right and left plates, said studs being secured in a cross frame 285 mounted between the main frames 130 and 131, and by means of bent-over ears on said main plates, which are secured to the traveling carriage rail 137 by screw studs.

The arm 277 (Figs. 8-A and 11) carries a stud 287, which engages a slot 288 in the main portion of the type carrier 275, said main portion also having therein two studs 289, which engage a slot 290 in the guide plate 280 by means of which said type carrier 275 is mounted for substantially vertical positioning movement under influence of the segment 251 and the actuator 240, as will be explained in detail later.

The sides of the upper portion of the main part of the type carrier 275 are formed over and slotted to support a plurality of type bars 291 for printing movement, said bars being held in place in said slots by a cover plate 292 (Figs. 8–A and 9), which is secured to the body portion of said type carrier 275. Fig. 12, which is an enlarged cross section view of the type carrier, taken along line 12—12 in Fig. 11, shows the manner in which the type bars 291 are mounted in the slots in the body portion of said type carrier. The type bars 291 are undercut, as shown in Fig. 12, to provide clearance for a spring 293, said spring being substantially of inverted V-shape, one bar of which is anchored to the body portion of the type carrier 275 and the other bar being free and adapted to engage shoulders formed by the undercut portions of said type bars to urge said bars toward the left, as viewed in Fig. 11, away from printing position. The spring 293 is comparatively weak, and its tension is easily overcome by the printing hammer when an impression is made. An upward extension (Figs. 11 an 12) of the guide plate 280 cooperates with shoulders 295 formed on the left-hand ends of the type bars 291 to insure that all type bars below the printing line are fully retracted and retained thus when the type carrier framework is moved to and from printing position.

The right and left end plates 281 (Figs. 8–A, 9, 10, and 11) carry similar studs 296, which cooperate with their respective slots 297 in two similar arms 298 and 299 secured on a printer shaft 300 journaled in the printer framework and in the right frame 130. Secured on the right-hand end of the shaft 300 (Fig. 9) are similar cranks 301 having extending therebetween a stud 302 engaged by a slot in the upper end of a cam lever 303 pivoted on a stud 304 secured in the right frame 130. The upper end of the lever 303 fits snugly between the cranks 301 to prevent lateral displacement of said lever. The lever 303 (Fig. 9) carries rollers 305 and 306, which cooperate, respectively, with the peripheries of companion plate cams 307 and 308, secured on the main cam shaft 216.

Counter-clockwise revolution of the cams 307 and 308 through the lever 303 rocks the shaft 300 and the arms 298 and 299 first clockwise and then back to normal position according to the time given in space 19 of the chart, Fig. 47. Initial clockwise movement of the arms 298 and 299 causes the slots 297 therein, in cooperation with the studs 296, to rock the plates 281 and the type carrier 275 also in a clockwise direction to move said type carrier into printing relationship with a platen roller 309 supported by the traveling carriage 135 (Figs. 8–A, 8–B, 9 and 11) prior to initial rearward movement of the actuator 240. After the type carrier 275 has been moved into printing relationship with the platen 309, the actuator 240, in its initial rearward movement, during which movement said actuator is positioned by the depressed amount key 218 (Fig. 8–A), as explained earlier herein, moves the reducer arm 249 and the segment 251 in unison therewith. This positions the type carrier 275 in agreement with the position of the actuator 240 to move the type bar 291, corresponding to the depressed amount key 218, from normal or reading position into register with the printing line and with the corresponding impression hammer.

After the type carrier 275 has thus been positioned, an aliner mechanism, shown best in Fig. 10, functions to secure said type carrier in set position. The amount type carrier 275 (Figs. 8–A and 10) has alining notches 310 adapted to be engaged by an alining bar 311 extending between two similar arms 312 rotatably supported on trunnion studs 313 secured in the printer framework 283. Each of the arms 312 (Figs. 8–A and 10) carries a stud 314, which cooperates with a corresponding control surface 315 on each of the arms 298 and 299.

After the type carrier 275 has been positioned by the actuator 240, as explained above, continued rotation of the cams 307 and 308 (Fig. 9) imparts further clockwise movement to the arms 298 and 299 to cause the control surfaces 315 to move beyond the studs 314 to release the arms 312 to the action of springs 316, which immediately rock said arms counter-clockwise, according to the time given in space 22, Fig. 47, to engage the alining bar 311 with the corresponding alining notch 310 to aline the type carrier 275 in set position, while an impression hammer 317 (Figs. 8–A and 9) makes its printing stroke, to insure that the value of the depressed amount key 218 is properly recorded on the record material supported by the platen roll 309.

After printing has been effected, continued rotation of the cams 308 and 307 returns the arms 298 and 299 (Figs. 9 and 10) counter-clockwise, causing the control surfaces 315 to engage the studs 314 to rock the alining bar 311 out of engagement with the alining notch 310. During the time that the aliner 311 is being engaged and disengaged, as explained above, the studs 296 ride in the concentric upper portions of the slots 297 and consequently impart no further rocking movement to the type carrier 275 at this time. After the actuator 240 (Fig. 8–A) has been returned forwardly to normal position (compare spaces 1 and 19 of the chart, Fig. 47), continued return counter-clockwise movement of the arms 298 and 299 causes the lower portions of the slots 297, in cooperation with the studs 296, to rock the type carrier 275 counter-clockwise from printing position, as shown in Fig. 11, to normal or reading position, as shown in Fig. 9.

An auxiliary alining bar 318 (Fig. 10) is supported between the arms 312 beneath the main alining bar 311 and is used to aline the month type carrier, which has twelve type bars and alining notches instead of the usual ten bars and notches, as have the amount type carriers 275, thereby making it necessary to extend the lower end of said month type carrier downwardly to accommodate the two extra alining notches. This change in the number and the location of the alining notches for the month type carrier makes it necessary to provide the auxiliary alining bar 318 to properly aline the month type carrier in all of its positions.

*Impression hammers*

After the type carrier 275 (Fig. 8–A) has been rocked from reading position to printing position, and after said type carrier has been positioned under influence of the actuator 240, the impression hammer 317 for the order shown here is released to the action of its spring, which causes said hammer to strike the type bar 291 corresponding to the position of the actuator 240 to record the value of the depressed amount key 218 upon the record material supported by the platen roll 309.

The hammer 317 (Figs. 8–A and 9) is free on the printer shaft 300 and is urged clockwise or in a printing direction by a comparatively strong spring 320. Normally the hammer 317 is held against such printing movement by a projecting tooth 321 on its lower end, in cooperation with the bent-over upper edge of a hammer latch plate 322 pivoted on a rod 323 supported in the printer framework 283. All of the printing hammers, which are similar to and function exactly like the hammer 317, have projections which are engaged by the bent-over upper edge of the latch 322 in exactly the same manner as said hammer 317.

When the actuator 240 is in zero position, as shown in Fig. 8-A, a projection 324 on the hammer 317 is engaged by the tooth of zero elimination pawl 325 pivoted on a rod 326 supported in the printer framework. A spring 327 is tensioned to urge the pawl 325 clockwise to normally maintain the tooth of said pawl in engagement with the projection 324.

Movement of the actuator 240, the arm 249, and the segment 251 away from zero position causes a stud 328, carried by said segment 251, in cooperation with an arcuate surface 329 on a tail of the pawl 325, to rock said pawl counter-clockwise against the action of the spring 327 to move said pawl out of engagement with the projection 324 to free the hammer 317 for printing movement. When no key 218 is depressed (Fig. 8-A) in adding or subtracting operations, the actuator 240 and connected parts remain in zero position, as shown here, and in this case the zero elimination pawl 325 remains effective, as shown here, to prevent printing movement of the hammer 317 when the latch 322 is released, as will be explained presently. The pawl 325 has in its upper end a stud 330, which lies in the path of a corresponding stud carried by the next lower order zero elimination pawl, and movement of said pawl 325 carries its lower order neighbor in unison with it, so that the zeros in all lower orders will print when a key is depressed in a higher order.

There are various controls exercised over the zero elimination pawls 325 for controlling the printing of a "clear signal," for controlling the printing of a minus sign when the Subtract key is used to initiate subtract operations, and for splitting the amount keyboard into several groups, often referred to as the "split-normal" mechanism for utilizing the amount keyboard for the printing of various data other than amounts. The above-referred-to mechanisms for controlling the zero elimination pawls are fully disclosed in the Williams et al. Patent No. 2,189,851.

After the zero elimination pawl 325 has been moved to ineffective position, initial movement of the cams 307 and 308 (Fig. 9 and space 19, Fig. 47) rocks the printer shaft 300 clockwise, as explained before, to move a hammer restoring rod 331, which overlies all of the hammers 317 and is supported by two similar cranks 332 secured to said shaft 300, in unison therewith to withdraw said restoring rod 331 from said hammer, so as not to interfere with its printing movement. The arms 298 and 299 (Figs. 10 and 11) move in unison with the shaft 300, causing a downward projection 333 on said arm 298 to engage a stud 334 in a plate 335, secured to the latch 322, to rock said plate and said latch counter-clockwise against the action of a spring 336 to disengage said latch from the tooth 321 (Fig. 8-A). This releases the hammer 317 to the action of the spring 320, which drives said hammer in a clockwise or printing direction, causing a beak 337 on its upper end to strike the selected type bar 291 and drive said type bar and an inking ribbon 338, interposed between said type bar and the platen roll 309, into contact with the record material supported by said platen roll, to record the value of the depressed key 218 upon said record material.

Return movement of the cams 307 and 308 (Fig. 9) returns the shaft 300, the arms 298 and 299, and the restoring rod 331 counter-clockwise, causing said restoring rod to pick up and return the operated hammer 317 counter-clockwise in unison therewith to normal or cocked position. During this return movement, the teeth 321 bypass the bent-over upper edge of the latch 322, which latch retains said hammer in cocked position.

The printing and restoring movements of the hammer 317 are depicted graphically in space 20 of the chart, Fig. 47.

The upper end of the hammer 317 (Figs. 8-A and 11) rides in a corresponding guide slot in a guide bar 339 supported by the side plates of the printer framework 283.

The printing movement of the hammer 317 is abruptly terminated by a projection 340 on the upper end thereof striking the guide bar 339, and, as this occurs just before the type bar 291 strikes the record material, any rebounding of the hammer will not be transmitted to the type bar 291 and thereby cause a blurring of the printed record. From this it is evident that the printing movement of the hammer 317 is terminated before the type bar 291 actually contacts the record material, and the momentum of said bar is relied upon to complete its impression stroke.

*Correction and control key banks*

Directing attention to Figs. 1 and 3, located on the left-hand side of the main keyboard are a row of correction keys and a row of control keys, the correction row including three Correction keys 369, for use in making corrections in the balance totalizer and in the Nos. 2, 3, and 4 totalizers; a Control key 370, which, when used in conjunction with any of the Correction keys 369, causes the Nos. 1, 5, and 6 totalizers to be non-added; a No-Count key 371, which, when depressed, causes the actuators for the three rows of item counting keys to be retained in zero position; and a Non-Auto key 372, which, when depressed, disables the automatic operating feature of the machine under influence of the traveling carriage in columnar positions thereof. A locking lever 373, used in conjunction with the Non-Auto key 372, locks said key in depressed position so that said key will not be released automatically at the end of machine operation.

The row of control keys includes a Non-Add key 374; a Sub-Total key 375; three Total keys 376 for the Nos. 2, 3, and 4 totalizers, respectively; a Subtract-1 key 377; a Sub-Balance key 378; a Balance key 379; an Add-1 List key 380; and a Release key 381. A locking lever 382 is provided for locking the Add-1 List key in depressed position so that this key will not be automatically released at the end of machine operation.

The keys 369 to 372 inclusive of the correction bank (Figs. 1, 3, 19-B, 28 and 29) are mounted in corresponding slots in a bent-over portion of a control key plate 398, while the control keys 374 to 381 inclusive are mounted in corresponding slots in a bent-over portion of a similar left-hand plate 399, said plates being connected together by sleeves 400, said sleeves in turn fitting over guide studs secured in the left frame 131, and said plates being secured in place by long screws 401 (Fig. 19-B), which thread into said studs. The control key bank framework, comprising the plates 399 and 398, is further secured in place by means of bent-over feet on extensions of the plate 399 (Figs. 19-B and 29), said feet being secured to the machine base 132. Further, assisting the slots in the bent-over portions of the plates 398 and 399 in supporting the keys in the correction and control banks are bars 402 and 403 (Fig. 29), secured to their respective plates 398 and 399, said bars having corresponding slots engaged by the lower ends of the keys of their respective correction and control banks.

A long coil spring 404 (Fig. 28), laced alternately between studs in the stems of the correction keys and studs in the plate 398, urges said keys upwardly to undepressed positions, whereby depressed correction keys are restored to and retained in undepressed positions upon being released. A coil spring 405 (Fig. 26), wound alternately between studs in the stems of the keys of the control bank and studs in the plate 399 (Fig. 29), is tensioned to restore said keys to undepressed position and retain said keys thus when they are released either automatically or manually. Each of the Control keys 376, 378, and 379 (Figs. 19-B and 26) carries a square stud 406, which extends through a corresponding opening in the plate 399, said studs cooperating with locking plates 407 in the usual manner to prevent the depression of more than one of these keys at one time.

Each of the keys 369 to 372 (Figs. 14 and 29) in the correction bank carries a stud 410, which extends through a corresponding opening in a detent 411 and cooperates with a corresponding tooth 412 formed in said opening. Likewise, each of the Control keys 374 to 380 inclusive in the control bank (Figs. 3, 14, and 19-B) has secured in its stem a stud 413, which extends through a corresponding opening in a detent 414 and cooperates with a corresponding tooth 415 in said opening. The detent 414 is supported for horizontal shifting movement on rollers in turn mounted on four studs 416, secured in the plate 399. The detent 411 for the correction keys is supported for horizontal shifting movement in exactly the same manner as the detent 414.

The detent 414 for the Control keys (Figs. 14 and 19-B) has on its upper edge gear teeth, which cooperate with a segmental pinion 417 secured on one end of a shaft 418 journaled in the plates 398 and 399 (Fig. 29). Secured on the other end of the shaft 418 is a similar segmental pinion 419, which cooperates with teeth in the top edge of the detent 411 for the correction keys, to connect said detents 414 and 411 for unitary shifting movement. A spring 427 (Fig. 19-B) urges the detents 414 and 411 forwardly in the usual manner.

Depression of any one of the keys of the control bank or of the correction bank causes the stud 413 or 410 therein, in cooperation with the corresponding tooth 415 or 412 (Fig. 14) of the corresponding detent 414 or 411, to shift said detent rearwardly until said pin moves beyond said tooth, whereupon the spring 427 returns said detent forwardly to move the tooth over the flattened upper surface of the stud 413 or 410 in the depressed key to latch said key in depressed position.

When a key is depressed, either in the control bank or in the correction bank, any depressed key in the other bank is simultaneously released, due to the concerted rearward movement of the detents 414 and 411.

*Key releasing mechanism*

The detent 411 (Fig. 14) for the bank of correction keys has a downward projection 455, which cooperates with a stud 456 in an upward arm of a lever 457 free on a shaft 458 journaled in the left frame 131. Another arm of the lever 457 has an angular surface 459, which cooperates with a roller 460 mounted on a stud 461 in a plate cam 462 secured on the main cam shaft 216. The plate cam 462 fits snugly but freely between the arm having the surface 459 and an extension 463 of the lever 457 to maintain said lever 457 in proper relationship to said cam.

Near the end of machine operation, the roller 460 (Fig. 14), cooperating with the surface 459, according to the time given in space 15 of the chart (Fig. 47), rocks the lever 457 counter-clockwise, causing the stud 456, in cooperation with the projection 455, to shift the detent 411 and its companion detent 414 rearwardly against the action of the spring 427 to release any depressed keys in the correction bank or in the control bank.

The keys of the correction and control banks may likewise be released manually, when desired, by depression of the Release key 381 (Fig. 14). Depression of said Release key causes a stud 452 therein, in cooperation with an angular camming surface 453 on the detent 414, to shift said detent and its companion detent 411 rearwardly to manually release any depressed keys of the correction and control banks.

Mechanism operated by the lever 457 (Figs. 14, 15, and 17) also shifts the detents for the amount keys and the item-counting keys rearwardly to release any of said keys that are depressed at the end of adding and subtracting operations.

A finished surface on the lever 457 cooperates with a stud 464 in a lever 465 secured on the shaft 458. Also secured on the shaft 458 is an arm 466 having a stud 467, which engages a slot in an arm 468 free on a stud 469 in the left frame 131. The upper end of the arm 468 cooperates with a stud 470 in a crank 471 secured on the left-hand end of the zero latch throwout shaft 232 (see also Fig. 8-A). A shoulder on the crank 471 underlies a stud 472 in a bell crank 473 secured on the left-hand end of the key release shaft 230.

Counter-clockwise movement of the lever 457, under influence of the roller 460 (Figs. 14, 15, and 17, and space 15, Fig. 47), causes the finished surface on said lever, in cooperation with the stud 464, to rock the lever 465, the shaft 458, and the arm 466 also counter-clockwise. Counter-clockwise movement of the arm 466 rocks the arm 468 clockwise, which in turn rocks the crank 471 and the shaft 232 counter-clockwise as viewed in Fig. 17 and clockwise as viewed in Fig. 8-A. The crank 471 in turn rocks the bell crank 473 and the shaft 230 clockwise as viewed in Fig. 17 and counter-clockwise as viewed in Fig. 8-A, causing the arm 229, secured in the groove in said shaft 230, in cooperation with the upward extensions of the detents 225, to shift said detents rearwardly to disengage the hooks in the openings therein from the studs 221 in the depressed amount keys 218 and the depressed item-counting keys 343 (Fig. 3) to release said keys to the action of their springs, which immediately restores them upwardly to undepressed position.

A spring 474 (Fig. 17) assists in returning the arm 468 and connected parts to normal position, after the roller 460 moves beyond the lower end of the lever 457 (Fig. 14).

A stop stud 475 (Figs. 14 and 15) in the frame 131, in cooperation with a projection of the arm 466, locates said arm and its connected parts in their positions of rest, as shown here.

Means operated by the Release key 381 (Figs. 3 and 14) is also provided for rocking the release shaft 230 to release any depressed amounts or item-counting keys when desired.

Depression of the Release key 381 causes a stud 479 in its lower end, in cooperation with an arm 480 secured on a shaft 481, opposite ends of which shaft are journaled in a side plate of a framework 482 (Figs. 15 and 19-B), secured to the machine base 132, and in the left frame 131, to rock said shaft 481 clockwise. Clockwise movement of the shaft 481 and a crank 483, secured on said shaft, causes a stud 484 in said crank, in cooperation with the lower end of an arm 485 secured on one end of a short shaft 486 journaled in the frame 131, to rock said arm and said shaft counter-clockwise. Counter-clockwise movement of the shaft 486 carries a crank 487, secured on its other end, in unison therewith. The crank 487 pivotally supports one end of a release bar 488 (Figs. 14, 15, and 17), the other end of which is slotted to receive a stud 489 in the left frame 131. Counter-clockwise movement of the shaft 486 and the crank 487, when the Release key 381 is depressed, shifts the bar 488 rearwardly, causing its rearward end, in cooperation with a stud 490 in the lower end of the bell crank 473, to rock said bell crank, the key release shaft 230, and the key release arm 229 clockwise, as viewed in Fig. 17, and counter-clockwise as viewed in Fig. 8–A, to manually release any depressed amount or item-counting keys when desirable.

It will be recalled that operation of the lever 457 rocks the crank 471 and the shaft 232 counter-clockwise as viewed in Fig. 14 and clockwise as viewed in Fig. 8-A, causing the arms 231, in cooperation with the projections on the control plates 226 for the amount banks, to shift said control plates forwardly to rock the zero latches 236 counter-clockwise to ineffective position. However, from a comparison of spaces 1 and 15 of the time chart, Fig. 47, it will be seen that this rocking of the zero latches to ineffective position occurs when the actuators 240 are substantially fully returned to home or normal position, and is consequently of no importance in adding or subtracting operations.

In sub-total and total recording operations, it is desirable that the key releasing mechanism for the amount keys and the item-counting keys be operated at the beginning of such operations to insure that none of these keys have been inadvertently depressed prior to such operation. The reason for this is that in sub-total and total recording operations the wheels of the selected totalizer are used to position the corresponding actuators and printing mechanism to record the amount standing on said selected totalizer. Likewise, in sub-total and total recording operations, it is desirable that the shaft 232 (Figs. 8-A and 14 be operated near the beginning of such operations to release the zero latches 236 so that the actuators 240 are free to move rearwardly under influence of the restoring bar, to be positioned under influence of the wheels of the selected totalizer.

The lever 465 (Figs. 14 and 15) carries a stud 493, upon which is pivoted a latch 494, a shoulder of which is adapted to engage a bent-over ear 495 on a cam lever 496 free on the shaft 458 and carrying a roller 497, which is normally maintained in contact with the periphery of the cam 462 by a spring 498, which urges said lever clockwise. The right-hand end of the latch 494 (Figs. 14 and 15) overlies a stud 499 in an arm 500 secured on a shaft 501 journaled in the perpendicular side members of the frame 482. A spring 502, tensioned between the latch 494 and the arm 500, normally maintains said latch in contact with the stud 499. Also secured on the shaft 501 are a bell crank 503 and a crank 504 (Figs. 14, 15, and 30), said bell crank and said crank supporting therebetween a rod 505. The bell crank 503 carries a stud 506, which engages a slot in one end of a link 507, the other end of which is pivotally connected to one arm of a cam lever 508 (Figs. 26, 28, and 30) free on a screw stud 509 extending between the two side members of the frame 482. The lever 508 carries a roller 510, which cooperates with the periphery of a plate cam 511 secured on the main shaft 216, said cam adapted to rock the lever 508 first clockwise and back to normal position, according to the time given in space 11 of the time chart, Fig. 47.

The rod 505 (Figs. 28, 29, and 30) underlies and is adapted to cooperate with six similar projections 512 on each of six totalizer control slides 513 to 518 inclusive for the No. 1 to No. 6 totalizers, respectively, which, together with a sub-total control slide 519 (Figs. 26 and 29), are mounted for horizontal shifting movement by means of parallel slots in each end thereof in cooperation with annular grooves formed by spaced collars 520 and 521 supported by screw studs 522 and 523 extending between the plates 398 and 399.

In adding and subtracting operations, the control slides 513 to 518 inclusive (Figs. 28 and 29) are positioned so that the corresponding projections 512 are not in the path of the rod 505 and consequently do not interfere with the clockwise movement of said rod, the cranks 503 and 504, and the shaft 501, upon rotation of the cam 511 (Fig. 26 and space 11, Fig. 47). Clockwise movement of the shaft 501 (Fig. 14) carries the arm 500 in unison therewith, causing the stud 499 to rock the latch 494 counter-clockwise to disengage the shoulder thereon from the ear 495 to prevent movement of the cam lever 496, under influence of the cam 462, from being imparted to the lever 465, thus permitting said lever to be actuated by the cam lever 457, which functions in the manner previously explained, to release the depressed amount and correction keys near the end of adding and subtracting operations.

In sub-total and total recording operations, the control slide 513 to 518 inclusive (Figs. 28 and 29), corresponding to the selected totalizer, is positioned so that the projection 512 thereon is directly over the rod 505, to obstruct clockwise movement of the shaft 501 under influence of the cam lever 508, the slot in the upper end of the link 507 permitting said lever 508 and connected parts to move independently of said shaft 501. Obstructing clockwise movement of the shaft 501 and the arm 500 (Fig. 14) causes the latch 494 to remain in engagement with the ear 495, whereupon operation of the cam 462 rocks the cam lever 496 and the mechanism connected thereto, including the lever 465, the shaft 458, and the arm 466, first counter-clockwise and back to normal position, according to the time given in space 16 of the time chart, Fig. 47. Initial counter-clockwise movement of the arm 466 (Figs. 14 and 17) rocks the arm 468 clockwise, the crank 471 and the shaft 232 counter-clockwise, and the bell crank 473 and the key release shaft 230 clockwise, causing the arms 229 (Fig. 8-A), in cooperation with the upward projections on the detents 225, to shift said detents rearwardly near the beginning of machine operation and prior to initial rearward movement of the actuators 240, to release any inadvertently depressed amount or item counting keys at the beginning of sub-total and total recording operations.

Counter-clockwise movement of the shaft 232, as observed in Fig. 14, and clockwise movement of said shaft as observed in Fig. 8-A, causes the arms 231 carried thereby, in cooperation with the upward projections on the control plates 226, to shift said plates forwardly to rock the zero latches 236 counter-clockwise out of engagement with the blocks 239 to free the actuators 240 for movement, so that they may be positioned under influence of the wheels of the selected totalizer in the usual manner. Excessive clockwise return movement of the shaft 232 and the crank 471 (Fig. 17) is prevented by an upward extension of said crank in cooperation with the bottom surface of the keyboard top plate 188.

Mechanism actuated by the detents for the amount keys 218 and the detents for the item-counting keys 343 (Fig. 3) is provided for locking the machine releasing mechanism against operation when any one of these keys is in a partially depressed position.

The rearward ends of the detents 225 for the amount and item-counting banks (Figs. 8-A, 16, 40, and 43) cooperate with a rod 525 supported in the upper ends of a series of similar cranks 526 and a crank 527 (Fig. 16) secured on a shaft 528 journaled in the partition plates 189 for the keyboard framework. A torsion spring 536 urges the shaft 528, the cranks 526 and 527, and the rod 525 counter-clockwise, as viewed in Fig. 8-A, to normally maintain said rod 525 in yielding contact with the rearward ends of the detents 225. The right-hand end of the rod 525 (Figs. 40 and 43) engages the slotted upper end of an arm 529 free on a stud 530 secured in the right frame 130. The arm 529 carries a stud 531, which cooperates with a shoulder 532 on a crank 533 secured by a hub 534 to a short shaft 535 journaled in the right frame 130. A spring 537, tensioned between a stud 539 in the crank 533 and an arm 538 free on the hub 534, urges said parts counter-clockwise and clockwise, respectively, to cause the stud 531 to be yieldingly held between the shoulder 532 and a shoulder on the arm 538. The spring 537 likewise normally maintains an extension of the stud 539 in the crank 533 in engagement with an extension of the arm 538. Also secured on the shaft 535 is a crank 540 having a stud 541, which engages a slot in the stop pawl 198.

Partial depression of one of the amount keys 218 (Figs. 8-A, 16, and 40) causes the stud 221 therein, in cooperation with the angular nose of the corresponding tooth in the detent 225, to shift said detent rearwardly against the action of its spring 228, causing said detent to rock the rod 525, the cranks 526 and 527, and the shaft 528 clockwise, as viewed here, against the action of the spring 536. The rod 525 likewise rocks the arm 529 clockwise in unison therewith, causing the stud 531, in cooperation with the shoulder on the arm 538, to rock said arm counter-clockwise. Counter-clockwise movement of the arm 538, through the spring 537, carries the crank 533, the shaft 535, and the crank 540 counter-clockwise in unison therewith. Counter-clockwise movement of the crank 540, through the stud 541, rocks the pawl 198 clockwise into the path of the stop block 196 (Figs. 8-A, 40, and 43) to obstruct rearward releasing movement of the bar 194 to prevent operation of the machine releasing mechanism while an amount key 218 is partially depressed. Full depression of an amount key 218 permits the spring 228 to return the detent 225 forwardly, whereupon the spring 536 moves the rod 525 forwardly or counter-clockwise in unison therewith to move the pawl 198 to ineffective position, so that the machine may be released for operation in the usual manner.

Mechanism shown in Fig. 16 is provided for insuring that the rod 525 and the flexible detents 225 are properly returned to normal positions near the beginning of machine operation. The crank 527, which is secured on the left-hand end of the shaft 528, has a downward extension 543, which cooperates with a stud 544 in a pitman 545, the upper end of which is slotted to engage a stud 546 in the left frame 131. A spring 547 urges the pitman 545 downwardly to normally maintain a stud 548, carried thereby, in contact with the periphery of a plate cam 549 secured on the main cam shaft 216.

Clockwise revolution of the shaft 216 and the cam 549, as observed in Fig. 16, operates the pitman 545 according to the time given in space 17 of the time chart, Fig. 47, and initial downward movement of said pitman 545, under influence of the spring 547, causes the stud 544 to engage the extension 543 to insure that the rod 525 and the detents 225 for the amount keys and the similar detents for the item-counting keys are fully restored to normal positions, as shown here.

By comparing space 17 with spaces 16 and 1 of the time chart, Fig. 47, it will be seen that the restoring mechanism shown in Fig. 16 functions after the flexible detents 225 have been operated in sub-total and total recording operations to release any inadvertently depressed amount or item-counting keys, and functions prior to initial rearward movement of the actuators 240 (Fig. 8-A) to to insure that the rod 525 and the flexible detents are fully restored to normal positions.

*Actuator control mechanism*

Mechanism shown in Fig. 8-A is provided for cooperating with the actuators 240 to relieve said actuators and the transfer mechanisms of the different totalizers of excessive strain in sub-total and total recording operations.

The actuator 240 (Fig. 8-A), which is representative of all the actuators, has on its lower edge a series of ratchet teeth 551, which cooperate with the tooth of a corresponding pawl 552 free on a shaft 554 journaled in the main frames 130 and 131. The pawl 552 is mounted in corresponding alined slots in two upturned edges of a plate 553 having upturned ears which pivotally mount said plate on the shaft 554. A torsion spring 555 urges the pawl 552 clockwise to normally maintain a shoulder on the rearward end of said pawl in contact with the bottom of the corresponding slot in the plate 553. Secured on the plate 553 near opposite ends thereof are two similar cam arms 556, only one shown here, having rollers 557, which cooperate with the peripheries of companion plate cams 558, only one shown here, secured on the main cam shaft 216.

After the actuators 240 (Fig. 8-A) have completed their initial rearward movements under influence of the rack restoring bar 254 (space 1, Fig. 47) in sub-total and total recording operations, to be positioned by the wheels of the selected totalizer in the well-known manner, the cams 558, functioning according to the time given in space 3 of the chart, Fig. 47, rock the plate 553 clockwise to engage the pawl 552 with the teeth 551 to relieve the transfer mechanism of the selected totalizer from excessive strain caused by tensioning of the spring 252.

Return movement of the actuator 240 causes the teeth 551 to ratchet over the tooth of the pawl 552, and, after the actuator 240 is fully returned to normal position, the cams 558 rock the pawls 552 out of engagement with said teeth 551.

*Totalizers*

By referring to Figs. 8-A and 8-B, it will be recalled that the actuator 240 has connected thereto a rack 243, which is slidably supported in the totalizer framework 134 on the three rods 244. The rack 243 has six sets of teeth, which cooperate, respectively, with the corresponding wheels of the No. 1 to No. 6 totalizers inclusive. The six totalizers are similar in every respect, all of them being of the add and subtract type, and, as this particular type of totalizer has been fully disclosed in the patents referred to hereinbefore, it is believed that a somewhat general description of the No. 1 or balance totalizer will be sufficient for the purpose of this specification.

As previously stated, the machine chosen to illustrate the present invention is what is commonly termed a bank service machine and is principally used by banking establishments in the balancing of individual checking accounts. Therefore the arrangement of the six totalizers of the present machine is suited for use in connection with bank systems. In this arrangement of the totalizers, the No. 1 totalizer is used as a balance totalizer or crossfooter, the No. 2 totalizer is used for storing new balances, the No. 3 totalizer is used for storing a total of the deposits, the No. 4 totalizer is used for storing a total of the checks, and the No. 5 totalizer is used as an overdraft totalizer. The overdraft totalizer is always complementary to the No. 1 or balance totalizer and therefore is always read or reset, when the balance totalizer is in an overdrawn condition, in order to obtain a positive recording of the amount of the overdraft. The No. 1 to No. 5 totalizers inclusive have thereon eleven wheels corresponding to the eleven rows of amount keys 218 (Fig. 3). The No. 6 totalizer is an item-counting totalizer used for counting subtractive and additive or debit and credit items and has thereon three wheels corresponding to the three rows of item-counting keys 343.

The No. 1 or balance totalizer, which will be used as representative of all the totalizers, has a wheel 559 (Figs. 8-B and 21) for each denominational order, each of said wheels having twenty teeth and also having secured on one face thereof a tripping cam 550 having diametrically opposed tripping and/or stop teeth which cooperate with the teeth on corresponding add tripping pawls 560 and corresponding subtract tripping pawls 561. The wheels 559 are rotatably mounted on a No. 1 totalizer shaft, which extends between the side arms of a rockable frame work 562 pivoted at 563 to the totalizer framework 134.

In adding operations, after the actuators 240 and the rack 243 (Figs. 8-A and 8-B) have completed their initial rearward movements and have been positioned by the depressed amount keys 218 in the manner explained before, the wheel of the No. 1 or balance totalizer corresponding to the denomination shown here is engaged with the corresponding teeth on the upper edge of said rack 243, and simultaneously therewith a transfer actuating bar 566 is restored to untripped position, as shown here in full lines. Return forward movement of the actuator 240 and the associated rack 243 rotates the wheel 559 corresponding thereto in an additive or clockwise direction to enter in said wheels an amount equal to the value of the depressed amount key 218. If the wheel 559 passes through zero while traveling in an additive direction, one of the diametrically opposed teeth of the tripping cam 550 engages the tooth of the add tripping pawl 560 to rock said pawl clockwise to release a tripping lever 564, free on a stationary stud 565 secured in the framework 134, to the action of a spring 567, which immediately rocks said lever a slight distance counter-clockwise until an upward extension thereof contacts the bar 566.

The movement of the transfer bar 566 in adding operations is given in space 6 of the time chart, Fig. 47, and, by comparing space 6 with space 1, the relationship of operation between said transfer bar and the actuator 240 may be obtained. The above-mentioned slight movement of the lever 564 prevents the add pawl 560 from reengaging said lever when the tooth of the tripping cam 550 moves beyond said pawl. After the actuator 240 and the rack 243 have completed their return movement forward, the teeth of the wheel 559 are disengaged from said rack, and said teeth are simultaneously engaged with a corresponding transfer segment, not shown, but similar to a segment 568, with which teeth of the next higher order wheel 559 (Fig. 8-B) are simultaneously engaged. The transfer segment 568 is pivotally mounted on a stud in a plate supported by the framework 134. The segment 568 carries a stud 569, which engages a Y-shaped slot 570 in the transfer lever 564.

After the lower order totalizer wheel 559 has been disengaged from the rack 243, the transfer restoring bar 566 is released in the well-known manner and moves under spring action to the position shown in dot-and-dash lines (Fig. 8-B), permitting the transfer lever 564 to move counter-clockwise in unison therewith. During counter-clockwise movement of the lever 564, a spring 571, tensioned between the stud 569 and the bail of a rockable yoke 572, guides said stud into the right-hand or rearward branch of the Y-shaped slot 570. This rocks the segment 568 counter-clockwise to advance the next higher order wheel 559 one tooth space in an additive direction to effect the transfer of a tens digit from the denomination shown here to the next higher denomination.

In the very beginning of subtract operations, a transfer pawl shifting bar 573 (Fig. 8-B) is rocked counter-clockwise, as viewed here, to move the add-transfer pawl 560 out of cooperative relationship with the teeth of the tripping cam 550 and to simultaneously move the subtract-transfer pawl 561 into cooperative relationship with the teeth of said cam. Simultaneously with the rocking of the bar 573, the yoke 572 is rocked counter-clockwise to shift the position of the upper end of the spring 571 so that said spring will lead the stud 569 into the left-hand or forward branch of the Y-shaped slot 570, when the transfer lever 564 functions in subtract operations, as will be explained presently.

In subtract operations, prior to initial rearward movement of the actuator 240 and the rack 243 (Figs. 8-A and 8-B), the wheel 559 of the balance totalizer is engaged with the corresponding teeth on the upper edge of said rack, whereupon initial rearward movement of said rack rotates said wheel in a subtractive or counterclockwise direction to enter therein an amount equal to the value of the depressed amount key 218. If the wheel 559 passes through zero while being rotated in a subtractive direction, one of the diametrically opposed teeth on the tripping cam 550 engages the pawl 561 and rocks said pawl counter-clockwise to release the transfer lever 564, which has previously been restored to untripped position in the beginning of the subtract operation and immediately after the wheel 559 has been disengaged from its corresponding transfer segment and engaged with the rack 243. The movement of the transfer restoring bar 566 in subtract operations is given in space 7 of the time chart, Fig. 47.

After the actuator 240 and the corresponding rack 243 (Fig. 8-B) have completed their initial rearward movement, the wheel 559 is rocked out of engagement with said rack and into engagement with the corresponding transfer segment 568, after which the transfer restoring bar 566 is released to spring action, which immediately moves it to the position shown in dot-and-dash lines, to permit the transfer lever 564 to move counter-clockwise in unison therewith. During counter-clockwise movement of the transfer lever 564, the spring 571, which is now in its left-hand position, guides the stud 569 into the left-hand branch of the Y-shaped slot 570 to cause said slot to rock the segment 568 for the next higher order wheel 559 clockwise to move said next higher order wheel one step in a subtractive direction to effect a tens transfer.

If the succeeding operation is other than a subtract operation, the bar 573 (Fig. 8-B) and the yoke 572 are returned clockwise to the positions shown here to move the subtract pawl 561 to ineffective position and simultaneously move the adding pawl 560 to effective position and to position the spring 571 so that it will guide the stud 569 into the right-hand branch of the Y-shaped slot 570.

In sub-total and total recording operations, the wheel 559 of the No. 1 or balance totalizer is engaged with the rack 243 prior to initial rearward movement of said rack, which movement rotates said wheel in a reverse or counter-clockwise direction until one of the diametrically opposed teeth on the tripping cam 550 engages the inside surface of the tooth of the add-tripping pawl 560. This positions the wheel 559 at zero, and said wheel in turn positions the rack 243 and the actuator 240 in accordance with the amount standing upon said wheel, so that said amount will be recorded upon operation of the printing mechanism.

In total recording operations, the wheel 559 is disengaged from the rack 243 prior to its return forward movement, and consequently said wheel remains in a zeroized condition. In sub-total recording operations, the wheel 559 remains in engagement with the rack 243 during its return movement and is consequently restored to its original position.

The foregoing brief explanation of the transfer mechanism for the No. 1 or balance totalizer applies equally as well to all the other totalizers, as they are similarly constructed and function in exactly the same manner as said balance totalizer.

*Totalizer engaging and disengaging mechanism*

Each of the six totalizers is provided with engaging and disengaging cams for rocking the wheels of said totalizers into and out of engagement with the teeth of the racks 243 (Fig. 21). The set of engaging and disengaging cams for each of the six totalizers is provided with a corresponding shiftable link and a latch mechanism for connecting said cams to a common operating mechanism, which comprises a reciprocating bar, which is engaged by the latch mechanism. The controlling of the engagement and disengagement of the latch mechanism with and from the bar causes the selected totalizer to be connected to the reciprocating bar in the proper timing to effect the type of operation desired, whether it be adding, subtracting, sub-total taking, or total taking.

Directing attention to Figs. 19-A, 19-B, 21, and 23, rotatably supported on opposite ends of the No. 1 totalizer shaft are rollers 575, which engage, respectively, corresponding camming slots in cams 576 and 577 secured to an engaging shaft 578 in turn journaled in the totalizer framework 134. Secured on the left-hand end of the shaft 578 is a crank 579, to which is pivotally connected the rearward end of a link 580, the forward end of which is slotted to fit over a flattened portion of a collar 581 secured on a stud 582, one end of which is secured in the frame 131 and the other end of which is supported by a plate 583 secured to said left frame 131. Pivoted on a stud 584 in the link 580 (Figs. 21, 23, 27, and 42) is a No. 1 totalizer engaging latch 585, which cooperates with a totalizer engaging bar 586 having tenons on each end which fit in parallel alined slots in the plate 583 and in a plate 587 secured to the left frame 131. Secured to opposite ends of the bar 586 (Fig. 23) are the rearward ends of similar links 588 and 589, the forward ends of which are pivotally connected, respectively, to a cam lever 590 and an arm 591, both of which are secured on a shaft 592 journaled in the left frame 131 and the plate 583. The lever 590 carries rollers 593 and 594 (Fig. 21), which cooperate, respectively, with the peripheries of companion plate cams 595 and 596 secured on the main cam shaft 216.

The main shaft 216 and the cams 595 and 596 make one clockwise revolution, as viewed in Fig. 21, to rock the lever 590, the shaft 592, the arm 591, and the engaging bar 586 back and forth, according to the time given in space 4 of the time chart, Fig. 47, the first movement of said bar being forwardly or to the right, as viewed here.

Fig. 27 shows, in diagrammatic form, the movement of the totalizer engaging bar 586, from which it will be seen that said bar has four distinct movements, two in an engaging direction and two in a return or disengaging direction, with a slight period of rest after each movement. In the first movement of the bar 586, the selected totalizer is engaged with the actuators in subtract, sub-total taking, and total taking time; in the second movement of said engaging bar, the selected totalizer is engaged in adding time; in the third movement of said bar 586, the selected totalizer is disengaged in subtract and total taking time; and, in the fourth and final movement of said bar, the selected totalizer is disengaged in adding and sub-total taking time. It is the controlling of the engaging and disengaging of the latch 585 with and from the bar 586 that causes the totalizers to be engaged with and disengaged from the actuators in proper timing to effect the operation desired.

A tail 600 of the latch 585 (Figs. 27, 28, 29, and 42) cooperates with an extending finger of a control lever 601 free on a reduced portion of a collar secured on a stud 602 extending between the plates 398 and 399.

A downward extension of the lever 601 (Figs. 20, 27, and 42) has therein gear teeth which mesh with corresponding gear teeth in the upper edge of the control slide 513 for the No. 1 or balance totalizer, to provide means for controlling the engaging and disengaging movement of the latch 585 for the No. 1 totalizer, through the correction and control keys, as will be described later.

There is a control lever similar to the control lever 601 for each of the other five totalizers mounted adjacent to each other on the stud 602 and spaced apart by means of shoulder collars on said stud.

A finished surface on the extending finger of the control lever 601 engages the bottom of a corresponding guide slot in a formed-over portion of a bail of a yoke 603 (Figs. 27 and 28) free on the stud 602 and having a segmental portion with gear teeth therein which mesh with corresponding gear teeth in an operating lever 604 free on the stud 523. A downwardly extending arm of the lever 604 carries a roller 605, which cooperates with the periphery of a plate cam 606 secured on the main cam shaft 216.

The cam 606 (Fig. 28) functions according to the time given in space 10 of the chart, Fig. 47, to rock the yoke 603 first counter-clockwise and back to normal position to withdraw the bail of said yoke from the finished surface on the lever 601 to release said lever and the control slide 513 to the action of a spring 634 (Fig. 20), which urges said slide forwardly and the lever 601 counter-clockwise to position said parts in a manner to be explained later.

The tail portion 600 of the latch 585 also cooperates with a stud 608 (Figs. 27, 42, and 28) in a latch control bar 609 mounted for substantially vertical shifting movement by means of a slot in its upper end in cooperation with a rod 610 supported by the plate 583 and the left frame 131 (Figs. 19-B and 23) and by means of a slot in its lower end in cooperation with a rod 611 extending between the forward ends of similar cranks 612 and 613 (Fig. 42) secured in fixed relationship to each other on a sleeve 614 free on the shaft 592. A spring 615, tensioned between a rod supported by the cranks 612 and 613 and the bar 609, urges said bar upwardly. Pivotally connected to the left-hand end of the rod 611 is an operating pitman 616, the upper end of which is slotted to embrace the rod 610, said pitman carrying rollers 617 and 618, which cooperate, respectively, with the peripheries of companion plate cams 619 and 620 secured on the main cam shaft 216. The cams 619 and 620 operate the pitman 616 and the bar 609 according to the time given in space 5 of the time chart, Fig. 47.

The four positions of the control lever 601 are shown in Figs. 27 and 42. The full-line position of the finger of said lever is the subtract position; the next lower position is the total; the next lower position is the add; and the lowest position is the non-add, said three lower positions being shown in dot-and-dash lines. The positioning of said lever 601 may be controlled by means of studs in the control keys 377 to 380 inclusive (Fig. 3), in cooperation with corresponding projections in an opening in the upper portion of the control slide 513 (Figs. 20 and 25), by means of the No. 3 and No. 4 correction keys 369 in cooperation with corresponding projections on the upper edge of said slide 513, or by means of the traveling carriage in columnar positions thereof, said carriage controlling mechanism cooperating with steps on an upper hook-shaped extension of said lever 601, to control the positioning thereof, as will be explained later.

Directing attention particularly to Figs. 20, 25, and 28, the control keys 377 to 380 inclusive carry, respectively, in their lower ends, square studs or stop elements 622, 623, 624, and 625, which cooperate with corresponding projections 626, 627, 628, and 629 in an opening in the control slide 513. Likewise, the No. 3 and No. 4 correction keys 369 carry, respectively, square studs 630 and 631, which cooperate with corresponding projections 632 and 633 on the upper edge of said control slide 513.

*Totalizer engaging in subtract operations*

Depression of the Subtract key 377 (Figs. 20, 25, 26, and 27) moves the stud 622 into the path of the projection 626 to obstruct forward movement of the control slide 513 under influence of the bail of the yoke 603 (Fig. 27) upon operation of the machine, to cause the finger of the control lever 601 to remain in the full-line position, as shown in Figs. 27 and 42, so that the latch 585 will remain in its extreme down position, as shown here. Initial forward movement of the engaging bar 586 (Figs. 21, 23, 27, and 42) under influence of the cams 595 and 596 causes the convex forward edge of said bar to engage a concave surface 2632 on a hook-shaped portion of the latch 585 and shift said latch and the link 580 forwardly (Figs. 21 and 25) to rock the crank 579, the shaft 578, and the cams 576 and 577 counter-clockwise to engage the wheels 559 of the No. 1 or balance totalizer with the corresponding teeth in the racks 243 prior to initial rearward movement of said racks, which movement reversely rotates said wheels to subtract therefrom the value of the amount set up on the depressed amount keys 218 (Fig. 3).

After the actuators 240 and the racks 243 have completed their initial rearward movements, the bar 609 (Figs. 27, 28, and 42) is shifted downwardly, under influence of the cams 619 and 620, causing the stud 608 therein, in cooperation with the tail 600 of the latch 585, to rock said latch clockwise to adding position, as shown in dot-and-dash lines (Fig. 27) to raise the forward end of the hook-shaped portion of said latch above the engaging bar 586 so that said bar may by-pass said hook during its second forward movement. After the bar 586 has completed its second forward movement and before the actuators 240 and the racks 243 begin their return forward movements, the bar 609 is returned upwardly to permit the notch formed by the hook-shaped forward end of the latch 585 to latch over the bar 586, whereupon the third movement of said bar (Fig. 27), which is the first movement in a return direction, causes it to engage a concave surface 2633 on the inside of the hook-shaped portion of the latch 585, to return said latch and the link 580 rearwardly to disengage the wheels of the No. 1 totalizer from the racks 243 prior to return forward movement of said racks.

After the totalizer engaging bar 586 has completed its third movement and is dwelling prior to its fourth movement, the cams 619 and 620 (Fig. 42 and space 5, Fig. 47) again impart downward movement to the bar 609 to rock the latch 585 clockwise to move its hook-shaped rearward end out of the path of the engaging bar 586 so that said bar may move beneath said latch without interference during its fourth or final movement.

The No. 3 Correction key 369 (Fig. 25) is for correcting errors in the entry of credit items, such as deposits, in the No. 1 totalizer, and depression of this key causes the No. 1 or balance totalizer to be selected and conditioned for subtractive operation in exactly the same manner as described for the Subtract key 377. In the present arrangement of the machine the No. 3 Correction key, in addition to selecting the No. 1 or balance totalizer for a subtract operation, likewise selects and conditions the No. 5 or overdraft totalizer, which is always complementary to the No. 1 totalizer for an adding operation, and selects and conditions the No. 3 and No. 6 totalizers for subtract operations, as will be explained in detail later.

A rearward extension 635 of the control slide 513 (Figs. 18, 19-A, 19-B, and 20) is adapted to be engaged by a bent-over ear of a link 636 having on its forward end a slot which engages a spacing collar 637 free on the main cam shaft 216. The rearward end of the link 636 is pivotally connected to a crank 638 (Fig. 18) secured in fixed relationship to a corresponding arm 639 by a sleeve free on a tenon formed on the bar 573. The arm 639 carries a stud 640, which cooperates with a lower edge of a subtract shifting hook 641, the rearward end of which is slotted to embrace a stud 642 in an arm 643 secured on said bar 573.

A spring 648, tensioned between the stud 642 and a stud in the hook 641, in cooperation with the slot in the rearward end of said hook, forms a yielding connection between said hook and the stud 642.

The hook 641 is adapted to be engaged by a stud 644 in an arm 645 secured on the engaging cam shaft 578. A spring 646 (Fig. 20), the tensioned between the link 636 and a fixed stud 647 in the plate 583, urges said link forward to normally maintain the bent-over ear in contact with the extension 635, as shown here.

A stop lug 469 (Fig. 20) on the upper edge of the link 636 cooperates with the stud 647 to prevent excessive rearward movement of the link 636, which movement may be sufficient to disengage the slot in said link from the collar 637.

In subtracting operations, the control slide 513 and the link 636 (Figs. 18 and 20) are retained in their rearward positions, as shown here and as explained above, and, as a result, the hook 641 remains in the path of the stud 644, whereupon forward engaging movement of the link 590 (Fig. 21) and counter-clockwise movement of the crank 579, the shaft 578, and the arm 645 cause the stud 644 to engage the hook 641 and shift said hook forwardly to rock the bar 573 clockwise, as viewed in Figs. 18 and 22, and counter-clockwise, as viewed in Fig. 8-B. A crank secured on the tenon of the bar 573 (Figs. 8-B and 22) is connected by a link 651 to the left-hand arm of the yoke 572, and, as a result, clockwise movement of said bar 573, as viewed in Fig. 22, and counter- clockwise movement of said bar, as viewed in Fig. 8-B, impart similar movement to said yoke 572. This movement of the bar 573 and the yoke 572, as explained earlier herein, causes the add trip pawls 560 to be moved to ineffective position and the subtract tripping pawls 561 to be simultaneously moved to effective position, and causes the position of the springs 571 to be shifted so that they will guide the studs 569 into the left-hand branch of the Y-shaped slot 570 to cause subtractive tens digits to be transferred.

Clockwise movement of the arm 643, against the action of a spring 652 (Fig. 22), tensioned between said arm and a stationary stud 653 in the totalizer framework, causes a square stud 654, carried by said arm, to by-pass a shoulder on a latch 655 pivoted on the stud 653, whereupon a spring 656, tensioned between said latch 655 and a similar latch for the No. 2 totalizer, urges said latch 655 clockwise to cause a shoulder thereon to engage the stud 654 to prevent return movement counter-clockwise of the arm 643 and the bar 573 under influence of the spring 652 when the totalizer engaging arm 645 is returned clockwise. A forward extension of the latch 655 cooperates with a stud 657 in a link 658 supported for horizontal shifting movement by means of parallel slots therein, in cooperation with the stud 653 and other similar studs in the totalizer framework 134. The forward end of the link 658 is pivotally connected to a cam lever 659 free on a stud 660 secured in the left frame 131, said lever having a slot 661, which cooperates with a roller 662 mounted on the cam lever 590. See Figs. 21 and 22.

When the parts are in home position, as shown in Figs. 21 and 22, the stud 657 maintains the shoulder on the latch 655 out of the path of the stud 654. Initial clockwise movement of the lever 590, under influence of the cams 595 and 596 (space 4, Fig. 47) causes the roller 662, in cooperation with the slot 661, to rock the lever 659 counter-clockwise to shift the link 658 rearwardly to withdraw the stud 657 from the latch 655 to permit the spring 656 to move the shoulder on said latch into the path of the stud 654. Therefore the latch 655 is now effective to engage the stud 654 to retain the arm 643 in clockwise position after it is moved to such position under influence of the arm 645 and the hook 641. The contour of the slot 661 is such that only the initial clockwise movement and the final counter-clockwise movement of the lever 590 are effective to impart movement to the lever 659, the intermediate movement of said lever imparting no movement to said lever 659. Therefore final return movement counter-clockwise of the lever 590, under influence of the cams 595 and 596, returns the lever 659 clockwise to shift the link 658 forward to cause the stud 657 to rock the shoulder of the latch 655 out of engagement with the square stud 654 to release the arm 643 and the bar 573 to the action of the spring 652. However, the arm 643 and the bar 573 are not yet free to move under influence of said spring 652, as a latch (not shown), in cooperation with said bar 573, obstructs such movement, said latch being operated by restoring movement of the transfer restoring bar 566 (Fig. 8-B), which functions in subtract operations according to the time given in space 7 of the time chart, Fig. 47, and in adding operations according to the time given in space 6.

In other than subtracting operations, the control slide 513 (Fig. 20) is always moved forwardly out of subtracting position, as shown here, to one of its other positions, the minimum of said forward movement being in total and sub-total taking operations, which minimum movement is sufficient to permit the link 636, under influence of the spring 646, to travel forwardly in unison therewith until the bottom of the slot in the forward end of said link contacts the collar 637. Forward movement of the link 636 rocks the crank 638 (Figs. 18 and 22) and the arm 639 counter-clockwise, causing the stud 640 to engage and rock the hook 641 also counter-clockwise against the action of a comparatively weak spring 663, to move said hook out of the path of the stud 644, so that movement of the arm 645 will not have any effect upon said hook and connected mechanism.

*Totalizer engaging in total operations*

Depression of the Balance key 379 (Figs. 20, 25, 26, 27, and 28) moves the stud 624 into the path of the corresponding projection 628 on the control slide 513, whereupon movement of the yoke 603, under influence of the cam 606 at the beginning of machine operation, permits said slide 513 to move forward, under influence of the spring 634, until said projection 628 contacts said stud 624 to position said slide in its No. 1 or total position.

This positioning of the control slide 513 moves the projection 512 on its lower edge (Figs. 20 and 28) into the path of the rod 505 to obstruct clockwise movement of said rod, the shaft 501, and the arm 500 (Fig. 14) under the influence of the cam 511 (Fig. 26) to cause the key releasing latch 494 to remain effective, as shown here, to cause the key releasing mechanism to function in the beginning of said total recording operations to release any inadvertently depressed amount or item-counting keys prior to initial rearward movement of the actuators 240 and the racks 243, as explained earlier in connection with the key releasing mechanism.

Movement of the control slide 513 to total position rocks the lever 601 (Figs. 20, 27, and 42) to total position, as shown in dot-and-dash lines, in which position the rearwardly extending finger of said lever is still out of the path of the tail 600 of the latch 585 and consequently has no influence upon said latch, which functions exactly the same as in subtract operations to cause the No. 1 or balance totalizer to be engaged and disengaged in total recording time. Movement of the control slide 513 (Figs. 18 and 20) to total position imparts sufficient movement to the link 636 to cause the hook 641 to be rocked out of the path of the stud 644 so that the add-transfer pawls 560 will remain in effective position, as shown in Fig. 8-B.

As previously explained, the wheels of the balance totalizer are engaged with the racks 243 (Fig. 8-B) prior to their initial rearward movement, which rearward movement reversely rotates said wheels until one of the diametrically opposed tripping teeth on the corresponding cams 550 engages the add-transfer tripping pawls 560 to position said wheels in zero position and to simultaneously position the racks 243, the actuators 240, and the type carriers associated therewith in accordance with the amount standing on the totalizer wheels. After the actuators 240 and the racks 243 have completed their initial rearward movements to zeorize the wheels of the No. 1 totalizer, said wheels are rocked out of engagement with said racks, whereupon said racks are returned forwardly to normal position. Therefore the wheels of the No. 1 totalizer remain in a zeroized condition.

In subtracting and total recording operations, it is important to note that, after initial forward movement of the engaging bar 586 has shifted the latch 585 and the link 580 forwardly to engage the wheels of the balance totalizer with the racks, the cams 619 and 620 function to shift the bar 609 downwardly (Figs. 27 and 42 and space 5, Fig. 47) to move the hook-shaped end of said latch above the bar 586 so that said bar may pass beneath said latch in its second movement, as explained in connection with subtracting operations.

After the engaging bar 586 has commenced its second movement the bar 609 is restored upwardly to cause the latch 585 to latch over the engaging bar 586, whereupon third movement or first restoring movement of said bar shifts the link 580 rearwardly to disengage the wheels of the balance totalizer from the racks in subtract and total recording operations prior to return movement of said racks.

In total recording operations, as in subtracting operations, after the totalizer engaging bar 586 has completed its third movement and is dwelling prior to its fourth movement, the cams 619 and 620 (Fig. 42) again impart downward movement to the bar 609 to rock the latch 585 clockwise to move the hook-shaped rearward end of said latch out of the path of the engaging bar 586, so that said bar may move beneath said latch without interference during its fourth movement or final movement in a return direction.

*Totalizer engaging in sub-total operations*

As explained previously, a sub-total recording operation is exactly like a total recording operation, with the exception that the wheels of the selected totalizer remain in engagement with the racks 243 during their return forward movement, and, as a result, said wheels are restored to their original positions. This is effected by operation of the sub-total control slide 519 (Figs. 26 and 29), which controls a latch mechanism which latches the bar 609 in its down position, so that the latch 585 is retained out of the path of the engaging bar 586 during its third movement or first return movement, and consequently the wheels of the balance totalizer remain in engagement with the racks 243 during return forward movement of said racks and are consequently restored to their original positions.

Depression of the sub-balance key 378 (Figs. 20 and 28) moves the stud 623 into the path of the corresponding projection 627 on the control slide 513 to position said slide and the lever 601 in exactly the same positions as in total recording operations. Positioning of the control slide 513 locates the projection 512 over the rod 505, to obstruct movement of said rod to render the latch 494 (Fig. 14) effective, to cause the key releasing mechanism to function to release any inadvertently depressed amount or item-counting key.

The sub-total control slide 519 (Fig. 26), which is slidably supported by the studs 522 and 523 adjacent to the No. 1 control slide 513 (Fig. 29), has, on a rearward extension thereof, teeth which engage corresponding teeth in a segmental portion of a sub-total control lever 665 (Fig. 26) free on the stud 602. The sub-total control slide 519 has a projection 666, which cooperates with a finger 667 on an arm of a yoke 668 free on the stud 509. The arm 667 carries a stud 669, which underlies a finger 670 of the lever 508, which, as explained previously, is operated by the cam 511 according to the time given in space 11 of the time chart, Fig. 47. A finished surface on the forward edge of the bail of the yoke 668 (Figs. 28 and 30) cooperates with a corresponding surface on a downward extension of a lever 671 free on the stud 599 and having pivotally connected thereto one end of a latch 672, the other end of which is slotted to straddle a stud 673 secured between the side members of the frame 482. A spring 674 urges the latch 672 rearwardly to normally maintain the lever 671 in yielding engagement with the bail of the yoke 668. The latch 672 has an extension 675 arranged to move over a bent-over portion 676 of the bar 609, to latch said bar in its downward position, as will be explained presently. The control lever 665 (Fig. 26) has an extending finger which engages a corresponding slot in the bent-over portion of the bail of the yoke 603 in exactly the same manner as the control lever 601 for the No. 1 or balance totalizer.

In operations other than sub-total or sub-balance operations, the sub-total control slide 519 is free to move forwardly full distance, under the influence of its spring 678, upon movement of the yoke 603. Full movement of said control slide 519 permits the projection 666 to move over the finger 667 to block or obstruct clockwise movement of the yoke 668 under influence of the lever 508 and the cam 511 to retain the lever 671 and the latch 672 (Fig. 28) in ineffective position, as shown here, so that the extension 675 will not latch over the bent-over portion 676 of the control bar 609. Consequently, said bar 609 will function in the manner explained in connection with subtract and total recording operations to control the latch 585.

Depression of the sub-balance key 378 (Fig. 26) moves the stud 623 into the path of a projection 679 in an opening in the sub-total control slide 519, to obstruct forward movement of said slide, and thereby retain the projection 666 out of the path of the finger 667, whereupon the yoke 668 is free to move in unison with the lever 508.

Positioning of the No. 1 control slide 513 (Figs. 20, 28, and 30), under influence of the sub-balance key 378, alines a notch 689, in a rearward extension of said slide, with a bent-over ear 681 on the lever 671, so that said lever is free to move clockwise under influence of the yoke 668 in sub-balance operations. Inasmuch as the cam 511 (Fig. 26) operates the lever 508 and the yoke 668 prior to initial downward movement of the bar 609 (Fig. 42), the extension 675 of the latch 672 yieldingly engages the forward face of the bent-over portion 676 until said bent-over portion moves beyond said extension, whereupon said latch 672 moves rearwardly to latching position.

In sub-total recording or sub-balance operations, initial forward movement of the totalizer engaging bar 586 (Figs. 21, 23, and 27) causes said bar to engage the surface 2632 of the latch 585 to shift said latch and the link 580 forwardly to engage the wheels of the No. 1 or balance totalizer with the racks 243 prior to initial rearward movement of said racks, which movement reversely rotates said wheels to zero position, to position said racks and their corresponding actuators in accordance with the amounts standing on said totalizer wheels. While the engaging bar 586 is dwelling, after having completed its first movement, the cams 619 and 620 (Fig. 42 and space 5 of the chart, Fig. 47) function to shift the bar 609 downwardly to rock the latch 585 clockwise to move the surface 2622 on the hook-shaped portion thereof out of the path of the bar 586, exactly as in total operations, so that said bar 586 may move beneath said hook-shaped portion during its second movement. Downward movement of the bar 609 (Figs. 28 and 30) moves the upper edge of the bent-over portion 676 beneath the extension 675 to release the latch 672 to the action of the spring 674, which immediately shifts said latch rearwardly to move said extension 675 over said bent-over portion 676, to latch the bar 609 in its downward position.

By comparing spaces 4, 5, and 11 of the time chart, Fig. 47, it will be seen that the latch 672 (Fig. 28) remains effective while the engaging bar 586 (Fig. 21) is making its third movement. Consequently the latch 585 is held above said engaging bar, and, as a result, the wheels of the No. 1 totalizer remain in engagement with the racks during their return forward movement and are therefore returned to their original positions. While the totalizer engaging bar 586 is dwelling in its third position, the cam 511 (Figs. 26, 27, 28, and 30) functions to disengage the extension 675 of the latch 672 from the bent-over portion 676, so that the control bar 609 is free to move upwardly under influence of the cams 619 and 620 to restore the latch 585 to normal or subtract position. The fourth and final movement of the totalizer engaging bar 586 (Figs. 21, 27, and 42) causes said bar, in cooperation with a projection 682 on the link 589, to shift said link rearwardly to disengage the wheels of the No. 1 totalizer from the racks 243 after said racks have completed their return forward movement in the manner explained above.

The Nos. 2, 3, and 4 total keys 376 (Figs. 3 and 26) carry, respectively, square studs 684, 685, and 686, which cooperate with corresponding projections on their corresponding control slides 514, 515, and 516 (Figs. 28 and 29) to cause the wheels of the corresponding totalizers to be engaged with and disengaged from the racks 243 in total recording time. Likewise the Sub-Total key 375 (Figs. 3 and 26) carries a square stud 687, which cooperates with a projection 688 on the upper edge of the sub-total control slide 519, to position said slide in exactly the same manner as explained in connection with the Sub-Balance key 378, and, when said Sub-Total key 375 is used in conjunction with any one of the Nos. 2, 3, or 4 Total keys 376, it causes the corresponding totalizer to be engaged and disengaged in sub-total time in exactly the same manner as the Sub-Balance key 378 causes the No. 1 or balance totalizer to be engaged in sub-total time.

*Totalizer engaging mechanism in add operations*

In adding operations, depression of the No. 1 add key 380 (Figs. 3, 20, 25, and 26) moves the square stud 625, carried thereby, into the path of the projection 629, whereupon operation of the machine causes the control slide 513 to position the control lever 601 in adding position, so that the rearward extension thereof occupies the position indicated in dot-and-dash lines in Figs. 27 and 42, to cause said rearward extensions to engage the tail 600 of the latch 585 and move said latch to add position, as indicated in dot-and-dash lines (Fig. 27), so that the downward end of the hook-shaped portion of said latch is out of the path of the engaging bar 586. Therefore, first movement of the engaging bar 586 in an engaging direction causes said bar to pass beneath the rearward end of the hook-shaped portion of the latch 585 without imparting any engaging movement to the link 580 (Figs. 21 and 27) and the No. 1 totalizer.

Second movement of the engaging bar 586 causes said bar to engage a surface 689 of the latch 585 and shift said latch and the link 580 forwardly to engage the wheels 559 of the No. 1 totalizer with the racks 243, after said racks have completed their initial movements rearward and have been positioned by the depressed amount keys 218 (Fig. 3). Compare spaces 1 and 4, Fig. 47. The third movement of the engaging bar 586 (Fig. 27) imparts no movement to the link 580. However, the fourth movement of said bar, in cooperation with the projection 682, shifts the link 580 and connected mechanism rearwardly to disengage the wheels of the No. 1 totalizer from the racks 243 after said racks have completed their return forward movement to enter in said wheels the amount set up on the amount keys 218.

Depression of the No. 4 Correction key 369 (Figs. 20 and 25) moves the stud 631 therein into the path of the projection 633 on the upper edge of the control slide 513, so that, upon operation of the machine, said slide will be positioned in adding position, in exactly the same manner as explained in connection with the No. 1 add key 380, to select the No. 1 or balance totalizer for an adding operation, which is proper in correction operations involving debit or check items.

When either the No. 1 add key 380 or the No. 4 Correction key 369 is used to select and condition the No. 1 or balance totalizer for an adding operation, as explained above, the studs 625 and 631 therein, in cooperation with corresponding projections on the No. 5 control slide 517 (Fig. 29), position said slide to cause the No. 5 or overdraft totalizer to be selected and conditioned for a subtract operation, which is necessary to retain said overdraft totalizer in complementary relationship with the No. 1 or balance totalizer. Likewise, when either the Subtract key 377 or the No. 3 Correction key 368 (Fig. 20) is used to select and condition the No. 1 totalizer for a subtract operation, as explained above, the studs 623 and 630, respectively, in said keys, in cooperation with corresponding projections on the No. 5 control slide 517, select and condition the No. 5 or overdraft totalizer for an adding operation, which is proper to retain said totalizer in complementary relationship with said balance totalizer.

Inasmuch as credit and debit items are both counted or accumulated in the No. 6 or item totalizer, the studs 624 and 622 (Figs. 25, 28, and 29) in the Add and Subtract keys 380 and 377, in cooperation with corresponding projections 690 and 691 on the No. 6 control slide 518, position said slide and its corresponding control lever 692 in adding position. The control lever 692 cooperates with a latch 693 pivotally connected to an engaging link 694 for the No. 6 totalizer, the forward end of which link is slotted to embrace a flattened portion of a collar on the shaft 581, while the rearward end of said link is pivotally connected to a lever 695 free on a shaft 696 supported in the totalizer framework. The lever 695 carries a stud which cooperates with a slot in the upper end of an arm 697 secured on an engaging shaft 698. Also secured on the shaft 698 are engaging cams 699, which cooperate with rollers on the No. 6 totalizer shaft, which shaft rotatably supports the wheels of the No. 6 totalizer, said shaft in turn being supported by the arms of a rockable framework 700 pivotally mounted in the totalizer framework 134 (Fig. 8-B). The engaging mechanism described above for the No. 6 or item totalizer functions exactly like the similar mechanism for the No. 1 or balance totalizer explained earlier herein, to cause the engaging bar 586 to engage and disengage the No. 6 or item totalizer in adding time.

Likewise, depression of the Sub-Balance key 378 or of the Balance key 379 causes the stud 623 or 624 therein, in cooperation with corresponding projections 701 and 702 on the control slide 518 for the No. 6 or item totalizer, to cause said totalizer to be engaged with and disengaged from the actuators in sub-total or total time, in exactly the same manner as explained in connection with the No. 1 or balance totalizer, to obtain a recording of the total number of items.

In balance operations, in which the No. 1 totalizer is in a positive condition and the No. 5 or overdraft totalizer is in a negative condition, depression of the Balance key 379 causes the stud 624 therein, in cooperation with a corresponding projection on the No. 5 control slide 517 (Figs. 25 and 29) to select and condition the No. 5 or overdraft totalizer for addition operations to add therein the amount cleared from the No. 1 or balance totalizer, to zeroize said No. 5 or overdraft totalizer.

In sub-balance or balance of the overdraft operations, in which the No. 5 or overdraft totalizer is in a positive condition and the No. 1 totalizer is in a negative condition, the overdraft mechanism, to be described later, functions to cause the No. 5 totalizer to be selected and conditioned for a sub-total or total recording operation, as the case may be, to obtain a positive recording of the negative balance. In balance of the overdraft operations, the No. 1 or balance totalizer is simultaneously selected and conditioned for addition, so that the amount cleared from the No. 5 totalizer will be added therein to zeroize said balance totalizer.

Depression of the Non-Add key 374 (Fig. 3), through the mechanism shown in Fig. 31 and to be described later, causes the carriage-controlled selecting mechanism for the six totalizers to be moved to non-adding position, and in this case, if none of the control keys 375 to 380 inclusive is depressed, the control slides 513 to 518 inclusive (Fig. 29) are free to move full distance toward the right. Such movement to the right of the control slide 513 for the No. 1 totalizer (Figs. 20, 27, and 42) causes the control lever 601 to be rocked full distance counter-clockwise to non-add position. Movement of the control lever 601 to non-add position causes the rearward extension thereon, in cooperation with the tail 600 of the latch 585, to rock said latch to its non-add position, as shown in dot-and-dash lines in Fig. 27, in which position the operating surfaces 2632, 2633, and 689 are above or out of the path of the engaging bar 586. Consequently said bar is free to move back and forth without imparting any engaging or disengaging movement to the link 580 and the mechanism connected thereto. Therefore, in non-add operations, the wheels of the No. 1 or balance totalizer will not be engaged with the racks 243.

The other totalizers of the machine function in exactly the same manner as described for the No. 1 or balance totalizer in non-adding operations. The mechanism controlled by the Non-Add key 374 (Fig. 31) will be explained later in detail herein in connection with the control of the totalizer selecting mechanism by means of the traveling carriage in its tabulated or columnar positions.

*Totalizer selection by traveling carriage*

Mechanism under control of the traveling carriage in tabulated or columnar positions thereof is provided for selecting and conditioning the six totalizers for various operations in exactly the same manner as explained in connection with the control keys.

The control lever 601 for the No. 1 or balance totalizer (Figs. 27 and 42) has an upward extension with four steps 704, 705, 706, and 707, corresponding to the subtract, total, add, and non-add positions of the corresponding control slide 513, said steps arranged to cooperate with the bent-over ear 708 of an arm or stop member 709 free on a rod 710 supported by the left frame 131 and the plate 583 (Fig. 19-B). The arm 709 is pivotally connected by a link 711 to an arm 712 free on a rod 713 also supported by the left frame 131 and the plate 583. The arm 712 (Fig. 42) is yieldingly connected, by a spring 714, to a companion arm 715, said spring urging said arms in opposite directions to normally maintain a projection of said arm 712 in contact with a stop stud 716 in said arm 715. A spring 717, one end of which is connected to the arm 715, urges said arm and its companion arm 712 clockwise to normally maintain a forward extension of said arm 715 in contact with a stop rod 703 supported by the frame 131 and the plate 583. A rearward extension of the arm 715 cooperates with the left-hand end of a No. 1 or balance totalizer sensing lever 718 free on a rod 719 (Fig. 44) extending between the cross frame 133 and the rail 138, which, it will be recalled, assists in supporting the traveling carriage for lateral shifting movement. The sensing lever 718 has a turned-up sensing projection 720 (Figs. 13 and 44), which cooperates with a corresponding control tappet 721 having a dovetailed portion which fits in a dovetail groove in a control block 722 for controlling the operation of the machine in a particular column of the record material.

In addition to the sensing lever 718 for the No. 1 or balance totalizer, there is a similar sensing lever 723 to 727 inclusive (Fig. 13) for each of the totalizers No. 2 to No. 6 inclusive, the sensing projections of which cooperate with corresponding tappets mounted in the dovetail groove in the control block 722 in exactly the same manner as the tappet 721 for the lever 718. The complete assembly of control tappets, including the tappet 721 (Fig. 13) are assembled in proper order in the dovetail groove in the control block 722 and are secured against displacement by a screw 693, which passes freely through holes in the control tappets and is threaded into the control block 722.

In addition to the control tappets for controlling the selection of the various totalizers, the control block 722 may also include control tappets for controlling the operation of the No. 1 and the No. 5 totalizers in overdraft operations; for controlling the printing movement of the item type carrier and the cents type carrier; for controlling the printing movement of the date type carriers; for unlocking the machine for operation; for rendering the automatic line-spacing mechanism effective; for controlling the operation of the throat-opening mechanism; for causing the traveling carriage to be returned to a particular columnar position; and for operating the machine releasing mechanism to initiate an automatic operation of the machine. From the foregoing it is evident that it is possible to achieve any type of operation of the machine desired by proper assembly of the control tappets in the control blocks 722 and by employment of the proper number of said blocks 722 spaced in columnar positions on the traveling carriage.

The control block 722 (Fig. 8-B) is slotted to slidingly engage the protruding edges of a control block bar 729 having similar bent-over upward extensions which fit in corresponding parallel grooves in a bottom plate 730 of the traveling carriage 136. A pinch-operated clamp 731, mounted in the control block 722, cooperates with tooth spaces in the protruding forward edge of the bar 729 to secure the control block 722 in proper location on said bar 729. The bar 729 extends the full length of the traveling carriage, and any number of control blocks 722 necessary to obtain the desired control may be located thereon in positions conforming to the various columnar divisions of the record material being used in the particular system.

Each of the control blocks 722 has a stop projection 733, which cooperates with tabulating stop plungers in a manner to be described later, to locate the traveling carriage in its various columnar positions. The projection 733 supports a stud 732, which cooperates with the teeth of an indexing gear which indexes the column selecting mechanism which in turn controls the columnar positioning of the traveling carriage, in a manner to be described later. The cross bar of a yoke 734 (Figs. 44 and 46) extends beneath and cooperates with finished lower surfaces on the selecting lever 718 for the No. 1 totalizer and the selecting levers 723 to 727 inclusive for the No. 2 to No. 6 totalizers, the arms of said yoke being rotatably supported by the rod 719. The lower surface of the cross bar of the yoke 734 has a depending portion which cooperates with a roller 735 on a crank 736 secured to a shaft 737 journaled in the frames 130 and 131. Also secured to the shaft 737 is a crank 738 having pivotally connected thereto the upper end of a pitman 739, the lower end of which is slotted to embrace a collar 740 on the main shaft 216. The pitman 739 has secured thereto a plate 741 with a tooth which cooperates with a flattened stud 742 secured in the left-hand face of the gear 215, which, it will be recalled, is secured to the main shaft 216 (Fig. 4) and is a part of the gear train which transmits power from the operating motor to said main shaft. The pitman 739 (Figs. 44 and 46) carries a roller 743, which cooperates with the periphery of a plate cam 744 secured on the main shaft 216.

The movement of the pitman 739 and connected parts under influence of the stud 742 and the cam 744 is depicted graphically in space 9 of the time chart, Fig. 47, from which it will be seen that, immediately after the beginning of machine operation, the large diameter of the cam 744 moves beyond the roller 743, after which the flat surface on the stud 742 moves beyond the tooth on the plate 741 to release the pitman 739 and connected parts, including the yoke 734, to the action of springs 745 (Fig. 44), which are tensioned to urge the selecting levers 718 and 723 to 727 counter-clockwise, as viewed here, to cause the sensing tips 720 on said levers to sense the tappets 721 carried by the control blocks 722, to select and condition the various totalizers for the desired functions.

It will be noted that each of the selecting levers, including the selecting lever 718 (Fig. 44) has a depending guide tip 746, which extends through a corresponding guide slot in a plate 747 secured between the cross frame 133 and the rail 138.

By referring to Fig. 13, it will be seen that the control tappet 721 terminates the sensing movement of the No. 1 selecting lever 718 and that said tappet may be any one of four different lengths to position said selecting lever in any one of its four selecting positions, said lever in turn, through the arms 715 and 712 and the link 711 (Fig. 42), positioning the arm 709 in accordance therewith to any one of its four positions, including subtract position, which is shown in full lines in Fig. 42, and total, add, and non-add positions, which are shown here in dot-and-dash lines.

For example, if the fourth length or longest type of tappet 721 is used, the selecting lever 718 is retained in the position shown here, and, as a result, no movement is imparted to the arm 709. Therefore said arm 709 remains in the position shown here, in which the bent-over ear 708 is opposite the step 704 of the control lever 691, to position said control lever and the control slide 513 in subtract position to cause the No. 1 totalizer to be selected and conditioned for a subtract operation in exactly the same manner as explained in connection with the Subtract key 377. Using the third length control tappet 721 causes the lever 718 and the arm 709 (Figs. 13 and 42) to be positioned so that the bent-over ear 708 is opposite the total step 705 on the control lever 691 to position said lever 691 and the control slide 513 in total position, to cause the No. 1 totalizer to be engaged and disengaged in total time, in the manner explained earlier herein. Using the second length control tappet 721 causes the selecting lever 718 and the arm 709 to be positioned in adding position, in which position the bent-over ear 708 is opposite the plus step 706, to position the control lever 691 and the slide 513 in adding position, to cause said control lever to control the latch 585 in the manner explained earlier herein, to cause the No. 1 or balance totalizer to be engaged and disengaged in adding time.

Use of the first length or shortest control tappet 721 (Figs. 13 and 42) permits maximum movement of the selecting lever 718 and the selecting arm 709 to position said arm so that the bent-over ear 708 is opposite the non-add step 707 of the lever 691, to position said lever and the control slide 513 in non-adding position, whereupon said control lever moves the latch 585 full distance clockwise to ineffective position, to prevent the engaging bar 586 from imparting any engaging or disengaging movement to the link 589 and the No. 1 totalizer.

The sensing tips 720 (Figs. 13 and 44) on the levers 718 and 723 to 727 extend through corresponding guide slots in a top plate 748 secured to the cross frame 133 and the carriage supporting frames 139 and 140.

It will be seen, from a comparison of spaces 9 and 10 of the time chart, Fig. 47, that the cam 744 (Fig. 44) restores the yoke 734 and the sensing levers, including the No. 1 sensing lever 718, clockwise to normal position prior to return movement of the control lever 691 (Fig. 28) under influence of the cam 606. However, when said control lever 691 is positioned in any position except subtract position, the hook-shaped upper end of said lever latches over the ear 708 to retain the arm 709, the link 711, and the arms 712 and 715 in sensing position until said lever 691 is restored to normal position near the end of the machine operation by the cam 606. After the lever 691 is restored to normal position, as shown in Fig. 42, the spring 717 returns the arms 715, 712, and 709 to normal positions, as shown here.

In carriage-controlled sub-total operations, the sensing lever 718 for the No. 1 or balance totalizer is positioned by a total control tappet 721 (Figs. 13 and 42) to total position, and said lever in turn positions the arms 715, 712, and 709 in total position, in which the ear 708 is opposite the total step 705 on the control lever 691 to position said lever and the control slide 513 in total position, in exactly the same manner as in total operations. A sub-total control tappet 751 (Figs. 13, 37, and 44) cooperates with the upwardly-extending sensing projection of a sub-total sensing lever 752 supported by the rod 719 in exactly the same manner as the No. 1 sensing lever 718, said lever 752 being urged counter-clockwise by one of the springs 745 to maintain a finished surface thereon in contact with the bail of the yoke 734 in exactly the same manner as the lever 718. The left-hand end of the sub-total sensing lever 752 overlies and cooperates with an arm 753 free on the rod 713 and similar in every respect to the arm 715, said arm 753 being flexibly connected by a spring to a companion arm 754 similar to the arm 712. The arm 754 is connected by a link 755 (Figs. 26 and 37) to a selecting arm 756 having a bent-over ear which cooperates with the hook-shaped upper end of the sub-total control lever 665 for controlling the sub-total slide 519.

Normally a spring (not shown) similar to the spring 717 (Fig. 42) retains an extension of the arm 753 (Fig. 37) in contact with the stop rod 703 to position the arm 756 as shown in full lines in Fig. 26, so that the bent-over ear thereon is above the hook-shaped extension of the sub-total lever 665. In sub-total operations, the sub-total control tappet 751 permits sufficient sensing movement of the sub-total sensing lever 752, under influence of the yoke 734 (Figs. 13, 44, and 46) to move the bent-over ear on the arm 756 (Figs. 26 and 37) into the path of the hook-shaped end of the sub-total control lever 665, as shown in dot-and-dash lines in Fig. 26. This has exactly the same effect as depression of the Sub-Total key 375 and prevents movement of the sub-total control lever 665 and the sub-total slide 519 under influence of the yoke 693, to retain the downward projection 666 out of the path of the finger 667, so that said finger may move clockwise under influence of the cam lever 508 and the cam 511. This permits the lever 671 (Fig. 28) for the No. 1 or balance totalizer to move clockwise under influence of the yoke 668, to latch the bar 609 in its downward position, in the manner explained in connection with sub-total and sub-balance operations, controlled by the Sub-Total key 375 and the Sub-Balance key 378, to cause the No. 1 or balance totalizer to be engaged with and disengaged from the racks 242 in sub-total time.

In column positions of the traveling carriage in which the No. 1 totalizer is not to be selected for a sub-total recording operation, a short control tappet 751 (Fig. 13) is used to permit full sensing movement of the lever 752 to move the arm 756 (Fig. 26) full distance clockwise to a position which is the equivalent of non-add position, so that the bent-over ear on said arm will be out of the path of the hook-shaped upper end of the sub-total control lever 665, to permit said lever and the sub-total slide 519 to move full distance counter-clockwise and forwardly, respectively, which movement is determined by the slot in the forward end of said control slide 519 in cooperation with the collar 520. This permits the projection 666 (Fig. 26) on the slide 519 to move over the finger 667 of the yoke 668 to obstruct clockwise movement of said yoke under influence of the lever 588 and the cam 511, to retain the lever 671 (Fig. 28) and the corresponding latch 672 in ineffective positions, so that the bar 609 will not be latched in its downward position, as is necessary in sub-total and/or sub-balance operations.

*Non-add operations*

Depression of the Non-Add key 374 (Figs. 3 and 33) causes the selecting arm 709 for the No. 1 or balance totalizer to be rocked to non-add position, irrespective of the position to which the arm would be moved under control of the traveling carriage in columnar positions thereof, as explained above. Depression of the Non-Add key likewise causes the selecting arms, similar to the arm 709, for the other totalizers to be rocked to non-add position, to render the carriage-controlled selecting mechanism ineffective to control the selection and conditioning of any of the totalizers for any operation other than a non-adding operation.

Depression of the Non-Add key 374 (Figs. 31 and 32) causes the stud 413 therein, in cooperation with an angular camming surface 758 in an opening in a control plate 759 mounted for horizontal shifting movement by means of rollers on the studs 416, to shift said plate rearwardly against the action of its spring 760. A link 760, pivotally connected between the plate 759 and a downward extension of a control pawl 761 free on a rod 762 supported between the plate 583 (Figs. 36 and 37) and the left frame 131, causes rearward movement of said plate 759 to rock the pawl 761 clockwise to move the forwardly-extending end thereof out of the path of a bent-over ear 763 on a link 764. The rearward end of the link 764 is pivotally connected to a downwardly-extending arm of a yoke 765 free on the rod 762, while the forward end of said link is slotted to embrace a roller on a stud 766 supported between the plate 583 and the left frame 131.

A right-hand arm of the yoke 765 carries a stud 768 (Figs. 31, 32, and 39), which engages a slot in an operating slide 769 having therein parallel slots, one of which cooperates with a roller on the stud 766 and the other of which cooperates with a similar roller on a stud 770 supported by the plate 587, to shiftably mount said slide 769. The slide 769 has a slot which cooperates with a stud 771 in a lever 772 free on the rod 531 and having a foot-shaped extension with an arcuate surface 773, which cooperates with the flattened stud 461 carried by the cam 462.

Immediately after operation of the machine has been initiated, the stud 461 (space 12, Fig. 47) moves out of engagement with the arcuate surface 773 to release the lever 772, the slide 769, the yoke 765, and the link 764 (Fig. 32) to the action of a spring 767, to rock the yoke 765 clockwise. Clockwise movement of the yoke 765 (Figs. 32, 34, and 36) causes the forward edge of its bail, in cooperation with a projection 774 on one arm of a yoke 775 free on the rod 762, to rock said yoke clockwise in unison therewith.

Rearward extensions of the arms of the yoke 775 carry axially alined studs 776, 777, and 778, said stud 778 (Figs. 31 and 32) adapted to cooperate with a forward extension of a No. 5 or overdraft arm 779 flexibly connected by a spring 780 to a companion arm 781, both of said arms being free on the rod 713, to rock said arms counter-clockwise against the action of a spring 782. Counter-clockwise movement of the arm 781 is tansmitted by a link 783 to a No. 5 control arm 784 free on the rod 710 and having a bent-over ear which cooperates with the steps on a hook-shaped rearward extension of a No. 5 control lever 785 (Figs. 29 and 32), which is connected by gear teeth to the No. 5 control slide 517 and cooperates therewith in exactly the same manner as explained for the No. 1 lever 601 and its associated slide 513 (Fig. 20). Clockwise movement of the arm 784 moves the bent-over ear thereon to non-add position, as shown in dot-and-dash lines in Fig. 32, to cause the No. 5 totalizer to be selected and conditioned for a non-add operation regardless of the previous positioning of the sensing lever 726 (Fig. 37) by the traveling carriage.

Clockwise movement of the yoke 775 (Figs. 31, 36, and 42) causes the stud 777, in cooperation with the forward extension of the arm 715, to rock said arm and its companion arm 712 counter-clockwise. Counter-clockwise movement of the arm 712 is transmitted by the link 711 to the arm 709 and moves said arm to non-adding position, as shown in dot-and-dash lines (Fig. 42), to cause the No. 1 or balance totalizer to be selected for a non-add operation, when the Non-Add key 374 is depressed, and this regardless of the positioning of the sensing lever 718 by the control tappets mounted in columnar positions of the traveling carriage. The stud 776 (Figs. 31 and 36), in cooperation with the forward extension of the arm 753 (Figs. 26 and 37) and through the link 755, rocks the control arm 756 clockwise to ineffective position, so that the sub-total control lever 665 and the sub-total slide 519 are free to move full distance counter-clockwise and forwardly, respectively, to move the projection 666 over the finger 667, to prevent functioning of the sub-total mechanism when the Non-Add key 374 is depressed.

Depression of the Non-Add key 374 (Fig. 48) causes a projection 787 thereon, in cooperation with a bent-over ear 788 on a latch 789 free on the rod 710, to rock said latch clockwise against the action of a spring 790 tensioned between said latch and a lever 791 free on the rod 610. Clockwise movement of the latch 789 disengages a tooth thereon from a corresponding tooth on a link 792, the forward end of which is slotted to embrace a collar on the rod 766, while said link's rearward end is pivotally connected to a downward extension of an arm 793 free on the rod 762. The arm 793 has, in an upward extension thereof, a slot which embraces a stud 794 in an arm 795 secured in fixed relationship to a companion arm 796 by a bushing or hub 797 free on the rod 762. A forward extension of the arm 793, in cooperation with a fixed stop stud 798, determines the extent of the counter-clockwise movement of said arm and the connected arms 795 and 793. Disengagement of the latch 789 releases the link 792 and the arms 793, 795, and 796 to the action of a spring 799 tensioned between said link and a fixed stud, which spring immediately urges said link and said arms rearwardly and clockwise, respectively, but is prevented from moving said parts by a stud 800 on the arm 793 in cooperation with an extending finger 801 (Figs. 31 and 32) of the left-hand arm of the yoke 765, until said yoke 765 is operated by the slide 769 under control of the cam lever 772 (see also Fig. 39). Likewise it is evident that, unless the yoke 765 is released for action by movement of the pawl 761 (Fig. 32) to ineffective position, by depression of one of the proper control keys, the arms 793, 795, and 796 are retained against movement, even if the latch 789 is moved to ineffective position, as explained above.

The arm 793 (Figs. 31 and 48) carries a stud 802, which cooperates with the forward extension of an arm 803 flexibly connected to a companion arm 804 by a spring 805 tensioned therebetween, and a spring 806 urges said arm 803 clockwise into contact with the stop rod 703. The arm 804 is connected by a link 807 (Fig. 37) to a totalizer control arm 808, which arm cooperates with a control lever 692 (Figs. 25 and 29) for the No. 6 totalizer. The lever 692 is similar in every respect to the lever 691 for the No. 1 totalizer and has a rearward extension, which cooperates with the tail of the latch 693 (Fig. 25) pivotally connected to a No. 6 engaging link 694, which is similar to and functions exactly like the link 580 for the No. 1 or balance totalizer (Fig. 42) to engage and disengage the wheels of the No. 6 or item totalizer with and from the racks 243 (Fig. 8-B).

Clockwise movement of the arm 793 (Figs. 31 and 48), under the control of the yoke 765, according to the time given in space 12 of the time chart, Fig. 47, rocks the arms 803 and 804 counter-clockwise (Fig. 48), which movement, by means of the link 807, moves the arm 808 to non-adding position, in the manner explained in connection with the No. 1 or balance totalizer, to cause the lever 692 (Fig. 25) to move the latch 693 for the No. 6 or item totalizer to non-adding position, so that no movement will be imparted to the link 694 by the engaging bar 589. Rearward extensions of the arms 795 and 796 (Figs. 31, 37 and 48) support a rod 812 in axial alinement with the studs 776, 777, and 778, said rod cooperating with forward extensions of the arms for the No. 2, No. 3, and No. 4 totalizers, similar in every respect to the arm 803 for the No. 6 totalizer, to cause said No. 2, No. 3, and No. 4 totalizers to be non-added in exactly the same manner as explained for the No. 6 totalizer.

From the above explanation, it is evident that depression of the Non-Add key 374 causes the selecting and conditioning mechanisms for all the totalizers to be moved to non-adding position, and in this case any control of said mechanisms by the traveling carriage in its columnar positions is rendered ineffective.

Near the end of machine operation, a roller 813 (Fig. 39 and space 12, Fig. 47), secured to one face of the cam 462, in cooperation with the surface 773 on the lever 772, restores said lever, the slide 769, and the yoke 765 to normal position, as shown here. Restoring of the yoke 765, through the projection 774 on the right arm of the yoke 775, permits said yoke 775 to be restored under the influence of the spring 717 (Fig. 42) to normal position. Likewise, restoring counter-clockwise movement of the yoke 765 causes the finger 801 (Fig. 31), in cooperation with the stud 800, to restore the arms 793, 795, and 796 also counter-clockwise to normal positions, against the action of the spring 799. Return counter-clockwise movement of the arm 793 returns the link 792 forwardly, permitting the latch 789, under influence of the spring 799, to latch over the upward projection of said link, to retain said link and connected parts in normal positions, as shown here.

*Non-add control in sub-total operations*

The stud 413 in the Sub-Total key 375 (Figs. 31 and 32) cooperates with a camming slot 815 in the control plate 759 in exactly the same manner as the Non-Add key 374, and depression of said Sub-Total key shifts said control plate rearwardly, against the action of the spring 758, to move the pawl 761 to ineffective position to free the yoke 765 for operation in exactly the same manner as the Non-Add key 374. Likewise, the Sub-Total key 375 has an extension 817, which cooperates with the bent-over ear 788 of the latch 789, in exactly the same manner as the Non-Add key 374, to rock said latch clockwise to ineffective position, upon depression of said Sub-Total key 375. This releases the link 792 to the action of the spring 799 for operating movement in unison with the yoke 765, as explained above.

From the foregoing it will be seen that depression of the Sub-Total key 375 causes the control arms (Fig. 37) for all the totalizers, including the arms 793 and 808 for the No. 1 and No. 6 totalizers, respectively, to be moved to non-add position to prevent the totalizer selecting and conditioning mechanism from being controlled by the traveling carriage in its columnar positions. In sub-total operations, as in non-adding operations, operation of the yoke 775 (Fig. 31), under influence of the yoke 765, causes the stud 776 (Figs. 26 and 37) to rock the control arm 756 for the sub-total control lever 665 to ineffective position, so that positioning of said lever and the control slide 519 will not be influenced by the sensing mechanism, which is in turn controlled by the traveling carriage in its columnar positions. However, this does not interfere with the positioning of the control slide 519 by the stud 687 and the projection 688 (Fig. 26) in the manner explained earlier herein, so that the projection 666 is retained out of the path of the finger 667, thereby rendering the mechanism shown in Fig. 28 and explained earlier herein effective for latching the bar 669 in down position so that the selected totalizer will be engaged and disengaged in sub-total timing.

As explained previously, the Sub-Total key 375 is used in conjunction with the No. 2, No. 3, and No. 4 Total keys 376 for causing the selected totalizer to be engaged and disengaged in sub-total time. Inasmuch as the control arms for the control slides 514, 515, and 516 (Fig. 29) for the No. 2, No. 3, and No. 4 totalizers have been moved to non-adding position, said slides are free to move full distance forwardly and be positioned by the studs 684, 685, or 686, depending upon which of the Total keys 376 is depressed, to select the corresponding totalizer for a sub-total operation. It should therefore be clear that, in sub-total operations, all of the totalizers, except the totalizer selected by depression of one of the Total keys 376, are non-added.

The studs 413 (Fig. 32) in the control keys 377 to 380 inclusive cooperate with corresponding camming surfaces 818 in the plate 759, when the corresponding key is depressed, to shift said plate 759 and the link 760 rearwardly to rock the pawl 761 to ineffective position to free the yokes 765 and 775 for operation in the manner explained above, to cause the sub-total control arm 756 (Figs. 26, 32, 37, and 42), the No. 1 control arm 709, and the No. 5 control arm 784 to be moved to non-add position, so that the control keys 377 to 380 inclusive are free to control the selecting and conditioning of the various totalizers by means of their respective studs 622 to 625 (Figs. 28 and 29) inclusive, in cooperation with the control slides 513 to 519 inclusive.

*Overdraft mechanism*

When the No. 1 or balance totalizer is in a positive condition, it is always selected for recording purposes in sub-balance and balance operations, which operations are also referred to as sub-total and total recording operations when reference is made to other than the No. 1 or balance totalizer. When said balance totalizer changes from a positive condition to a negative condition, mechanism is automatically rendered effective for causing the No. 5 or overdraft totalizer to be selected for recording purposes in sub-balance and balance operations, and this procedure is the same irrespective of whether the operations are initiated through the traveling carriage in its columnar positions, or through the control keys. When the balance totalizer changes from a negative condition to a positive condition, the automatic controlling mechanism is rendered ineffective, and, as before, the No. 1 or balance totalizer is selected for recording purposes in sub-balance and balance operations.

Normal sub-total and total recording operations, in which the No. 1 or balance totalizer is in a positive condition, will be known herein as "sub-balance" and "balance" operations. Overdraft operations, in which the No. 1 totalizer is overdrawn and the No. 5 totalizer is selected for recording purposes, will be known herein, respectively, as "sub-balance of the overdraft" and "balance of the overdraft" operations.

It is to be understood that in balance operations, in which the No. 1 or balance totalizer is cleared, the amount cleared therefrom is simultaneously added into the No. 5 or overdraft totalizer in order to simultaneously zeroize said totalizer. Likewise, in balance of the overdraft operations, in which the No. 5 totalizer is cleared, the amount cleared therefrom is simultaneously added into the No. 1 totalizer in order to zeroize said totalizer. In sub-balance operations, the No. 5 totalizer remains inactive, or non-added, and in sub-balance of the overdraft operations the No. 1 totalizer remains inactive, or non-added.

By referring to Figs. 8-B and 41, it will be recalled that, in the beginning of subtract operations in the No. 1 or balance totalizer, the transfer pawl control bar 573 is rocked counter-clockwise as viewed in Fig. 8-B and clockwise as viewed in Fig. 41 to move the add transfer pawls 560 out of the path of the tripping teeth on the tripping cams 559 and to simultaneously move the subtract transfer pawls 561 into the path of said teeth. When the highest order wheel 559 (Fig. 41) of the No. 1 or balance totalizer passes through zero while being rotated in a subtractive direction—i. e., said totalizer becomes overdrawn —one of the diametrically opposed tripping teeth on the tripping cam 550 rocks the highest order subtract transfer pawl 561 clockwise to disengage an ear 841 on a rearward extension thereof from a projection on an overdraft shaft actuator 842 free on a rod 843 supported by the totalizer framework. This releases the overdraft actuator 842 to the action of a spring 844, which immediately moves said actuator a slight distance until an upward extension thereof contacts the rearward edge of the transfer restoring bar 566, which bar operates in subtract operations according to the time given in space 7 of the chart, Fig. 47, and at this time has received restoring movement and is being retained in normal position by the hooks, in the well-known manner, as shown in dot-and-dash lines in Fig. 41.

After the racks 243 have completed their initial rearward movement and the wheels of the balance totalizer have been disengaged therefrom, the transfer restoring bar 566 is released to the action of its spring, which immediately urges it clockwise (Fig. 41) to effect the transfer movement of all tripped transfer pawls and to simultaneously effect clockwise movement of the overdraft actuator 842, under influence of its spring 844. Clockwise movement of the actuator 842 causes a projecting shoulder thereon, in cooperation with a bent-over ear 845 on an arm 846 secured on an overdraft shaft 847 journaled in the totalizer framework, to rock said arm 846 and said shaft 847 counter-clockwise. Secured on the shaft 847 is a crank 848, which moves counter-clockwise in unison therewith and, by means of a link 849, which connects said crank to a bell crank 850 free on the rod 713, rocks said bell crank clockwise. Clockwise movement of the bell crank 850 (Figs. 31 and 41) by means of a slot in a forward extension thereof, in cooperation with a stud 851 in a rearward extension of an arm 852 free on the rod 762, rocks said arm counter-clockwise. The arm 852 has a curved forward extension, which is maintained in yielding contact with a stud 853 in an extension of an arm of a yoke 854 free on the rod 762, by a spring 855, tensioned between said arm 852 and said stud 853. The spring 855 forms a yielding connection between the arm 852 and the yoke 854. Consequently said arm and said yoke move in unison in a counter-clockwise direction to move pawls 856 and 857, formed by forward extensions of said yoke 854, upwardly out of the paths of corresponding bent-over ears 858 and 859 on overdraft control slides 860 and 861, mounted for angular shifting movement by means of parallel slots therein in cooperation with collars on the rods 766 and 770. This frees the overdraft control slides 860 and 861 for operation to control the No. 1 and No. 5 totalizers in overdraft operations, as will be explained presently.

Should the No. 1 totalizer be changed from a negative condition to a positive condition, by the addition therein of an amount large enough to overbalance the amount of the overdraft, the pawls 856 and 857 (Figs. 31 and 41) would be restored to effective positions, as shown here.

In adding operations, the transfer control bar 573 is restored counter-clockwise from the position shown in Fig. 41 to normal or adding position and, in being thus restored, rocks the subtract pawls 561 out of the path of the tripping teeth on the cams 559 and simultaneously rocks the adding pawls 560 into the path of said teeth. Simultaneously with the restoring of the bar 573, the transfer restoring bar 566 rocks the overdraft actuator 842 counter-clockwise against the action of the spring 844 to ineffective or normal position, whereupon an upwardly extending ridge 862 on said bar 573 moves beneath an extending shoulder on said actuator 842 to retain said actuator in untripped position, as shown here. Simultaneously the ridge 862 moves from beneath a downward projection on an overdraft shaft restoring arm 863, free on the rod 843, to permit a downward extension thereof to come to rest on a bent-over ear 826 on the highest order add-transfer pawl 560.

When the highest order wheel 559 passes through zero while moving in an additive direction, one of the diametrically opposed teeth on the tripping cam 559 therefor engages the highest order add-transfer pawl 560 and rocks said pawl counter-clockwise (Fig. 41) to disengage the ear 826 from the downward extension of the restoring arm 863 to release said arm to the action of its spring (not shown), similar to the spring 844, which immediately urges said arm clockwise until an upward extension thereof contacts the transfer restoring bar 566, which is in the position shown here in dot-and-dash lines.

In adding operations, the transfer restoring bar 566 operates according to the time given in space 6 of the chart, Fig. 47, and, after the racks 243 (Fig. 8-B) have completed their return movement forwardly and the No. 1 or balance totalizer has been disengaged therefrom, the bar 566 is released to spring action, which immediately moves said bar clockwise (Fig. 41) to effect the transfer of tens digits from lower denomination to higher denomination in the usual manner. Clockwise movement of the bar 566 permits the restoring arm 863 to move in unison therewith, whereupon the downward extension thereof engages a bent-over ear 827 on the lower end of the arm 846 to rock said arm and the overdraft shaft 847 clockwise (Fig. 41) to normal position, to restore the pawls 856 and 857 to effective position, as shown here.

Regardless of the moving of the pawls 856 and 857 to ineffective positions, as explained above, the control slides 860 and 861 (Figs. 34 and 35) are retained against rearward movement unless the traveling carriage is located in the corresponding columnar position. When the traveling carriage is in the Balance columnar position, the balance control slide 860 is released for rearward movement, and, when said traveling carriage is located in the Sub-Balance columnar position, the sub-balance control slide 861 is released for rearward operating movement.

The bent-over ear 858 (Figs. 31 and 34) cooperates with a pawl 864 formed by a forward extension of the right arm of a yoke 865 free on the rod 762. A rearward extension of the right arm of the yoke 865 carries a stud 866, which underlies and cooperates with an arm 867 free on the rod 713 and having a stud 868, which is maintained in yielding contact with a shoulder formed on a companion arm 869, by a spring 870 tensioned between said arms. The arm 869 is slotted to embrace the left-hand end of a balance of overdraft selecting lever 871 (Figs. 13, 37, and 44) pivotally mounted on the rod 719 and urged counter-clockwise by a corresponding one of the springs 745 into contact with a stop stud 872 in an upturned portion of the plate 747. The selecting lever 871 is not a sensing lever and therefore does not cooperate with the bail of the yoke 734, as do the sensing levers 718 and 723 to 727 inclusive for the six totalizers and the sub-total sensing lever 752, but instead has an upturned extension adapted to be engaged by a corresponding tappet 873 (Figs. 13 and 44) mounted in the control block 722, which is located in the sub-balance column or position of the traveling carriage (Fig. 24).

When the traveling carriage moves into the Balance columnar position, the tappet 873 engages the upward extension of the lever 871 and rocks said lever clockwise (Fig. 44) against the action of the spring 745, said lever in turn rocking the arms 869 and 867 clockwise (Fig. 34) as viewed here, whereupon said arm 867, in cooperation with the stud 866, rocks the yoke 865 counter-clockwise to move the pawl 864 out of the path of the bent-over ear 858 to free the balance of overdraft control slide 860 for rearward movement, in case the balance totalizer is in an overdrawn condition and the pawls 856 and 857 (Fig. 41) have been moved to ineffective position, as explained earlier herein. The lever 871 (Fig. 44) has a downwardly extending tip 874, which cooperates with a corresponding slot in the plate 747 to prevent excessive side-play of said lever.

A downward extension of the left-hand arm of the yoke 865 is pivotally connected by a link 875 (Figs. 31 and 33) to a control plate 876 slidably mounted between rollers on the studs 416. Counter-clockwise movement of the yoke 865, when the traveling carriage is moved to the Balance column, shifts the control plate 876 forwardly against the action of its spring 877 to move locking shoulders 878, in openings in said plate, beneath flat surfaces on the studs 413 in the keys 375, 376, and 378, to lock said keys against depression in balance of the overdraft operations. Forward movement of the control plate 876 moves camming surfaces 879, in openings therein, into cooperative relationship with the studs 413 in the Subtract key 377 and the Add key 380, so that depression of either of these keys will restore said control plate 876 rearwardly to move the pawl 864 into the path of the ear 858 (Fig. 34) to prevent the performance of a balance of overdraft operation when the traveling carriage is in Balance column and either of these keys is depressed.

Forward movement of the control plate 876 moves a clearance portion of a slot 880 therein, for the stud 413 for the Balance key 379, opposite said pin, so that depression of the Balance key will have no effect upon said plate. A clearance opening is provided in the control plate 876 for the stud 413 for the Non-Add key 374 (Fig. 33), so that movement of said plate will have no effect upon said key, and also so that depression of said key will have no effect upon the movement of said plate. It will be noted that forward movement of the control plate 876, in balance of overdraft operations, locks all control keys which have anything to do with the selection of other than the No. 1 or balance totalizer, in undepressed positions. Likewise it will be noted that, when any one of these control keys is depressed, the stud 413 therein, in cooperation with a vertical extension of the corresponding shoulder 878, obstructs forward movement of the control plate 876 to retain said plate and the pawl 864 in the position shown here, to in turn prevent rearward movement of the slide 860.

The slide 860 (Figs. 34 and 39) has therein a slot which cooperates with the stud 771 carried by the lever 772, and, when the stud 461 rides off the surface 773 of said lever, according to the time given in space 12 of the chart, Fig. 47, the slide 860 is released to the action of a spring 882, which, in case there is an overdraft, immediately shifts said slide rearwardly. Rearward movement of the slide 860 causes the rearward end thereof, in cooperation with a depending extension 883 of an arm 884 free on the rod 762 and having in the upper end thereof a slot which engages a stud 885 in the yoke 775, to rock said arm and said yoke clockwise (Figs. 31 and 34) to cause the studs 776, 777, and 778, carried by the arms of said yoke 775, to rock the control arms for the sub-total control mechanism and the No. 1 and No. 5 totalizer selecting mechanisms to ineffective and non-adding positions, respectively, as explained earlier herein.

Rearward movement of the slide 860 from the position shown in full lines to the position shown in dot-and-dash lines in Fig. 34 causes a slot 886 therein, in cooperation with a stud 840 in a crank 839, to rock said crank and a companion crank 837 counter-clockwise against the action of a spring 887 tensioned between said arm 839 and a latch 888 free on the rod 610. The cranks 839 and 837 are connected by a hub 838 free on the rod 766. Counter-clockwise movement of the cranks 839 and 837 causes the stud 836, in cooperation with the upwardly extending finger of the latch 585 for the No. 1 totalizer, to rock said latch clockwise from subtract position, as shown here in full lines, to adding position, as shown here in dot-and-dash lines. This causes the No. 1 or balance totalizer to be engaged and disengaged in adding time, in which time, it will be recalled by a reference to Figs. 27 and 34, the engaging bar 586, in its second movement, engages the surface 689 to shift the latch 585 and the link 580 forwardly, according to the time given in space 4 of the time chart, Fig. 47, to engage the wheels of the balance totalizer with the racks 243 after said racks have completed their initial movements and are dwelling in moved position (see also space 1 of the chart, Fig. 47).

Inasmuch as the slide 860 (Fig. 34) remains in moved position until near the end of machine operation, engaging movement of the latch 585 and the link 580 would withdraw the upward finger of said latch from the stud 836, and this permits said latch to latch over the engaging bar 586. However, the latch 585 is prevented from doing this and is retained in adding position through the medium of the latch 888 (Fig. 34), which is rendered effective by rearward movement of the slide 860. Rearward movement of the slide 860 withdraws a tip 889 thereon from the latch 888 to release said latch to the action of the spring 887. The spring 887 urges the latch 888 counter-clockwise to cause a shoulder 890 thereon to engage a right-hand extension of the stud 608 when the bar 609 is shifted downwardly by the cams 619 and 620 (Fig. 42 and space 5 of the chart, Fig. 47) to latch said bar in its downward position. This causes the stud 608, cooperating with the top surface of the tail 600, to retain the latch 585 in adding position when the upward extension thereof is withdrawn from the stud 836. Return movement of the slide 860, near the end of machine operation, as will be explained presently, causes the tip 889 to engage and rock the latch 888 clockwise (Fig. 34) to disengage the shoulder 890 from the stud 608 to release the bar 609 to the action of the spring 615 (Figs. 28 and 42), which spring immediately restores said bar upwardly and simultaneously restores the engaging latch 585 to normal or subtract position, as shown in Fig. 34 in full lines.

Rearward movement of the slide 860, in balance of the overdraft operations, causes a stud 891 (Figs. 32 and 34) carried thereby, in cooperation with an upward projection 892 of the link 783 for the No. 5 totalizer selecting and conditioning mechanism, to position said link and the arm 784 in total position, to cause the No. 5 totalizer to be cleared and the amount therein simultaneously added in the overdrawn No. 1 or balance totalizer to simultaneously zeroize said balance totalizer.

Use of the Balance key 379 (Figs. 33 and 34) for initiating a balance of the overdraft operation causes the stud 413, upon depression of said key, in cooperation with the camming surface 889, to shift the control plate 876 forwardly, which, through the link 875, rocks the yoke 865 counter-clockwise to move the pawl 864 out of the path of the bent-over ear 858 on the slide 860 to release said slide for operation in exactly the same manner as explained above.

Likewise, depression of the Balance key 379 causes the stud 413 (Figs. 31 and 32), in cooperation with the camming surface 818, to shift the control plate 759 rearwardly to rock the pawl 761 out of the path of the link 764 to free the yoke 765 for clockwise movement under influence of the lever 772, as explained earlier herein. Clockwise movement of the yoke 765 causes the bail thereof, in cooperation with the projection 774, to rock the yoke 775 clockwise in unison therewith. However, this latter is of no effect in balance of the overdraft operations, as rearward movement of the slide 860 (Fig. 34) causes said slide to engage the extension 883 of the arm 884 to rock the yoke 775 clockwise to cause the control arms for the No. 1 and No. 5 totalizers to be moved to non-adding position and to cause the control arm for the sub-total control slide 519 (Fig. 26) and the control lever 665, associated therewith, to be moved out of the path of the hook-shaped upper end of said lever, so that said slide 519 is free to move full distance forwardly until the projection 666 moves over the finger 667 to render the latching mechanism for the bars 609 (Fig. 28) ineffective in balance of the overdraft operations.

The stud 891 (Figs. 32 and 37), in cooperation with a projection on a link for the No. 2 totalizer (similar to the link 783 for the No. 5 totalizer), causes a control arm 881 (Fig. 37) for said totalizer to be retained in subtract position, to cause the amount of the overdraft to be subtracted from the No. 2 totalizer, to correct the total of the new balance stored therein.

In balance of the overdraft operations, initiated either by the traveling carriage or by depression of the Balance key 379, the No. 6 or item totalizer is totalized and the No. 3 and No. 4 totalizers are non-added.

From the above description it is to be understood that the present machine is arranged so that a positive reading of the overdraft may be obtained in one cycle of machine operation by the use of an overdraft totalizer, which is always complementary to the balance totalizer, and, when the balance totalizer is overdrawn, mechanism functions automatically to control the balance and overdraft totalizers to cause the overdraft totalizer, which now contains a positive recording of the overdraft, to be selected for a total or clearing operation and simultaneously to cause the No. 1 or balance totalizer to be selected for an adding operation, so that the amount cleared from the overdraft totalizer will be added to the amount in the balance totalizer to simultaneously zeroize said balance totalizer.

*Sub-balance of overdraft operations*

When the traveling carriage 136 moves into the sub-balance columnar position, a sub-balance tappet 893 (Fig. 13) engages an upward extension on a sub-balance selecting lever 894 and rocks said lever clockwise (Fig. 44), said lever being similar in every respect to the balance selecting lever 871. The lever 894 has, on its left-hand end, a rounded portion which engages a slot in an arm 895 (Figs. 35, 37, and 44) flexibly connected to a companion arm 896 by a spring 897. Clockwise movement of the lever 894 rocks the arms 895 and 896 also clockwise (Fig. 35), which movement of said arm 896 causes a forward extension thereof, in cooperation with a stud 898 in a rearward extension of a yoke 899 free on the rod 762, to rock said yoke counterclockwise to move a pawl 900, formed on its right-hand end, out of the path of the bent-over ear 859 of the slide 861, to free said slide for rearward movement in sub-balance of the overdraft operations, after the overdraft pawls 856 and 857 (Fig. 41) have been rocked to ineffective positions under influence of the mechanism shown here and explained earlier herein.

Counter-clockwise movement of the yoke 899 (Figs. 31 and 33), through a link 901, pivotally connecting a downward extension of said yoke and an upward extension of a locking plate 902 similar to the plate 876, shifts said plate 902 forwardly, against the action of its spring, to cause locking shoulders formed in openings therein, in cooperation with the studs 413 in the control keys 375, 376, and 379, to lock said keys against depression during sub-balance of the overdraft operations which are initiated by the traveling carriage 136 when in the Sub-Balance column. It is to be noted that in this case the Sub-Balance key 378 is not locked against depression and that camming surfaces, similar to the camming surface 879, are provided for the studs 413 in the Subtract key 377 and the Add key 380, which, upon depression of either of these keys, shift the plate 902 rearwardly to return the pawl 900 into the path of the ear 859 to nullify a sub-balance of overdraft operation and to cause the No. 1 or balance totalizer to be selected for the operation represented by the depressed control key 377 or 380 in preference to said sub-balance of overdraft operation.

A spring 905 urges the slide 861 (Figs. 33, 35, and 39) rearwardly to normally maintain the forward wall of a slot 904 therein in yielding engagement with the stud 771 in the lever 772. Therefore, movement of the pawl 900 to ineffective position releases the slide 861 to the control of said lever 772 and the cam 462, to cause said slide to be operated, according to the time given in space 12 of the chart, Fig. 47, in exactly the same manner as explained for the balance of overdraft slide 860 (Fig. 34).

Initial movement of the slide 861 (Fig. 35), from the position shown in full lines to the position shown in dot-and-dash lines, causes its rearward end, in cooperation with the downward extension of the arm 884, to rock the yoke 775 clockwise to cause the control arms 709 and 784 (Figs. 32 and 33) for the No. 1 and No. 5 totalizers to be moved to non-adding positions and to cause the sub-total control arm 756 (Fig. 26) to be moved out of the path of the hook-shaped upper end of the sub-total control lever 665. Rearward movement of the sub-balance slide 861 (Fig. 35), under influence of the spring 905, causes a slot 906 in said slide, cooperating with the stud 840, to rock the cranks 837 and 839 to the position shown in dot-and-dash lines. Movement of the crank 837 causes the stud 836 therein, in cooperation with the upward extension of the No. 1 engaging latch 585, to rock said latch to non-add position, as shown here in dot-and-dash lines, to cause the No. 1 or balance totalizer to be non-added in sub-balance of overdraft operations. Rearward movement of the slide 861 (Figs. 32 and 33) causes a stud 907 carried thereby, in cooperation with a projection 908 on the link 783, to intercept movement of said link and the arm 784 to non-add position and to position said link and said arm in total position. Likewise, rearward movement of the slide 861 causes the stud 907, in cooperation with the projection on the arm 754 (Fig. 37) for the sub-total arm 756 to intercept movement of said link and said arm to ineffective position and to position said arm in the position shown in dot-and-dash lines in Fig. 26, where it will obstruct the movement of the sub-total control lever 665 and the sub-total control slide 519, to retain the projection 666 out of the path of the finger 667 to render the mechanism shown in Fig. 28, and explained earlier herein, effective to latch the sub-total control bar 609 (Figs. 30 and 38) for the No. 5 totalizer in down position, to cause the No. 5 totalizer to be sub-totalized in the manner explained in connection with the No. 1 or balance totalizer.

From the foregoing description it is evident that, in sub-balance of the overdraft operations initiated by the traveling carriage when moved to the Sub-Balance column, the No. 5 or overdraft totalizer is sub-totalized, the No. 1 or balance totalizer is non-added, and, in the machine as presently arranged, the No. 2, No. 3, No. 4, and No. 6 totalizers are likewise non-added.

Initiation of a sub-balance of the overdraft operation by depression of the Sub-Balance key 378 (Figs. 3 and 33) causes the stud 413 therein, in cooperation with a camming surface 909 formed in an opening in the control plate 902, to shift said plate forwardly to rock the pawl 900 (Figs. 33 and 35) out of the path of the ear 859 of the slide 861 to free said slide for rearward movement under influence of the spring 905 and the stud 771, when the pawls 856 and 857 (Fig. 41) have been rocked to ineffective position by the occurrence of an overdraft in the No. 1 or balance totalizer.

Rearward movement of the slide 861 operates in exactly the same manner as explained above to cause the No. 1 or balance totalizer to be non-added and the No. 5 or overdraft totalizer to be sub-totalized, and, in addition, the square stud 623 (Fig. 25) in the Sub-Balance key 378, in cooperation with the projection 701 on the No. 6 control slide 518, causes the No. 6 or item totalizer to be sub-totalized. In sub-balance of the overdraft operations initiated by depression of the Sub-Balance key 378, the Nos. 2, 3, and 4 totalizers are non-added, as before.

By referring to Fig. 41, it will be noted that, in addition to the overdraft restoring arm 863 and the associated arm 846, for restoring the pawls 856 and 857 to effective or blocking position, as shown here, when the balance totalizer changes from an overdrawn condition to a plus or positive condition, mechanism is provided for restoring said pawls in balance of the overdraft operations. Rearward movement of the slide 860, in balance of the overdraft operations, causes a stud 910 therein, in cooperation with a downward extension 911 of the arm 852, to rock said arm clockwise to normal position. The spring 855, between said arm and the pawls 856 and 857, permits said pawl 856 to come to rest on the ear 859 of the slide 860 until said slide is returned forwardly, whereupon said spring 855 returns said pawl and its companion pawl 857 to effective position, as shown here.

Near the end of a sub-balance of the overdraft operation, the roller 813 (Fig. 39), in cooperation with the surface 773, restores the lever 772 and the slides 860 and 861 forwardly to normal positions, as shown here, and, as said roller moves beyond the surface 773, the stud 461 engages said surface to retain said lever and said slides in normal positions.

MODE OF OPERATION

The machine embodying the present invention has been arranged for use by banking establishments in the balancing of individual checking accounts. However, this is but a representative use of this machine, as its versatility and its many features make it easily adaptable for use in connection with many different business systems; therefore it is not desired to limit the machine to any one business system or to any particular use in connection with such systems.

The statement slip 1550 shown in Fig. 24 will be used as a basis in explaining one mode of operating the machine, said statement slip being for one individual checking account, and issued in the name of John Doe, in account with Any Bank and Trust Company, Anywhere.

It will be noted that the statement slip is divided into a main portion and a stub portion, said portions being divided by perforations to facilitate their separation. The main portion of the statement slip is divided into the following columns: a Pick-Up Column, three Check Columns, a Deposit Column, and a Sub-Balance Column. In addition, the main portion of the statement slip contains two Date Columns, one of which is between the Pick-Up Column and the first Check Column, and the other of which is between the Deposit Column and the Sub-Balance Column, in which columns the dates are printed in connection with the recording of the first check item and the recording of the sub-balance.

The stub portion of the statement slip contains a Float column, in which the analysis of the float is recorded, a Date column, a Total Item column, and a Balance column. The Date and the Total Items are printed in connection with the recording of the balance in the Balance column.

In the right-hand upper margin of the main portion of the statement slip, definitions of the symbol keys 390 (Fig. 3) when used in connection with debit and/or credit items are listed.

In most banking establishments, it is the general practice to balance each active checking account daily, and the statement slips used in balancing such active accounts are usually of sufficient length to accommodate all of the entries over a certain period of time, generally a month, at the end of which time the stub portion of the statement slip is separated from its main portion, the main portion being mailed to the depositor or customer and the stub portion being retained by the bank as a record.

Before the beginning of the daily posting of active checking accounts, the operator properly inserts a journal sheet with its superimposed carbon paper around the platen roll 309 (Fig. 1), said journal sheet being the full width of both the main portion and the stub portion of the statement slips for the reception of a duplicate recording of every entry made on the statement slips during the day's run.

Prior to the posting of individual checking accounts, all of the active statement slips are removed from the file and placed in a convenient stack or pile near the operator in alphabetical order. With the traveling carriage 136 (Fig. 1) in its extreme right-hand or Pick-Up columnar position and with the platen roll 309 in open-throat position, the operator removes the statement slip 1550 (Fig. 24) for John Doe from the top of the stack, places it in the open throat of the traveling carriage, locates the proper line of the statement slip with the printing mechanism by means of the line-finding device, and then operates the electrical switch, which starts the motor for the traveling carriage and the machine proper.

If this is the first entry to be made on John Doe's statement slip, the operator ascertains the old balance of $500.00 from the last entry on the stub portion of his previous statement slip and sets up said old balance of $500.00 on amount keys 218 (Fig. 3), depression of which amount keys causes the platen roll 309 to be moved from open-throat position to printing position.

After the amount of the old balance, $500.00, has been set up on the amount keys, operation of the machine is initiated by normal depression of the main Release bar 170, during which operation the amount of the previous or old balance is recorded in the Pick-Up column of the statement slip and is simultaneously added into the previously cleared No. 1 or balance totalizer. Normal depression of the Release bar 170 causes the traveling carriage to be tabulated from the Pick-Up column to the next columnar position—that is, the first Check column—at the end of machine operation. Next, the operator sets up the amount of the first check item ($50.00) on the amount keys and, to identify this as a "debit memo" depresses the DM symbol key 390, after which operation of the machine is initiated by normal depression of the main Release bar 170. During operation of the machine, the amount of the first check, $50.00, is recorded in red in the first Check column, the DM symbol is simultaneously recorded immediately to its right, and at the same time the amount of the check is subtracted from the balance of $500.00 in the balance totalizer.

It will be recalled that the ribbon controlling mechanism functions automatically to cause all debit items and all overdraft items to be printed in a distinctive color, such as red.

At the end of the first check posting operation, the traveling carriage 136 tabulates automatically to the second Check column, the amount of the second check ($25.00) is set up on the amount keys, and the machine is again released for operation by normal depression of the Release bar 170. During this second check operation, the amount of the check ($25.00) is subtracted from the balance totalizer and is simultaneously recorded in red in the second Check column, and at the end of this operation, the traveling carriage again tabulates automatically one columnar position to the third Check column.

With the traveling carriage in the third Check columnar position, the amount of the third check ($75.00) is set up on the amount keys, and, as there is one more debit or check item to be posted, the operator initiates operation by normal depression of the Vertical Feed bar 171. During this operation of the machine, the third check item ($75.00) is recorded in red in the third Check column and is simultaneously subtracted from the No. 1 or balance totalizer, and, at the end of the operation, the platen roll is rotated to line-space the record material in preparation for the entry of the fourth check item.

Next, the amount of the fourth check item ($150.00) is set up on the amount keys, the machine is released for operation by normal depression of the Release bar 170, and, during this operation, the amount of the fourth check item ($150.00) is recorded in red in the third Check column, directly beneath the third check item, and is simultaneously subtracted from the balance totalizer. Near the end of machine operation, the traveling carriage 136 tabulates to the next or Deposit columnar position.

With the traveling carriage 136 in the Deposit columnar position, the amount of the deposit ($100.00) is set up on the amount keys, and the machine is released for operation by normal depression of the Release bar 170. During operation of the machine, the amount of the deposit ($100.00) is recorded in black in the Deposit column of the statement slip and is simultaneously added in the balance totalizer.

Near the end of the deposit operation, the traveling carriage 136 tabulates automatically to the next or Sub-Balance column, in which an automatic operation of the machine is initiated by said traveling carriage. In this automatic operation, the balance totalizer is sub-totalized, and the sub-balance of $300.00 is recorded in black in the Sub-Balance column. The sub-balance is identified as such by the symbol "*S," which is automatically printed at the time the sub-balance is printed. At the end of the sub-balance operation, the traveling carriage tabulates automatically to the Float columnar position.

With the traveling carriage located in the Float columnar position, the operator depresses the proper amount keys and initiates machine operation by normal depression of the Release bar 170. Upon operation of the machine, an analysis of the float is recorded in the Float column, and, during this operation, all of the totalizers are automatically non-added, so that the machine will function at this time only as a printing machine.

At the end of the float operation, the traveling carriage tabulates automatically to the Balance column, and, upon arrival in this position, said carriage initiates an automatic operation, during which the balance totalizer is totalized and the amount therein ($300.00) is recorded in black in the Balance column of the statement slip 1559. Simultaneously therewith, the identifying symbol "*" is printed directly opposite said amount to identify it as a positive balance.

During the entering of the various check and deposit items, the automatic item-counting mechanism functions to add "1" in the item totalizer each time each item is recorded. However, when the traveling carriage is in other than the Balance columnar position, the hammers for the item-counting type carriers are locked against printing movement, so that the items will not be recorded as they are automatically entered in the item totalizer. When the traveling carriage 136 is in Balance columnar position, the printing hammers for the item type carriers are unlocked, and, during the balance operation, the item totalizer is totalized to record the total number of items, in this case five, in the Total Item column immediately to the left of the recording of the balance.

It will be noted that, during each posting operation, the date is printed three times, twice upon the main portion of the statement slip 1559 (Fig. 24) and once upon the stub portion of said slip. When the traveling carriage 136 is in the first Check columnar position, the printing hammers for the date type carriers are unlocked, so that the date, "April 12—43," is printed in the Date column immediately to the left of said first Check column simultaneously with the posting of the first check. In a like manner, the date, "April 12—43," is printed simultaneously with the recording of the sub-balance and again with the recording of the balance.

Near the end of the balance operation, the traveling carriage 136 (Fig. 1) tabulates automatically a slight distance beyond the Balance columnar position to render effective mechanism which causes said carriage to be moved in a return direction to the Pick-Up column, and at the same time causes the platen roll 309 to be moved from printing position to open-throat position, so that the statement slip may be readily removed and the next statement slip inserted in the front-feed throat of the machine. In all other columnar positions of the traveling carriage, the automatic throat-opening mechanism is automatically locked against operation to avoid unnecessary opening and closing of the front-feed throat.

In posting or balancing John Doe's checking account for April 13, 1942, the operator picks up the previous or old balance ($300.00) from the last entry in the Balance column, sets this amount up on the amount keys, and releases the machine for operation by depressing the Release bar 170, in exactly the same manner as explained in connection with the former old balance of $500.00. The next two check items of $10.00 and $20.00, respectively, are entered in exactly the same manner as explained above, and, during the printing of the first check item of $10.00, the date, "April 13—43," is simultaneously printed immediately to the left of the first Check column. After the second Check item of $20.00 has been entered in the machine and the traveling carriage 136 has tabulated to the third Check column, the operator sets up the amount of the third Check item ($30.00) on the amount keys, and, as this is a non-count item—that is, not to be automatically accumulated in the item totalizer—the No-Count key 371 (Fig. 3) is also depressed.

Inasmuch as there is no deposit item to be entered in this particular posting operation, it is desirable to have the traveling carriage 136 skip-tabulate from the third Check column to the Sub-Balance column, and this is effected by initiating machine operation by fully depressing the Skip-Tabulating bar 172 and retaining said bar depressed. During this machine operation, the amount of the third check ($30.00) is entered in the third Check column, and the symbol "NC" for the No-Count key 371 is simultaneously recorded immediately to its right. At the end of machine operation, the traveling carriage skip-tabulates from the third Check column to the Sub-Balance column, and, in an automatic operation of the machine, the amount of the balance, $240.00, the sub-balance symbol "*S," and the date, "April 13—43," are recorded, after which the traveling carriage tabulates to the Float column.

The figures for the float analysis are now set up on the keyboard, and the machine is released for operation, as explained above. After the analysis of the float has been recorded, the traveling carriage tabulates automatically to the Balance column, and, in an automatic operation, the No. 1 or balance totalizer is cleared, and the amount of the new balance therein ($240.00) is recorded in said Balance column. Simultaneously with the recording of the new balance, the total amount of items (two) is recorded in the Total Item column, and the date, "April 13—43" is also recorded in the date section of the Balance column. As in the previous posting, the traveling carriage again tabulates automatically to the left to render the mechanism effective for causing the platen roll 309 to be moved from printing position to front-feeding or open-throat position and to cause said traveling carriage to be automatically returned to the Pick-Up column.

In the posting of John Doe's account for April 14, 1943, the amount of the old balance ($240.00) is ascertained from the last entry in the Balance column and entered in the Pick-Up column as before, after which the traveling carriage 136 tabulates to the first Check column, and the first check item of $30.00 is recorded therein in the same manner as before. At the same time, the date is also recorded in the date section of the first Check column. Inasmuch as there are only two debit or check items to be entered at this particular posting, it is desirable that the traveling carriage skip-tabulate directly from the first Check column to the third Check column. This skip-tabulating is effected by initiating the operation in which the first check item of $30.00 is recorded by full depression of the Vertical Feed bar 171 and the retention of said bar depressed, which causes the traveling carriage to skip-tabulate from the first Check column to the third Check column, after the first check item has been recorded.

Next, the amount of the second debit item ($270.00), which in this case comprises twenty-five checks of a certain or particular classification, is set up on the keyboard. As this is a list debit item, the LS symbol key 390 (Fig. 3) is simultaneously depressed, and the number of the checks (twenty-five) in this particular group is set up on the item-counting keys 343. As there is no deposit in this particular posting operation, it is desirable that the traveling carriage skip-tabulate from the third Check column to the Sub-Balance column. This is effected, as before, by full depression of the Skip-Tabulating bar 172 and by the retention of said bar depressed. During operation of the machine, the amount of the debit item ($270.00) is recorded in the third Check column, and the symbol LS is simultaneously recorded immediately to its right. The total number of items (twenty-five) is simultaneously added in the item totalizer.

Subtraction of the debit item of $270.00 from the balance totalizer creates an overdraft in said totalizer, and this, through the mechanism shown in Fig. 41, sets up a condition which will cause the No. 5 or overdraft totalizer, which, it will be recalled, is always complementary to the balance totalizer, to be sub-totalized or totalized, as the case may be, in order to secure a positive recording of the amount of the overdraft. Likewise, the occurrence of an overdraft in the balance totalizer automatically sets up a condition which will cause the amount of the overdraft to be printed in red.

Near the end of the operation in which the debit item of $270.00 was posted, the traveling carriage skip-tabulates automatically from the third Check column directly to the Sub-Balance column and, in so doing, initiates an automatic machine operation, during which the overdraft totalizer is sub-totalized and the positive amount of the overdraft ($60.00) is recorded in the Sub-Balance column. The occurrence of an overdraft in the balance totalizer likewise sets up a condition which causes the identifying symbol "OD" to be recorded immediately to the right of the sub-balance, and, as in other sub-balance operations, the sub-balance symbol "S" is also recorded. Simultaneously with the recording of the sub-balance of the overdraft, the date is printed in the date section of the Sub-Balance column.

Near the end of the sub-balance operation, the traveling carriage 136 tabulates to the Float column, and the analysis of the float is set up and recorded as before, after which the traveling carriage tabulates to the Balance column; then, in an automatic operation of the machine, the No. 5 or overdraft totalizer is cleared, and the amount of the overdraft ($60.00) is recorded in red in the Balance column, and the identifying symbol "OD" is recorded immediately to its right. Simultaneously with the recording of the overdraft, the item totalizer is cleared, and the total number of items (twenty-six) is cleared from it and recorded in the Total Item column. At the end of the balance operation, the traveling carriage 136 is returned to the Pick-Up column, and, at the same time, the platen roll 309 is moved from printing position to open-throat position in preparation for the next sequence of posting operations.

In the posting or balancing of John Doe's account for April 15, 1943, the previous balance, which is an overdraft of $60.00, is set up on the amount keys, and machine operation is initiated by depression of the Subtract—1 or Overdraft Pick-Up key 377 (Fig. 3). During machine operation, the amount of the overdraft ($60.00) is subtracted from the No. 1 or balance totalizer and is simultaneously recorded in red in the Pick-Up column. Use of the key 377 to initiate machine operations causes a minus symbol (—) to be printed immediately to the right of the amount of the overdraft, to further identify this as a negative amount.

At the end of machine operation, the traveling carriage tabulates to the first Check columnar position, and, in subsequent item-entering operations, the three check items of $10.00, $50.00, and $15.00 are recorded in red and simultaneously subtracted from the balance totalizer. Before initiating the third check-entering operation, the operator notices that there is a fourth debit item, and in this case the Vertical Feed release bar 171 is used in initiating such machine operation. Normal depression of the Vertical Feed bar 171 causes the platen roll 309 to be rotated near the end of machine operation to line-space the record material in preparation for the listing of the fourth debit item.

The fourth item, which is a bookkeeping or service charge of fifty cents, is set up on the amount keys. At the same time, the SC symbol key 399 is depressed, and the machine is released for operation by normal depression of the Release bar 170. During machine operation, the amount of the service charge (fifty cents) is recorded in red in the third Check column directly beneath the third Check item, and the symbol "SC" is simultaneously recorded to its right to identify this item as a service charge. Near the end of machine operation, the traveling carriage tabulates automatically to the Deposit column, after which the amount of the deposit ($200.00) is set up on the amount keyboard, and, as this is a credit memo item, the CM symbol key 390 is depressed, after which the Release bar 170 is depressed to initiate machine operation. During machine operation, the amount of the credit memo item is recorded in the Deposit column and is simultaneously added in the No. 1 or balance totalizer, and the symbol "CM" is simultaneously recorded immediately to the right of said credit memo item.

Near the end of the deposit operation, the traveling carriage 136 tabulates automatically to the Sub-Balance column, and, in an automatic operation, the balance totalizer is sub-totalized and the amount therein ($109.50) is recorded in the Sub-Balance column, and the symbol "*S" is simultaneously recorded immediately to its right to identify this as a positive sub-balance item.

At the end of the sub-balance operation, the traveling carriage 136 tabulates to the Float column as before, and the analysis of the float is entered in the manner explained above, after which said traveling carriage tabulates to the Balance column, and, in an automatic balancing operation, the balance totalizer is cleared, and the amount therein ($109.50) is recorded in the Balance column, and the positive balance symbol "*" is recorded simultaneously to the right thereof. Simultaneously with the recording of the balance, the No. 6 or item totalizer is cleared, and the amount of the items therein, in this case 5, is simultaneously recorded in the Total Item column. Also during the recording of the balance, the date is simultaneously recorded in the date section of the Balance column.

It is believed that the above description of operation in connection with one particular business system will be sufficient for the purpose of the present specification. However, the many features and the versatility of the machine embodying this invention render it readily adaptable for use in connection with almost any type of business system used in connection with present-day business and manufacturing establishments. For example, the system set-up of the machine may be readily changed by the simple expedient of removing the control block bar 729 (Figs. 8-A and 8-B) and substituting therefor another bar having the control blocks 722 arranged thereon to agree with the requirements of the new business system. Or, if desired, the control blocks 722 may be relocated on the bar 729 to adapt the machine for a different business set-up.

The adaptability of the machine to various business systems is further enhanced by the Control keys 374 and 380 inclusive (Fig. 3), the Correction keys 369 to 372 inclusive, the Column Selecting keys, and the Carriage Control keys. The adaptability of the machine to various business systems is likewise augmented by the three release bars 170, 171, and 172 and their controlling mechanisms.

While the form of mechanism herein shown and described is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a machine of the class described, having a traveling carriage, a balance totalizer, an overdraft totalizer which is always complementary to the balance totalizer, and actuators for the totalizers, the combination of means to move each of the totalizers into and out of engagement with the actuators; means to drive the moving means; a member on each moving means adapted to cooperate with the driving means to form an operating connection between said moving means and said driving means; control parts on said carriage in columnar positions thereof; means cooperating with the control parts; control keys for the totalizers; and means rendered operative by the balance totalizer when overdrawn, and controlled by either the cooperating means or the control keys to variably control the positioning of the members in relation to the driving means to cause the overdraft totalizer to be sub-totalized and the balance totalizer simultaneously non-added, or to cause the overdraft totalizer to be totalized, and the amount therein simultaneously added in the balance totalizer to zeroize said balance totalizer.

2. In a machine of the class described, having a balance totalizer, an overdraft totalizer, actuators for the totalizers, control keys for the totalizers, and a traveling carriage positionable to various columnar positions including balance columnar position, the combination of separate means to engage and disengage each of the totalizers with and from the actuators; means to drive the engaging and disengaging means; a member on each of the engaging and disengaging means, said members being positionable in relation to the driving means to selectively connect same to the corresponding engaging and disengaging means; means controlled by the carriage in columnar positions thereof or by the control keys to position the members in relation to the driving means to maintain the balance and overdraft totalizers in complementary agreement with each other; and means rendered operative by the balance totalizer when overdrawn, and controlled either by the carriage when in the balance column or by the control keys, to variably control the positioning of the members in relation to the driving means to cause the overdraft totalizer to be cleared to record the positive amount of the overdraft, and to cause the amount cleared therefrom to be simultaneously added in the balance totalizer to zeroize it.

3. In a machine of the class described, having a balance totalizer, an overdraft totalizer arranged to be always complementary to the balance totalizer, and a traveling carriage movable to various columnar positions, including sub-balance and balance columnar positions, the combination of means effective when the balance totalizer is in a positive condition, and when the traveling carriage is in the sub-balance column, to cause the balance totalizer to be read and the overdraft totalizer simultaneously non-added, said causing means effective when the carriage is in the balance column to cause the balance totalizer to be reset and the amount cleared therefrom simultaneously added in the overdraft totalizer to zeroize same; means, including a slide, rendered operative when the balance totalizer is overdrawn and when the carriage is in the sub-balance column to control the causing means to cause the overdraft totalizer to be read and the balance totalizer simultaneously non-added; and means, including another slide, rendered operative when the balance totalizer is overdrawn and when the carriage is in the balance column, to control the causing means to cause the overdraft totalizer to be reset and the amount cleared therefrom simultaneously added in the balance totalizer to zeroize it, to effect a positive recording of the overdraft.

4. In a machine of the character described, having a traveling carriage positionable to various columnar positions, a balance totalizer, an overdraft totalizer which is always complementary to the balance totalizer, actuators for the totalizers, and printing means positionable under influence of the totalizers and the actuators, the combination of separate means to move each of the totalizers into and out of engagement with the actuators; means to drive the moving means, said driving means having an invariable movement; a member on each moving means to form an operating connection between same and the driving means; control parts located in columnar positions on the traveling carriage; sensing means for each totalizer, cooperating with the control parts and the members to govern the connection of the moving means to the driving means to cause the totalizers and the actuators to be properly engaged and disengaged; and means including a slide rendered effective when the carriage is in a certain columnar position and when the balance totalizer is overdrawn, to control the sensing means for the overdraft totalizer and to control the member for the balance totalizer to cause the former to be sub-totalized and to cause the latter to be non-added to obtain a positive recording of the negative balance.

5. In a machine of the character described, having a traveling carriage positionable to various columnar positions, a balance totalizer, an overdraft totalizer which is always complementary to the balance totalizer, actuators for the totalizers, and printing means positionable under influence of the totalizers and the actuators, the combination of separate means to move each of the totalizers into and out of engagement with the actuators; means to drive the moving means, said driving means having an invariable movement; a member on each moving means to form an operating connection between same and the driving means; control parts located in columnar positions of the carriage; sensing means for each totalizer cooperating with the control parts and the members to govern the connection of the moving means to driving means to cause the totalizers and the actuators to be properly engaged and disengaged; means, including a slide rendered effective when the carriage is in a certain columnar position and when the balance totalizer is overdrawn, to control the sensing means for the overdraft totalizer and to control the member for the balance totalizer to cause the former to be sub-totalized and to cause the latter to be non-added to obtain a positive recording of the negative balance; and means including another slide rendered effective when the balance totalizer is overdrawn and when the traveling carriage is in another certain columnar position to control the sensing means for the overdraft totalizer and to control the member for the balance totalizer to cause the former to be totalized and to cause the latter to be selected and conditioned for addition, to obtain a positive recording of the total of the negative balance and to simultaneously zeroize the balance totalizer.

6. In a machine of the class described, having a traveling carriage positionable to various columnar positions, the combination of a balance totalizer; an overdraft totalizer which is always in complementary agreement with the balance totalizer; means comprising two slides for controlling the balance and the overdraft totalizers in overdraft operations; means normally effective to retain the slides in ineffective position; means operable when the balance totalizer is overdrawn to render the retaining means ineffective; separate means operating independently of the retaining means and normally effective to hold each of the slides in ineffective position; means effective when the traveling carriage is in a certain columnar position to release one of the holding means to render the corresponding one of the slides effective to cause the overdraft totalizer and the balance totalizer to be zeroized; and means effective when the traveling carriage is in another certain columnar position to release the other holding means to render the corresponding one of the slides effective to cause the overdraft totalizer to be sub-totalized, and to cause the balance totalizer to be non-added.

7. In a machine of the class described, having a balance totalizer and an overdraft totalizer, which is always in complementary agreement with the balance totalizer, said machine also having means positionable under influence of the totalizers for recording the results of reading and/or resetting operations in said totalizers, the combination of means normally effective to select and condition the balance totalizer for reading operations, and to simultaneously select and condition the overdraft totalizer for non-adding operations; and means, including a pair of overdraft control slides rendered effective when the balance totalizer is overdrawn to select the overdraft totalizer for reading operations and for simultaneously selecting the balance totalizer for non-adding operations, to thereby obtain a positive recording of the overdraft and to maintain the totalizers in complementary agreement with each other.

8. In a machine of the character described, having a balance totalizer, an overdraft totalizer, actuators for the totalizers, recording means positioned by the actuators to record the results of transactions in the totalizers, control elements for the totalizers, and a traveling carriage movable to various columnar positions, the combination of separate means to engage and disengage each of the totalizers and the actuators; means to drive the engaging and disengaging means; separate means to connect each of the engaging and disengaging means to the driving means; means controlled either by the traveling carriage in columnar positions thereof, or by the control elements to control the connecting means to maintain the totalizers in complementary agreement with each other; and means including two slides rendered effective when an overdraft occurs in the balance totalizer, and controlled either by the carriage in certain columnar positions thereof, or by certain control elements to control the connecting means to cause the overdraft totalizer to be totalized to obtain a positive recording of the negative balance, and to maintain the balance totalizer in complementary agreement therewith.

9. In a machine of the class described, having a traveling carriage movable to any one of a plurality of different columnar positions, a totalizer, and actuators for the totalizer, the combination of means for engaging the totalizer with and disengaging the totalizer from the actuators; means for driving the engaging and disengaging means; means on the engaging and disengaging means for connecting the same to the driving means for operation thereby; a positionable stop member; means controlled by said carriage for moving stop member to any one of a plurality of predetermined positions; a control key having a stop element thereon, said element movable to an effective position when the key is depressed; and means for sensing the position of said stop member or for sensing said stop element when it is in effective position, and for controlling said connecting means accordingly so as to cause the totalizer to be engaged with and disengaged from the actuators in proper time.

10. In a machine of the class described, having a traveling carriage movable to any one of a plurality of different columnar positions, a totalizer, and actuators for the totalizer, the combination of means for engaging and disengaging the totalizer and the actuators; means for driving the engaging and disengaging means; means on the engaging and disengaging means for connecting the same to the driving means for operation thereby; a positionable stop member; a plurality of stops located on said carriage in positions corresponding to the columnar positions of said carriage; means controlled by said stops for moving said stop member to any one of a plurality of predetermined positions; a control key having a stop element thereon, said element movable to a sensing position when the key is depressed; and means for sensing the position of said stop member or for sensing said stop element when it is in sensing position, and for controlling said connecting means accordingly so as to cause the totalizer to be engaged with and disengaged from the actuators at the proper time.

11. In a machine of the class described, having a traveling carriage movable to any one of a plurality of different columnar positions, a totalizer, and actuators for the totalizer, the combination of means for engaging and disengaging the totalizer and the actuators; means for driving the engaging and disengaging means; means on the engaging and disengaging means for connecting the same to the driving means for operation thereby; a plurality of control elements, each comprising a plurality of control tappets of varying lengths, said elements located on said carriage in positions corresponding to the columnar positions of said carriage; a stop member movable to a plurality of different positions; means controlled by said control tappets for moving said stop member to a position corresponding to the length of said control tappets on said elements; a depressible control key having a stop element thereon; and means for sensing the position of said stop member or for sensing said stop element when the control key is depressed and for controlling said connecting means accordingly so as to cause the totalizer to be engaged with and disengaged from the actuators in proper time.

12. In a machine of the class described, having a carriage arranged for tabulating movement from column to column across the machine, a totalizer, and actuators for the totalizer, the combination of means for engaging and disengaging said totalizer and said actuators; means for driving the engaging and disengaging means; a part on the engaging and disengaging means for connecting the same with the driving means; a plurality of control elements located on said carriage in positions corresponding to the columnar positions of said carriage, said control elements each having several control surfaces thereon; a stop member movable to a plurality of different positions; means controlled by said control elements for moving said stop member to a position corresponding to the control surfaces on said elements; and means for sensing the position of said stop member and for controlling said part in accordance therewith so as to cause the totalizer to be engaged and disengaged in proper time.

13. In a machine of the class described having a carriage movable from column to column across the machine, a totalizer, and actuators for the totalizer, the combination of means for engaging and disengaging the totalizer and said actuators; means for driving the engaging and disengaging means; a part on the engaging and disengaging means for connecting the same with said driving means; a plurality of control elements located on said carriage in positions corresponding to the columnar positions thereof; a plurality of control tappets of varying lengths, mounted on each of the control elements; means for sensing the control tappets; a stop member movable to a plurality of different positions; means for connecting said stop member with said sensing means so as to cause said member to be moved to a position corresponding to the length of the control tappets being sensed; and means for sensing the position of said stop member and for controlling said part in accordance therewith so as to cause the totalizer to be engaged and disengaged in proper time.

14. In a machine of the class described, having means for giving the machine cycles of operation, a totalizer, and actuators for the totalizer, the combination of means for engaging and disengaging the totalizer and the actuators; cyclically operable means for driving said engaging and disengaging means; a coupling member for selectively connecting or disconnecting said engaging and disengaging means and said driving means; a cyclically operable member for so controlling said coupling member during each cycle of machine operation as to cause said engaging and disengaging means to be operated in subtract time; and selectively operable means for moving said coupling member to a position where it will be unaffected by said cyclically operable member and where it will be effective to cause said engaging and disengaging means to be operated in add time.

15. In a machine of the class described, having means for giving the machine cycles of operation, a totalizer, and actuators for the totalizer, the combination of means for engaging and disengaging the totalizer and the actuators; cyclically operable means for driving said engaging and disengaging means; a coupling member on said engaging and disengaging means for connecting the same to said driving means or for disconnecting it therefrom; a cyclically operable member for so controlling said coupling member during each cycle of operation of the machine as to cause said engaging and disengaging means to be connected with and disconnected from said driving means in subtract time; and selectively operable means for so modifying the operation of said cyclically operable member as to cause said engaging and disengaging means to be connected with and disconnected from said driving means in sub-total time.

16. In a machine of the class described, having means for giving the machine cycles of operation, a totalizer, and actuators for the totalizer, the combination of means for engaging and disengaging the totalizer and the actuators; cyclically operable means for driving said engaging and disengaging means; a coupling member for selectively connecting or disconnecting said engaging and disengaging means and said driving means; a cyclically operable member movable between a normal position and a moved position on each machine cycle so as to control said coupling member in such a manner as to cause said engaging and disengaging means to be connected with and disconnected from said driving means in subtract time; an operating means for said cyclically operable member, said means being effective to positively move said member from its normal position to its moved position and to yieldingly restore said member from its moved position to its normal position; and selectively operable means for latching said cyclically operable member in its moved position during a portion of the machine cycle so as to cause said engaging and disengaging means to be connected with and disconnected from said driving means in sub-total time.

17. In a machine of the class described, having means for giving the machine cycles of operation, a traveling carriage movable from column to column across the machine, a totalizer, and actuators for the totalizer, the combination of means for engaging and disengaging the totalizer and the actuators; cyclically operable means for driving said engaging and disengaging means; a coupling member for selectively connecting or disconnecting said engaging and disengaging means and said driving means; a cyclically operable member for so controlling said coupling member during each cycle of operation of the machine as to cause said engaging and disengaging means to be connected with and disconnected from said driving means in subtract time; a positionable stop member; means controlled by said traveling carriage for moving said stop member to a predetermined position; and means for sensing said stop member when it is in said predetermined position, to thereby cause said coupling member to be moved to a position where it will be unaffected by said cyclically operable member and where it will be effective to cause said engaging and disengaging means to be connected with and disconnected from said driving means in add time.

18. In a machine of the class described, having means for giving the machine cycles of operation, a traveling carriage movable from column to column across the machine, a totalizer, and actuators for the totalizer, the combination of means for engaging and disengaging the totalizer and the actuators; cyclically operable means for driving said engaging and disengaging means; a coupling member for selectively connecting or disconnecting said engaging and disengaging means and said driving means; a cyclically operable member for controlling said coupling member during each cycle of operation of the machine so as to cause said engaging and disengaging means to be connected with and disconnected from said driving means in subtract time; a positionable stop member; means controlled by said carriage for moving said stop member to a predetermined position; a depressible control key having a stop element thereon; and means for sensing the stop member when it is in said predetermined position or for sensing said stop element when the central key is depressed to thereby cause said coupling member to be moved to a position where it will be unaffected by said cyclically operable member and where it will be effective to cause said engaging and disengaging means to be connected with and disconnected from said driving means in add time.

19. In a machine of the class described, having means for giving the machine cycles of operation, a totalizer, actuators for the totalizer, said actuators each having a home position and a moved position, and means for urging said actuators to move from their home positions to their moved positions during the first half of each machine cycle and for returning said actuator from their moved positions to their home positions during the second half of the cycle, the combination of means for engaging and disengaging said totalizer and said actuators; a cyclically operable driving means for said last named means, said driving means being movable step by step on each cycle of operation of the machine from a normal position to a first position prior to the movement of said actuators from their home positions to their moved positions, from said first position to a second position after said actuators have reached their moved positions, from said second position back to said first position prior to the movement of said actuators from their moved positions to their home positions, and from said first position back to said normal position after the actuators have reached their home positions; means for coupling and uncoupling said engaging and disengaging means and said driving means; and means for controlling said coupling means so as to cause said engaging and disengaging means and said driving means to be uncoupled during the first step of movement thereof, to be coupled during the second step of movement thereof, to be uncoupled during the third step of movement, and to be coupled during the fourth step of movement to thereby cause said totalizer to be engaged with and disengaged from said actuators in add time.

20. In a machine of the class described, having means for giving the machine cycles of operation, a totalizer, actuators for the totalizer, said actuators each having a home position and a moved position, and means for urging said actuators to move from their home positions to their moved positions during the first half of the machine cycle and for returning said actuators from their moved positions to their home positions during the second half of the machine cycle, the combination of means for engaging and disengaging said totalizer and said actuators; a cyclically operable driving means for said last named means, said driving means being movable in a step by step fashion on each cycle of operation of the machine from a normal position to a first position prior to movement of said actuators from their home positions to their moved positions, from said first position to a second position after said actuators have reached their moved positions, from said second position back to said first position prior to the movement of said actuators from their moved positions to their home positions, and from said first position to said normal position after the actuators have reached their home positions, means for coupling and uncoupling said engaging and disengaging means and said driving means, and cyclically operable means for controlling said coupling means so as to cause said engaging and disengaging means and said driving means to be coupled during the first step of movement of the driving means, to be uncoupled during the second step of movement thereof, to be coupled during the third step of movement, and to be uncoupled during the fourth step of movement to thereby cause said totalizer to be engaged with and disengaged from said actuators in subtract time.

21. In a machine of the class described, having means for giving the machine cycles of operation, a totalizer, actuators for the totalizer, said actuators each having a home position and a moved position, and means for urging said actuators to move from their home positions to their moved positions during the first half of the machine cycle and for returning said actuators from their moved positions to their home positions during the second half of the machine cycle, the combination of means for engaging and disengaging said totalizer and said actuators; a cyclically operable driving means for said last named means, said driving means being movable step by step on each cycle of operation of the machine from a normal position to a first position prior to the movement of said actuators from their home positions to their moved positions, from said first position to a second position after said actuators have reached their moved positions, from said second position back to said first position prior to the movement of said actuators from their home positions, and from said first position to said normal position after the actuators have reached their home positions; a member mounted on said engaging and disengaging means, said member being movable from an effective position in which said engaging and disengaging means is connected with said driving means to an ineffective position in which said engaging and disengaging means is disconnected therefrom; and cyclically operable means for causing said member to remain in its effective position during the first step of movement of said driving means, for moving said member to its ineffective position during said second step of movement thereof, for allowing said member to return to its effective position during the third step of movement, and for moving said member to its ineffective position during the fourth step of movement to thereby cause said totalizer to be engaged with and disengaged from said actuators in subtract time.

22. The combination recited in claim 21, including means for modifying the operation of said cyclically operable means so as to cause said member to remain in its effective position during the first step of movement of said driving means, for moving said member to its ineffective position during the second and third steps of movement thereof, and for allowing said member to return to its effective position during the fourth step of movement of the driving means to thereby cause said totalizer to be engaged and disengaged in sub-total time.

23. The combination as defined in claim 21, including a selectively operable means for moving said member to its ineffective position and retaining it there throughout the entire machine cycle so as to prevent said engaging and disengaging means from being connected with said driving means and so cause said totalizer to remain disengaged from said actuators throughout the entire operation of the machine.

JOHN T. DAVIDSON.
PAUL H. WILLIAMS.
LAURENCE N. LEHMAN.

REFERENCES CITED

The following references are of record in the file of this patent:

UNITED STATES PATENTS

| Number | Name | Date |
|---|---|---|
| 1,932,013 | Crosman | Oct. 24, 1933 |
| 2,012,111 | Slawick | Aug. 20, 1935 |
| 2,087,542 | Muller | July 20, 1937 |
| 2,088,092 | Ott | July 27, 1937 |
| 2,181,975 | Lee | Dec. 5, 1939 |
| 2,289,403 | Anderson | July 14, 1942 |
| 2,313,982 | Williams | Mar. 16, 1943 |
| 2,364,769 | Anderson | Dec. 12, 1944 |
| 2,386,364 | Spurlino et al. | Oct. 9, 1945 |

Certificate of Correction

Patent No. 2,540,189 February 6, 1951

JOHN T. DAVIDSON ET AL.

It is hereby certified that error appears in the printed specification of the above numbered patent requiring correction as follows:

Column 14, line 38, after the word "plate" insert *by*; column 17, line 24, for "an" read *and*; line 58, for the numeral "135" read *136*; column 33, line 50, before the syllable and hyphen "ten-" strike out "the"; line 55, for the numeral "469" read *649*; column 46, line 16, for "tansmitted" read *transmitted*; column 67, line 20, after "moving" insert *said*; column 70, line 15, for "central" read *control*; same line, after "depressed" insert a comma; column 70, line 29, for "actuator" read *actuators*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*